(12) United States Patent
Andrist et al.

(10) Patent No.: US 6,355,727 B1
(45) Date of Patent: Mar. 12, 2002

(54) CONTINUOUS BULK POLYMERIZATION AND ESTERIFICATION PROCESS

(75) Inventors: Kevin M. Andrist; John E. Blasko; Glenn C. Calhoun, all of Racine; Frederick C. Hansen, Union Grove; Dean R. Hellwig, Racine; Kurt A. Hessenius, Sturtevant; Steven M. Hurley; D. Sunil Jayasuriya, both of Racine, all of WI (US); Matthew G. Lee, Boonville, IN (US); Stephen J. Maccani; H. Thomas Mills, Jr., both of Racine, WI (US); Gregory R. Peterson, Franksville, WI (US); Paul E. Sandvick, Racine, WI (US); Dennis M. Wilson, Kenosha, WI (US); John P. Wiruth, Racine, WI (US)

(73) Assignee: S. C. Johnson Commercial Markets, Inc., Sturtevant, WI (US)

( * ) Notice: Subject to any disclaimer, the term of this patent is extended or adjusted under 35 U.S.C. 154(b) by 0 days.

(21) Appl. No.: 09/347,035

(22) Filed: Jul. 2, 1999

Related U.S. Application Data

(60) Provisional application No. 60/092,405, filed on Jul. 10, 1998.

(51) Int. Cl.[7] ............................. C08F 20/04; C08L 23/00
(52) U.S. Cl. ...................... 525/75; 525/330.1; 525/384; 526/317.1; 526/318.1; 526/318.3; 526/271; 523/340; 523/343
(58) Field of Search .................. 526/75, 318, 317.1, 526/318.2, 318.3, 271; 525/530.1, 384, 330.1; 523/340, 343

(56) References Cited

U.S. PATENT DOCUMENTS

| | | |
|---|---|---|
| 3,859,268 A | 1/1975 | Novack et al. |
| 3,884,857 A | 5/1975 | Ballard et al. |
| 3,968,059 A | 7/1976 | Shimada et al. |
| 4,404,309 A | 9/1983 | Masler, III .................. 524/379 |
| 4,414,370 A | 11/1983 | Hamielec et al. |
| 4,529,787 A | 7/1985 | Schmidt et al. |
| 4,546,160 A | 10/1985 | Brand et al. |
| 4,559,156 A | 12/1985 | Greaves et al. |
| 4,954,567 A | 9/1990 | Oishi et al. |
| 5,130,369 A | 7/1992 | Hughes et al. |
| 5,292,803 A | 3/1994 | Ohmae et al. |
| 5,352,750 A | 10/1994 | Yanai et al. |
| 5,399,612 A | 3/1995 | Calhoun |
| 5,521,267 A | 5/1996 | Giencke et al. |
| 5,596,057 A | 1/1997 | Epple et al. |
| 5,665,822 A | 9/1997 | Bitler et al. |
| 5,679,735 A | 10/1997 | Geissler et al. |
| 5,710,227 A | 1/1998 | Freeman et al. ............. 526/208 |

FOREIGN PATENT DOCUMENTS

| | | | |
|---|---|---|---|
| EP | 0071239 A1 | 7/1982 | ......... C08F/220/06 |
| EP | 0 879 852 | 11/1998 | |
| EP | 0 885 906 | 12/1998 | |
| EP | 0 896 027 | 2/1999 | |
| WO | WO 98/04593 | 2/1998 | |

OTHER PUBLICATIONS

Boutier et al., "New Oil Soluble Esters Resins for Graphic Arts", *American Ink Maker*, vol. 75, No. 1, pp. 50–52 (Jan. 1997).

*Primary Examiner*—Donald R. Wilson
(74) *Attorney, Agent, or Firm*—Renee J. Rymarz; Neil E. Hamilton; Warren R. Bovee

(57) ABSTRACT

A continuous bulk polymerization and esterification process includes continuously charging into a reaction zone at least one ethylenically unsaturated acid-functional monomer and at least one linear or branched chain alkanol having greater than 11 carbon atoms. The process includes including maintaining a flow rate through the reaction zone sufficient to provide an average residence time of less than 60 minutes and maintaining a temperature in the reaction zone sufficient to produce a polymeric product incorporating at least some of the alkanol as an ester of the polymerized ethylenically unsaturated acid-functional monomer. The polymeric product is used in various processes to produce water-based compositions including emulsions and dispersions such as oil emulsions, wax dispersions, pigment dispersions, surfactants and coatings which contain the polymeric product. A polymeric surfactant includes at least one ethylenically unsaturated acid-functional monomer which has been radically incorporated into the polymeric surfactant and at least one ester of the incorporated ethylenically unsaturated acid-functional monomer which has a linear or branched chain alkyl group with greater than 11 carbon atoms. The molar critical micelle concentration of the polymeric surfactant is less than $1.0 \times 10^{-2}$ moles/liter. Aqueous 2 percent neutralized solutions of certain polymeric surfactants have a surface tension of less than 45 mN/m at 30° C. and exhibit a decrease in surface tension of at least 5 mN/m as the temperature warms from 30° C. to 50° C.

39 Claims, 11 Drawing Sheets

CONTINUOUS BULK POLYMERIZATION AND ESTERIFICATION PROCESS

REFERENCE TO RELATED APPLICATION

This application claims the benefit of provisional patent application No. 60/092,405, filed Jul. 10, 1998, the disclosure of which is incorporated by reference.

FIELD OF THE INVENTION

The present invention relates to a bulk polymerization and esterification process for maximizing the conversion of an aliphatic alkanol to an ester in a radically-initiated polymerization of an ethylenically unsaturated acid-functional monomer, to the polymeric products produced by the process, to polymeric products, to processes for preparing emulsions and dispersions utilizing the polymeric products, and to overprint varnishes (OPVs), inks, coatings, surfactants, adhesives, paints, primers, and floor polishes containing the polymeric products.

BACKGROUND OF THE INVENTION

Conventional solvent-based industrial finishes and coatings have presented many problems to date. Organic solvents can pollute the workplace and environment. In addition, many organic solvents are readily ignited, toxic, expensive, and lower the quality of finishes, and they can add undesirable colors to an otherwise colorless finish. As a replacement for these solvent-based finishes, the trend in the polymer industry has been toward high solids, liquid coatings and polymerization processes reducing or eliminating solvent.

High solids coatings offer significant advantages over conventional, solvent-thinned coatings. For example, high solids coatings do not pollute the air, they reduce or eliminate exudation of fumes in use, they reduce the energy requirements for their preparation in terms of material, energy expended and labor, and unlike solvent-based systems, they do not present significant fire and toxicity problems. High solids coatings also provide substantial advantages over other high solids liquids, such as solventless, water-borne, powder and non-aqueous systems. Additionally, they offer a better balance of properties.

One of the most enduring and difficult problems in preparing and utilizing high solids coatings is the selection and control of viscosity. Significant efforts have been made to improve processes and polymeric products for use in high solids applications. For example, various methods of characterizing polymers such as the number average molecular weight ($M_n$), weight average molecular weight ($M_w$), and the sedimentation average molecular weight ($M_z$) and ratios calculated using these characteristics such as the polydispersity ratio ($M_w/M_n$) and the dispersion index ($M_z/M_n$) have been investigated and adjusted to obtain polymeric products with viscosities useful for high solids applications. Although these efforts have produced vast improvements in polymers for use in high solids applications, improved processes are required to produce polymers with characteristics maximized for high solids applications.

U.S. Pat. No. 4,414,370 discloses a continuous bulk polymerization process for polymerizing vinylic monomers to prepare low molecular weight polymers employing thermal initiation at reaction temperatures from 235° C. to 310° C. and residence times of at least 2 minutes in a continuous stirred reactor zone. The vinylic monomers of the disclosed process include styrenic monomers such as styrene and α-methylstyrene; acrylic monomers such as acrylic acid, methacrylic acid, acrylates, methacrylates; and other non-acrylic ethylenic monomers such as vinyl acetate.

U.S. Pat. No. 4,529,787 discloses a continuous bulk polymerization process including an initiator for preparing low molecular weight, uniform polymers from vinylic monomers at short residence times and moderate reaction temperatures to provide high yields of a product suitable for high solids applications. The disclosed vinyl monomers include styrenic monomers such as styrene and α-methylstyrene; acrylic monomers such as acrylic acid, methacrylic acid, acrylates, methacrylates, and functional acrylic monomers; and non-acrylic ethylenic monomers such as maleic anhydride and vinyl pyrrolidone.

U.S. Pat. No. 4,546,160 discloses a continuous bulk polymerization process for polymerizing acrylic monomers to prepare low molecular weight, uniform, polymers for use in high solids applications which uses a minor amount of initiator at short residence times and moderate temperatures.

U.S. Pat. No. 5,130,369 discloses a batch process for preparing functionalized polymeric compositions. The functionalized polymeric compositions are prepared by polymerizing an ethylenically unsaturated functional monomer in a solvent including a reactive compound. The polymeric compositions prepared according to the process can be used as builders in detergent compositions, as pigments, dispersants in coating compositions, as tanning agents for leather, as associative thickeners and as rheology modifiers in coating compositions.

U.S. Pat. No. 5,521,267 discloses a batch process for preparing polymers from ethylenically unsaturated compounds containing acid groups with further ethylenically unsaturated compounds and monohydroxy compounds The polymer industry has long known that continuous polymerization processes are best for obtaining large quantities of polymeric product. Furthermore, optimized continuous processes provide economic advantages over batch polymerization processes and may provide more uniform polymeric products. While continuous processes have been disclosed for the preparation of certain polymeric products for use in high solids coatings applications, a continuous process is needed for preparing polymeric products with improved viscosity characteristics in aqueous media for use in high solids applications. Furthermore, a need remains for a polymerization process which incorporates an esterification reaction in which an alcohol with desirable viscosity-modifying behavior is incorporated into a polymeric chain with a high degree of conversion.

SUMMARY OF THE INVENTION

It would be highly desirable to be able to produce a polymeric product exhibiting low viscosity in aqueous solution using a continuous polymerization process where an alkanol is incorporated with high conversion into the polymer via an esterification reaction with an ethylenically unsaturated acid-functional monomer or a residue of such a monomer already present in the polymer.

One object of the invention is to provide a continuous bulk polymerization and esterification process including charging continuously into a reaction zone at least one ethylenically unsaturated acid-functional monomer and at least one alkanol having the formula ROH, where R is a linear or branched chain alkyl moiety, or combinations thereof, having greater than 11 carbon atoms. The process also includes maintaining a flow rate through the reaction zone sufficient to provide an average residence time of the monomers in the reaction zone of less than 60 minutes and maintaining a temperature in the reaction zone sufficient to produce a polymeric product. Preferably, the polymeric product of the continuous bulk polymerization and esterification process incorporates at least 80 percent of the alkanol as an ester of the ethylenically unsaturated acid-functional monomer when the alkanol is present in the reaction zone in an average amount of at least up to 25 mole percent of the total moles of the ethylenically unsaturated monomers. More preferably, the polymeric product of the continuous bulk polymerization and esterification process incorporates at least 85 percent of the alkanol as an ester of the ethylenically unsaturated acid-functional monomer when the alkanol is present in the reaction zone in an average amount of at least up to 20 mole percent of the total moles of the ethylenically unsaturated monomers. Most preferably, the polymeric product of the continuous bulk polymerization and esterification process incorporates at least 90 percent of the alkanol as an ester of the ethylenically unsaturated acid-functional monomer when the alkanol is present in the reaction zone in an average amount of at least up to 15 mole percent of the total moles of the ethylenically unsaturated monomers.

In preferred processes, the ethylenically unsaturated acid-functional monomer is acrylic acid, methacrylic acid, or crotonic acid while in other preferred processes, the R group of the alkanol has 12 to 50 carbon atoms and all combinations and subcombinations and ranges contained therein. More preferably, the R group of the alkanol has 12 to 36 carbon atoms, or 12 to 22 carbon atoms. In especially preferred processes, the alkanol has 16 to 18 carbon atoms, and in other especially preferred processes a mixture of alkanols, particularly those having 16 to 18 carbon atoms is used. In some preferred processes and products, the polymeric product has an aqueous solution viscosity which is less than about 50 percent of the aqueous solution viscosity of the equivalent unmodified polymeric product.

In still other preferred processes, the polymeric product has an acid number ranging from about 10 to about 740.

Other preferred processes further include adding a polymerization initiator, preferably di-t-butyl peroxide, into the reaction zone, preferably in an amount to provide a molar ratio of the initiator to the combined monomers of from about 0.0005:1 to 0.04:1. In other preferred processes, the polymerization and esterification process incorporates at least 95 percent of the alkanol as an ester of the polymerized ethylenically unsaturated acid-functional monomer when the alkanol is present in the reaction zone in an average amount of at least up to 15 mole percent of the total moles of the ethylenically unsaturated acid-functional monomers.

In preferred processes, the average residence time in the reaction zone is less than 30 minutes while in other preferred processes the temperature in the reaction zone ranges from 180 to 270° C.

Preferred processes include continuously charging into the reaction zone at least one aromatic ethylenically unsaturated monomer, a $C_1$ to $C_8$ alkyl acrylate monomer, a $C_1$ to $C_8$ alkyl methacrylate monomer, or a non-aromatic ethylenically unsaturated vinyl monomer, while in other preferred processes at least two different aromatic ethylenically unsaturated monomers are continuously charged into the reaction zone.

In still another preferred process, at least two different alkanols are continuously charged into the reaction zone.

Another object of the present invention is to provide a continuous bulk polymerization and esterification process including continuously charging into a reaction zone at least one ethylenically unsaturated acid-functional monomer and at least one alkanol having the formula ROH, where R is a linear or branched chain alkyl moiety having from 12 to 50 carbon atoms and all combinations and subcombinations and ranges contained therein. The process also includes maintaining a flow rate through the reaction zone sufficient to provide an average residence time in the reaction zone of less than 60 minutes and maintaining a temperature in the reaction zone sufficient to produce a polymeric product. The polymeric product of the continuous bulk polymerization and esterification process has a number average molecular weight ranging from 600 to 20,000. Furthermore, an aqueous resin cut of the polymeric product has a solution viscosity which is less than about 50 percent of the solution viscosity of the equivalent unmodified polymeric product.

Another object of the invention is to provide a polymeric product consisting essentially of about 3 to about 97 percent by weight of a residue of at least one ethylenically unsaturated acid-functional monomer; about 3 to about 97 percent by weight at least one ester of the ethylenically unsaturated acid-functional monomers having an —OR group, where R is a linear or branched chain alkyl moiety having greater than 11 carbon atoms; about 0 to about 85 percent by weight of a residue of at least one aromatic ethylenically unsaturated monomer; and about 0 to about 85 percent by weight of a residue of at least one non-aromatic ethylenically unsaturated vinyl monomer.

A further object of the invention is to provide water-based compositions including water; from about 0.1 to about 100 percent by weight based on the total weight of the composition of the polymeric product of the invention or the polymeric product produced by the continuous bulk polymerization and esterification process; and up to about 99 percent by weight based on the total weight of the composition of an adjunct.

Preferred water-based compositions contain about 10 to about 99 percent by weight of the adjunct while other preferred water-based compositions are overprint varnishes, inks, coating materials, adhesives, floor polishes, paints, primers, and paper sizing agents.

A further object of the invention is to provide a process for preparing an emulsion of a polyolefin resin which includes mixing together a polyolefin resin and the polymeric product of the bulk polymerization and esterification process; mixing a base with the combination; and mixing the combined base, resin and polymeric product with water.

Another object of the invention is to provide the emulsion prepared by the above emulsion preparation process.

Still another object of the invention is to provide an emulsion of a polyolefin resin which includes a polyolefin resin, the polymeric product of the invention, a base, and water. In preferred processes and compositions containing a polyolefin resin, the polyolefin resin has a number average molecular weight ranging from about 500 to about 20,000, an acid number of about 0 to about 150, or a melting point of about 40° to about 250° C.

Yet another object of the invention is to provide a process for preparing a wax dispersion which includes mixing a wax in an aqueous medium with the polymeric product of the continuous bulk polymerization and esterification process.

Yet another object of the invention is to provide a wax dispersion prepared according to the above process for preparing a wax dispersion.

Yet another object of the invention is to provide a wax dispersion which includes a wax; the polymeric product of the invention; and an aqueous medium.

A still further object of the invention is to provide a process for preparing an oil emulsion which includes heating a mixture of an oil and the polymeric product of the continuous bulk polymerization and esterification process; mixing a base with the heated mixture of the oil and the polymeric product; and mixing water with the combined components.

Still another object of the invention is to provide an oil emulsion prepared according to the above process for preparing an oil emulsion.

Yet another object of the invention is to provide an oil emulsion which includes an oil; a base; the polymeric product; and water.

Preferred processes for preparing emulsions, emulsion compositions, processes for preparing dispersions, and dispersion compositions optionally include a conventional surfactant, preferably an anionic or non-ionic surfactant, in an amount up to about 10 percent by weight based on the total weight of solids.

Still another object of the invention is to provide a process for improving the viscosity profile of an aqueous pigment dispersion which includes adding the polymeric product of the continuous bulk polymerization and esterification process to an aqueous pigment dispersion.

A still further object of the invention is to provide an aqueous pigment dispersion with an improved viscosity profile that includes an aqueous pigment dispersion; and the polymeric product.

Yet another object of the invention is to provide a process for increasing the total solids concentration of an aqueous coating which includes adding the polymeric product of the continuous bulk polymerization and esterification process to an aqueous coating.

A still further object of the invention is to provide an aqueous coating having an increase in total solids which includes an aqueous coating; and the polymeric product.

Another object of the invention is to provide a process for stabilizing a compound in an aqueous medium which includes providing a resin melt of the polymeric product of the continuous bulk polymerization and esterification process in a reactor operating at or above atmospheric pressure; charging the reactor with a base and water; dispersing an oil or a wax into the resin melt; and charging additional water into the reactor.

In preferred processes and compositions, the base is ammonia, diethylaminoethanol, morpholine, sodium hydroxide, potassium hydroxide or mixtures of these.

Another object of the invention is to provide a stabilized compound prepared according to the above process.

Another object of the invention is to provide a polymeric surfactant which includes at least one ethylenically unsaturated acid-functional monomer which has been radically incorporated into the polymeric surfactant and at least one ester of the incorporated ethylenically unsaturated acid-functional monomer having an R alkyl group. The R group is a linear or branched chain alkyl moiety having greater than 11 carbon atoms, and the molar critical micelle concentration of the neutralized aqueous polymeric surfactant is less than $1.0 \times 10^{-2}$ moles/liter.

Another object of the invention is to provide a polymeric surfactant which includes at least one ethylenically unsaturated acid-functional monomer which has been radically incorporated into the polymeric surfactant and at least one ester of the incorporated ethylenically unsaturated acid-functional monomer having an R alkyl group. The R group is a linear or branched chain alkyl moiety having greater than 11 carbon atoms, and a 2 percent neutralized aqueous solution of the polymeric surfactant has a surface tension of less than 45 mN/m at 30° C. and undergoes a decrease in surface tension of at least 5 mN/m as the temperature of the solution warms from 30° C. to 50° C.

In preferred embodiments, the surface area per molecule of the polymeric surfactant is less than 36 Å$^2$. In other preferred embodiments, the molar critical micelle concentration of the polymeric surfactant is less than $8.2 \times 10^{-3}$ moles/liter, and in even more preferred embodiments, the molar critical micelle concentration is less than $1.0 \times 10^{-3}$ moles/liter. In still other preferred embodiments, the polymeric surfactant further includes at least one vinyl aromatic monomer incorporated into the polymeric surfactant, and in more preferred embodiments at least two vinyl aromatic monomers are incorporated into the polymeric surfactant.

Still another object of the invention is to provide a barrier coating that includes a polymeric product according to the invention, an emulsion polymer, and a paraffin wax emulsion. In preferred embodiments, the barrier coating has a water vapor transmission of less than 6, more preferably less than 3, grams per 100 square inches per 24 hours at 90 percent relative humidity and 37.8° C.

Still further objects, features, and advantages of the invention will be apparent from the following detailed description when taken in conjunction with the drawings.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF THE INVENTION

Figure 1:
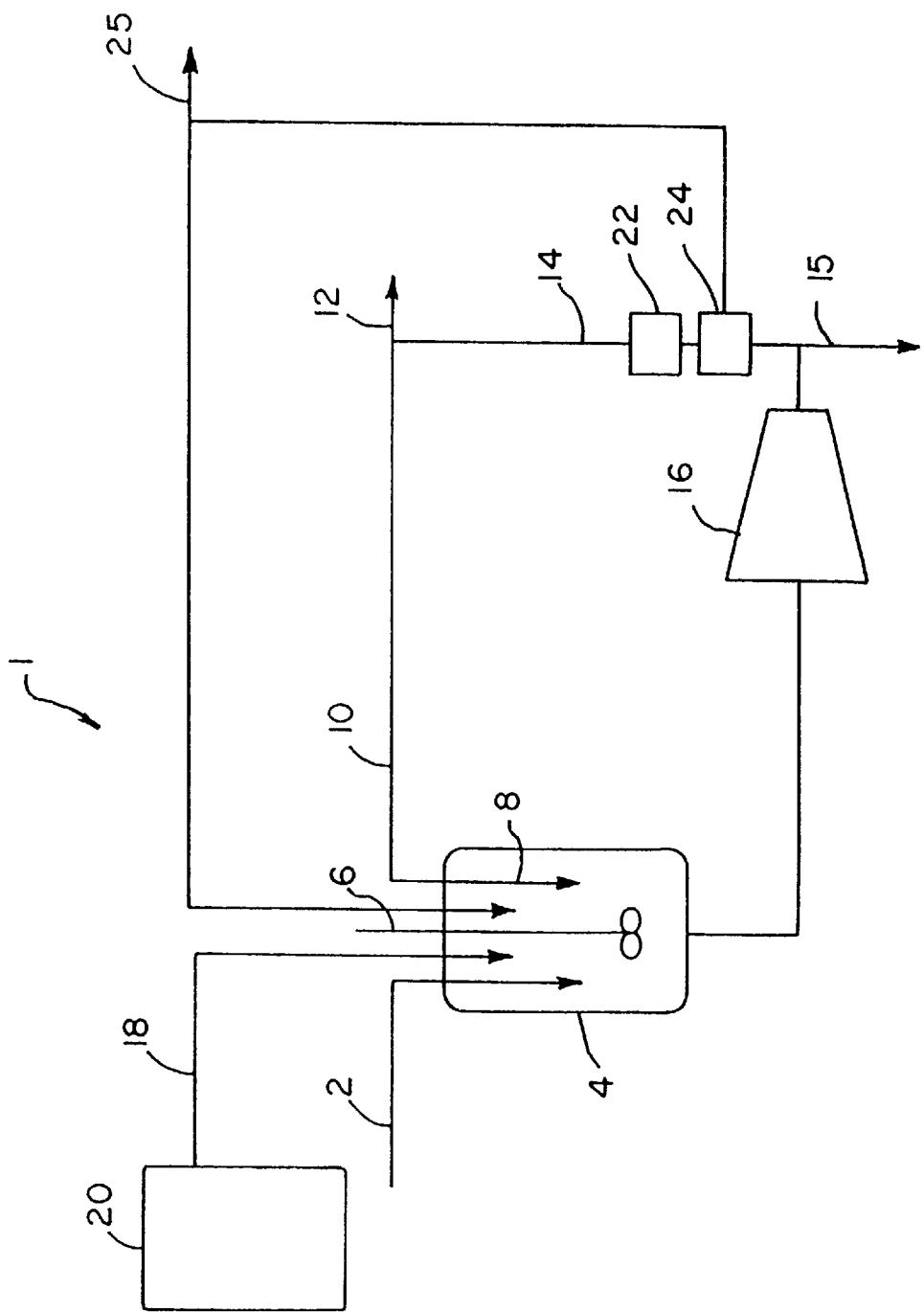
FIG. 1 is a schematic diagram of a portion of a polymer production line of the present invention.

The process of the present invention combines polymerization and esterification reactions in a reaction zone. The continuous polymerization and esterification process includes continuously charging into a reaction zone at least one ethylenically unsaturated acid-functional monomer and at least one alkanol; maintaining a flow rate through the reaction zone sufficient to provide an average residence time of the monomers in the reaction zone of less than 60 minutes; and maintaining a temperature in the reaction zone sufficient to provide a polymeric product.

The term "low viscosity" is hereby defined as a polymeric product which exhibits an aqueous solution viscosity which is less than about 50 percent of the aqueous solution viscosity of the equivalent unmodified polymeric product at identical concentrations. The term "equivalent unmodified polymeric product" is hereby defined as a composition having about the same $M_n$ and acid number which is prepared in an identical fashion as the polymeric product except that no alkanol is incorporated into the composition. The term "continuous" is herein defined as a process wherein a reactant, such as an alkanol and/or an ethylenically unsaturated acid-functional monomer, is fed into a reactor while a polymeric product is removed simultaneously during at least part of the reaction process.

The continuous bulk polymerization and esterification process includes continuously charging into a reaction zone at least one ethylenically unsaturated acid-functional monomer although a mixture of one or more ethylenically unsaturated acid-functional monomers may be used in the process. The ethylenically unsaturated acid-functional monomer is an $\alpha,\beta$-unsaturated carboxylic acid such as, but not limited to, acrylic acid, methacrylic acid, and crotonic acid.

The continuous bulk polymerization and esterification process also includes continuously charging at least one alkanol into the reaction zone although a mixture of one or more alkanols may be used in the process. The terms "alkanol" or "ROH" as used herein refer to both saturated and unsaturated alcohols, and the term "R" refers to both unsaturated and saturated alkyl groups. The alkanol used in the process may be represented by the formula ROH where R is a linear or branched chain, or combinations thereof, alkyl moiety having greater than 11 carbon atoms. Preferably, the alkanol contains from 12 to 50 carbon atoms and all combinations and subcombinations and ranges contained therein. More preferably, the alkanol contains from 12 to 36 carbon atoms. In an even more preferred embodiment, the alkanol contains from 12 to 22 carbon atoms. In most preferred processes, the alkanol has 16 to 18 carbon atoms. Examples of primary alkanols for use in the process include, but are not limited to, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-docosanol, 1-tetracosanol, 1-hexacosanol, 1-octacosanol, 1-triacontanol, 1-tetracontanol, 1-pentacontanol, and other similar primary alkanols. Longer chain alcohols such as those sold under the trademark Unilin™ 350, 425, 550, and 700 available from Baker-Petrolite, Inc. (Tulsa, Okla.), may also be used in the present invention as may alkanols containing sites of unsaturation such as, but not limited to oleyl alcohol, a C18 alcohol available from Jarchem Industries (Newark, N.J.). Among others, commercial manufacturers of alcohols for use in the present invention include Condea Vista (Houston, Tex.), Ashland Chemical, Inc. (Columbus, Ohio), Witco Corp. (Greenwich, Conn.), and Henkel Corp. (Cincinnati, Ohio). Moreover, in preferred processes, a mixture of two, three or more alcohols may be continuously charged into the reaction zone according to the present invention. A preferred mixture of alcohols have linear or branched chain R groups of from 16 to 18 carbon atoms.

Other monomers are preferably used in the current process. For example additional monomers such as aromatic ethylenically unsaturated monomers, which include, but are not limited to, alkyl acrylates and alkyl methacrylates, and non-aromatic ethylenically unsaturated vinyl monomers may be charged into the reaction zone in the continuous bulk polymerization and esterification process. Additionally, mixtures of these monomers may be used.

Aromatic ethylenically unsaturated monomers that may be used in the process are styrenic monomers that include, but are not limited to, styrene, $\alpha$-methylstyrene, vinyl toluene, p-methylstyrene, t-butylstyrene, o-chlorostyrene, vinyl pyridine, and mixtures of these species. Preferred ethylenically unsaturated monomers for use in the process include styrene and $\alpha$-methyl-styrene. In preferred embodiments, at least two different aromatic ethylenically unsaturated monomers are continuously charged into the reaction zone in addition to the ethylenically unsaturated acid-functional monomer and alkanol. Preferably, the two different aromatic ethylenically unsaturated monomers added to the reaction zone include styrene and $\alpha$-methylstyrene, preferably in a ratio of from 1:2 to 2:1, such that a polymeric product is formed which includes residues of styrene, $\alpha$-methylstyrene, and an ethylenically unsaturated acid-functional monomer such as acrylic acid, methacrylic acid, or crotonic acid where the residues of the ethylenically unsaturated acid-functional monomer are present either as the carboxylic acid or the ester formed during the polymerization and esterification process. A preferred monomer charge in the polymerization and esterification process employs from about 60–80 percent by weight of an aromatic ethylenically unsaturated monomer and 40–20 percent by weight of an ethylenically unsaturated acid-functional monomer, such as acrylic acid. Other preferred processes wherein at least one aromatic ethylenically unsaturated monomer is charged into the reaction zone produce a polymeric product having an $M_n$ from 700 to 5000 and an acid number from 140 to 300.

In addition to the ethylenically unsaturated acid-functional monomer and the alkanol, other preferred polymerization and esterification processes include charging into the reaction zone at least one aromatic ethylenically unsaturated monomer and at least one acrylate or methacrylate monomer.

Another type of monomer that may be added to the reaction zone in the process is an alkyl acrylate or alkyl methacrylate monomer. Monomers of this type include typical alkyl acrylates and methacrylates and functional acrylates and methacrylates. Functional acrylates and methacrylates include at least one functional group in addition to the ester and alkene functionalities. A non-exhaustive list of exemplary alkyl acrylates and methacrylates includes methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, n-hexyl acrylate, 2-ethylbutyl acrylate, 2-ethylhexyl acrylate, n-octyl acrylate, n-decyl acrylate, cyclopentyl acrylate, cyclohexyl acrylate, benzyl acrylate, phenyl acrylate, cinnamyl acrylate, 2-phenylethyl acrylate, allyl acrylate, methallyl acrylate, propargyl acrylate, crotyl acrylate, 2-hydroxyethyl acrylate, 2-hydroxypropyl acrylate, 2-hydroxybutyl acrylate, 6-hydroxyhexyl acrylate, 5,6-dihydroxyhexyl acrylate, 2-methoxybutyl acrylate, 3-methoxybutyl acrylate, 2-ethoxyethyl acrylate, 2-butoxyethyl acrylate, 2-phenoxyethyl acrylate, glycidyl acrylate, furfuryl acrylate, tetrahydrofurfuryl acrylate, tetrahydropyryl acrylate, N,N-dimethylaminoethyl acrylate, N,N-diethylaminoethyl acrylate, N-butylaminoethyl acrylate, 2-chloroethyl acrylate, 3-chloro-2-hydroxypropyl acrylate, trifluoroethyl acrylate, hexafluoroisopropyl acrylate, 2-nitro-2-methylpropyl acrylate, 2-sulfoethyl acrylate, methyl α-chloroacrylate, methyl α-cyanoacrylate, and the corresponding methacrylates.

Preferred alkyl acrylates and methacrylates for use in the continuous bulk polymerization and esterification process include alkyl groups having from 1 to 8 carbon atoms in the alkyl group attached to the non-carbonyl oxygen atom of the alkyl acrylate or methacrylates. Examples of such compounds include methyl, ethyl, propyl, butyl, i-butyl, i-amyl, 2-ethylhexyl, and octyl acrylates and methacrylates. Other preferred alkyl acrylates and methacrylates for use in the polymerization and esterification process include acrylates and methacrylates having an OR group where R has the same characteristics as it does in the alkanol of the present invention, i.e., R is a linear or branched alkyl moiety having greater than 11 carbon atoms, preferably 12 to 50, more preferably 12 to 36, even more preferably 12 to 22, and most preferably 16 to 18 carbon atoms.

Monomers that contain functional groups such as, but not limited to, amino, isocyanate, and epoxy groups, which are capable of reacting with either the alkanol or the ethylenically unsaturated acid-functional monomer of the invention should preferably not be used in the process.

Non-aromatic ethylenically unsaturated monomers may also be added to the reaction zone in the continuous bulk polymerization and esterification process. Examples of such monomers include vinyl esters and also vinyl acetate, maleic acid, vinyl pyrrolidone, and maleic anhydride. Other non-aromatic ethylenically unsaturated monomers that may be added to the reaction zone are related to the above-described esters of acrylic and methacrylic acid. These include amides of acrylic and methacrylic acid, nitriles, and aldehydes. Examples of suitable amides include acrylamide, N-ethyl acrylamide, N,N-diethyl acrylamide, N-methyl acrylamide, N,N-dimethyl acrylamide, N-phenyl acrylamide, and the corresponding methacrylamides. Examples of suitable nitriles and aldehydes include acrylonitrile, acrolein, methacrylonitrile, and methacrolein.

Preferred monomer charges in the continuous bulk polymerization and esterification process include comonomers, termonomers, and tetramonomers. Examples of preferred comonomers include styrene and acrylic acid; styrene and methacrylic acid; vinyltoluene and acrylic acid; and 2-ethylhexyl acrylate and acrylic acid. Examples of preferred termonomers include styrene, α-methylstyrene, and acrylic acid; styrene, n-butyl acrylate and acrylic acid; styrene, n-butyl methacrylate and acrylic acid; and styrene, methyl methacrylate and acrylic acid. Examples of preferred tetramonomers include styrene, butyl acrylate, methyl methacrylate, and methacrylic acid; styrene, n-butyl acrylate, ethylacrylate and acrylic acid; and styrene, α-methyl styrene, n-butyl acrylate and acrylic acid.

In preferred processes where both an aromatic ethylenically unsaturated monomer and an alkyl acrylate or methacrylate are charged into the reaction zone, the weight ratio of the aromatic ethylenically unsaturated monomer to the alkyl acrylate or methacrylate preferably ranges from 2:1 to 1:2.

Although no initiator is required in the radically-initiated continuous bulk polymerization and esterification process, an initiator may be added to the reaction zone. The initiators suitable for carrying out the continuous bulk polymerization and esterification process are compounds which decompose thermally into radicals in a first order reaction. Suitable initiators preferably have half-life periods in the radical decomposition process of about 1 hour at 90° C. and more preferably 10 hours at 100° C. Others with about 10 hour half-lives at temperatures significantly lower than 100° C. may also be used. Suitable initiators include, for example, aliphatic azo compounds, peroxides, peresters, and hydroperoxides such as 1-t-amylazo-1-cyanocyclohexane, azo-bis-isobutyronitrile, 1-t-butylazo-1-cyanocyclohexane, t-butylperoctoate, t-butyl perbenzoate, dicumyl peroxide, di-t-butyl peroxide, cumene hydroperoxide, t-butyl hydroperoxide and the like. The particular initiator is not critical so long as the initiator will generate free radicals. However, di-t-butyl peroxide is a preferred initiator in the polymerization and esterification process.

It has been found that when the molar ratio of initiator to monomer charge is at least about 0.0005:1, it is possible to reduce reaction temperature to improve purity, color, conversion and ease processing conditions, while maintaining or improving low molecular weight and molecular weight distribution.

Use of excess initiator is costly and does not significantly improve either the properties of the resulting polymer nor the reaction conditions sufficiently, to normally justify its use. Accordingly, in general, a mole ratio no greater than about 0.04:1 of initiator to total monomers charged need be employed. If desired, a somewhat higher ratio may be employed, under certain circumstances, usually up to about 0.06:1, to provide another means to reduce the molecular weight and improve distribution of the resulting product. However, best conversion and weight distribution is usually achieved with the mole ratio at 0.0005:1 to 0.04:1. It is believed that the present reaction is primarily thermally initiated, with the minor amounts of initiator utilized cooperating to permit reduced reaction temperatures and improving conversion and distribution characteristics. Therefore, sufficient amounts of initiator are employed for this purpose. For industrial purposes a molar ratio of about 0.005:1 to 0.015:1 of initiator to monomers is most preferably used.

The initiator is preferably added simultaneously with the monomer or monomers. Thus, if an initiator is employed, it is either mixed with the monomer feed or added to the reaction zone as a separate feed. Initiator levels are an important consideration in the process of this invention.

The temperature in the reaction zone of the continuous bulk esterification and polymerization process is generally maintained at greater than about 150° C. or a temperature sufficient to produce a polymeric product such that the polymeric product of the bulk polymerization and esterification process incorporates at least 80 percent of the alkanol as an ester of the ethylenically unsaturated acid-functional monomer when the alkanol is present in the reaction zone in an average amount of at least up to 25 mole percent of the total moles of the ethylenically unsaturated monomers. More preferably, the polymeric product of the continuous bulk polymerization and esterification process incorporates at least 85 percent of the alkanol as an ester of the ethylenically unsaturated acid-functional monomer when the alkanol is present in the reaction zone in an average amount of at least up to 20 mole percent of the total moles of the ethylenically unsaturated monomers. Most preferably, the polymeric product of the continuous bulk polymerization and esterification process incorporates at least 90 percent of the alkanol as an ester of the ethylenically unsaturated acid-functional monomer when the alkanol is present in the reaction zone in an average amount of at least up to 15 mole percent of the total moles of the ethylenically unsaturated monomers.

In general, for these and other purposes, the reaction temperature is preferably maintained at from about 180° C. to about 275° C. and to all combinations and subcombinations within this range. At temperatures below about 180° C., the polymer product tends to exhibit a higher molecular weight and broader molecular weight distribution than is generally acceptable for high solids applications, unless excessive solvent addition is employed. The reaction conversion rate is reduced and higher molecular weight fractions are also increased. The product tends to become unduly viscous for efficient processing and high solids products cannot be obtained readily. At reaction temperatures from about 180° C. to about 215° C., it is often useful to employ a solvent to increase the uniformity of the product, obtain fewer chromophores, and reduce viscosity. If desired, the amount of initiator employed may be increased in accordance with the invention to improve reaction parameters and enhance product properties. In more preferred processes, reaction temperatures are maintained from about 215° C. to about 275° C. and to all combinations and subcombinations within this range such as from about 215° C. to about 270° C. or from about 230° C. to about 275° C.

Although higher reaction temperatures may be employed, at temperatures above about 310° C., the temperature can have adverse effects on the product of the continuous polymerization and esterification process, such as excessive chromophore production. Excess temperature may also result in excessive equipment maintenance.

In general, the reaction time or residence time in the reaction zone is controlled by the rate of flow of constituents through the reaction system. The residence time is inversely proportional to flow rate. It has been found that at a given temperature, the molecular weight of the polymer product decreases as the residence time increases.

In accordance with these factors, it is therefore preferred to utilize reaction average residence times of at least 1 minute to provide satisfactory reaction completion in the bulk polymerization and esterification process. Often this lower limit is controlled by polymerization heat removal or the difficulty in achieving steady-state reaction conditions. While the residence time in the reaction zone may be longer than 1 hour at lower reaction temperatures, normally discoloring reactions and other side reactions will dictate that residence times shorter than 1 hour be employed. For most cases, preferred average residence times of from about 1 to 30 minutes and, more preferably, from 1 to 20 minutes are employed.

In general, longer residence times may increase the yield of product, but the rate of increase of product yield is generally very slow after about 30 minutes of reaction. More importantly, after about 30 minutes, depolymerization tends to occur with formation of undesired chromophores and by-products. However, the particular flow rate selected will depend upon the reaction temperature, constituents, and desired molecular weight of product. Thus, for best results, to produce a given resin with a desired $M_n$ and $M_w$ with low residual monomer, the reaction temperature and residence times are mutually manipulated.

Other processes to produce these product include multiple reactor configurations in which one or more subsequent reactors are utilized in series. In particular, any situation in which it is desired to raise the conversion of the alkanol or the monomer, it is appropriate to configure a subsequent reactor (as the primary) in the process. Any appropriate reactor(s) could be used subsequent to the primary reactor such as a tube reactor (usually fitted with a static mixer), a CSTR, an extruder reactor, a loop reactor, or any reactor type in which the reaction can proceed in a continuous manner. Additionally, although less preferred, the subsequent reactor (s) could be a batch reactor whereby the product from the continuous reactor is fed into a batch reactor where the mixture is held for further reaction to occur. The temperature of the subsequent reactor(s) would be maintained at about 180° C. to about 270° C. (not necessarily the same reactor) with a residence time of 1–60 minutes, however, longer residence times can be used.

Although no solvent is required in the continuous bulk polymerization and esterification process, a solvent may be added to the reaction zone. If desired, from about 0 to about 25 percent and preferably from 0 to about 15 percent of reaction solvent is employed based on the weight of monomers. The solvent, when employed, is added to the reaction zone with the monomer feed or is added to the reaction as a separate feed. The selection of a particular solvent and its level of addition is made based on the monomers selected, solubility considerations, suitability to reaction conditions, and the desired applications for the polymer produced. In general, it is preferred to use as little solvent as possible to reduce separation and recovery requirements and minimize formation of contaminants.

In general, the use of a solvent permits a lower reaction temperature to be employed, reduces the solution viscosity of the molten polymer product, acts as a heat sink to prevent run-away reactions and reduce cooling requirements, assists in plasticizing the polymer product, may reduce the acid number if the solvent esterifies with the resin, and may reduce the molecular weight of the resulting polymeric product.

Most conventional polymerization or reaction solvents may be utilized in the continuous bulk polymerization process to prepare lower molecular weight polymers. The higher boiling solvents are preferred due to their low pressure at high temperatures. In general, preferred solvents have a boiling point above 100° C., more preferably above 150° C. Examples of higher boiling solvents include the aromatic alcohols, such as benzyl alcohol, the toluene alcohols and the like; the alcohol and glycol ethers, esters and mixed ethers and esters, such as diethylene glycol, Cellosolve™ (a brand of solvent available from the Union Carbide Corporation (Danbury, Conn.)), butyl Cellosolve, Cellosolve acetate, the Carbitols™ (a brand of solvent available from the Union Carbide Corporation (Danbury, Conn.)), the (poly) alkylene glycol dialkyl ethers and the like. However, lower boiling point solvents including, but not limited to, isopropyl alcohol and acetone may be used in the process.

In addition, if there is minimal reaction, some glycols may also be utilized as the reaction solvent including ethylene, propylene and butylene glycols and their various polyether analogs. The aliphatic alcohols, such as hexanol and decanol, can also be used. Although other alcohols may be used as solvents, care should be taken to avoid choosing solvents which react more readily with the ethylenically unsaturated acid-functional monomer than does the alkanol of the process or the desired level of alkanol incorporation into the polymer may not be obtained due to the competing reaction between the solvent and the ethylenically unsaturated acid-functional monomer. Further, various hydrocarbon fractions may be utilized, the most preferred being Aromatic 150, Aromatic 100, or Isopar solvents all available from the Exxon Chemical Company (Houston, Tex.). Aromatic solvents can also be employed, for example, toluene, xylene, cumene, and ethyl benzene.

Although no catalyst is required in the continuous bulk polymerization and esterification process, optionally, a catalyst is added to the reaction components in the reaction zone. In preferred processes, however, no catalyst is used. When a catalyst is employed, the catalyst is selected from the group consisting of an esterification catalyst and a transesterification catalyst. For example, a catalyst such as p-toluenesulfonic acid may be added to the reaction zone to increase the rate of reaction between the alkanol and carboxylic acid functionality on the ethylenically unsaturated acid-functional monomer or the residue of the monomer in the polymeric chain during the polymerization reaction.

It is not necessary to add a chain transfer agent to the continuous bulk polymerization and esterification process. However, if desired, any standard chain transfer agent known to those skilled in the art may be added to the reaction zone. Examples of some typical chain transfer agents include, but are not limited to, bromotrichloromethane and isooctyl β-mercaptopropionate. Benzyl alcohols and secondary alcohols such as, but not limited to isopropyl alcohol, are also good chain transfer agents. If added, a chain transfer agent is preferably used in an amount up to about 2 mole percent.

Continuous polymerization methodologies are well known in the art. The radical polymerization processes described in U.S. Pat. No. 4,414,370, U.S. Pat. No. 4,529,787, and U.S. Pat. No. 4,546,160 may be used in conjunction with the reactants described herein. These patents describe continuous polymerization processes for polymerizing vinylic monomers including acrylic monomers and mixtures of acrylic monomers with aromatic ethylenically unsaturated monomers. Thus, U.S. Pat. No. 4,414,370, U.S. Pat. No. 4,529,787, and U.S. Pat. No. 4,546,160 are herein expressly incorporated by reference in their entirety.

The process of the present invention may be conducted using any type of reactor well-known in the art, preferably in a continuous configuration. Such reactors include, but are not limited to, continuous stirred tank reactors ("CSTRs"), tube reactors, loop reactors, extruder reactors, or any reactor suitable for continuous operation. Additionally, one or more reactors, in any combination such as in parallel, in series, or both, may be used in the current process.

In one preferred embodiment, the reaction zone of the continuous bulk polymerization and esterification process generally comprises a CSTR of any type adapted for variable fillage operation of from as low as 10% to as much as 100% of the usable volume thereof for the production of esterified polymers. The CSTR generally used in the process may be either horizontal or vertical and should have provision for close control of the temperature therein by any desired means, including control by a cooling jacket, internal cooling coils or by withdrawal of vaporized monomer and alkanol followed by condensation thereof and return of the condensed reactants to the reaction zone.

A preferred form of CSTR which has been found suitable for carrying out the process is a tank reactor provided with cooling coils sufficient to remove any heat of polymerization not taken up by raising the temperature of the continuously charged monomer composition so as to maintain a preselected temperature for polymerization therein. Preferably such a CSTR will be provided with at least one and usually more, vane agitators to provide a well-mixed reaction zone.

In operating the present continuous bulk, polymerization process, flexibility and range of choice may be realized in the types of polymer produced and the production rate of the polymer by proper choice of polymerization reaction conditions. In operation, at least one ethylenically unsaturated acid-functional monomer and at least one alkanol are continuously charged to the reactor and maintained at the desired temperature. The reactor is generally charged from a stirred feed tank which contains the mixed reactants. However, the monomer or monomers and alkanol may also be individually charged into the reactor.

After initially filling the reactor to the desired level and initiating the polymerization and esterification of the charged reactants, the volume of reactant composition charged into the reactor is adjusted to maintain a desired level of reactant and polymeric product mixture in the reactor. Thereafter, the liquid mixture of polymer and unreacted monomer or monomers and alkanol is withdrawn from the reactor at a rate to maintain the desired level in the reaction zone. Polymerization conditions are maintained in the reactor to produce a polymer of selected molecular weight percent solids of polymer in such liquid mixture.

As noted, the level that the reactor is filled can vary from as low as 10% to as high as 100% of the usable volume and may be controlled by any desired means, for example, a level controller associated with a valve or pump in the transfer line from the reactor.

Any desired means of controlling the temperature within the reactor may be employed. It is preferred that the temperature be controlled by circulation of a cooling fluid, such as oil, through internal cooling coils in reactors so equipped. Generally, the entry of relatively cool reactants serves to remove the greatest proportion of the heat of polymerization released, and the internal cooling coils serve to remove the remainder so as to maintain the temperature of the reaction mixture at a preselected value. Thus, a polymer is produced that has the desired degree of alkanol incorporation and molecular weight distribution.

After reaction, the resulting mixture is typically subjected to separation and product recovery. Unreacted monomer and alkanol is preferably recycled to the reaction zone or the monomer feed. During the separation step, volatile components, such as solvent and other by-products are vaporized and recycled, where appropriate. For this step, conventional equipment is readily available, such as a thin film evaporator, falling strand evaporator or any appropriate devolatization equipment.

One non-limiting methodology of conducting the present process according to the present invention will be described with respect to FIG. 1. FIG. 1 is a schematic diagram of a portion of an exemplary polymer process line 1 using a CSTR. Fresh monomer feed 2 conveys the monomer or monomers of the present invention into CSTR 4 having agitator 6. CSTR 4 provides the proper choice of reaction conditions for obtaining the desired types of polymers. The polymeric product of the reaction is then fed from CSTR 4 to devolatizer 16 for devolatization. The polymer product is fed by way of conduit 15 for additional processing, or as a final product as desired. Condensed distillate is fed by way of conduits 14 and 10 to recycle feed 8 back into CSTR 4 and/or purged by way of purge 12 as desired. Preferably, a separate feed 18 of molten alkanol is provided into CSTR 4. In this preferred embodiment, a separate tank 20 preheats the alkanol to a molten state. Between condenser 22 and devolatizer 16 is optional partial condensing unit 24, that may be a heated unit. Condenser 24 splits out the higher boiling fractions of the distillate stream and optionally recycles it to CSTR 4 a portion of which can be purged via 25. Optionally, the condensate from 22 may be returned to CSTR 4 or purged via 12 from the reactor system. Optionally, condenser 24 may be replaced by an apparatus or system such as, but not limited to, membrane separation systems, distillation, and centrifugation.

Although CSTR 4 is depicted as a CSTR, reactor 4 also includes reactors capable of continuous, semi-batch, and batch processes although reactors capable of continuous polymerizations are highly preferred. Thus, reactor 4 may also be a tube reactor, a loop reactor, extruder, or any reactor capable of continuous operation.

Figure 2:
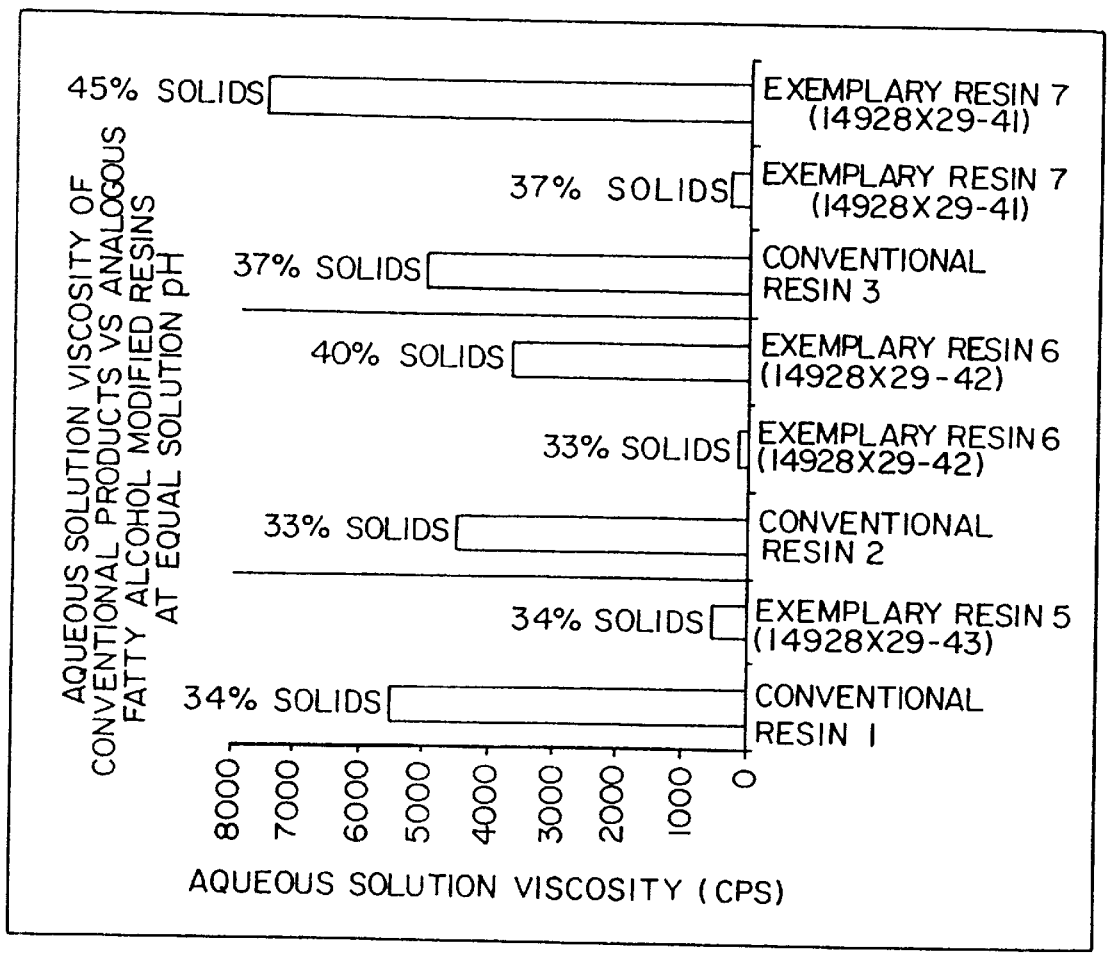
FIG. 2 is a graph of resin type versus cut viscosity at 25° C. for conventional and exemplary resins with pH ranging from 8.0 to 8.5.
Figure 3:
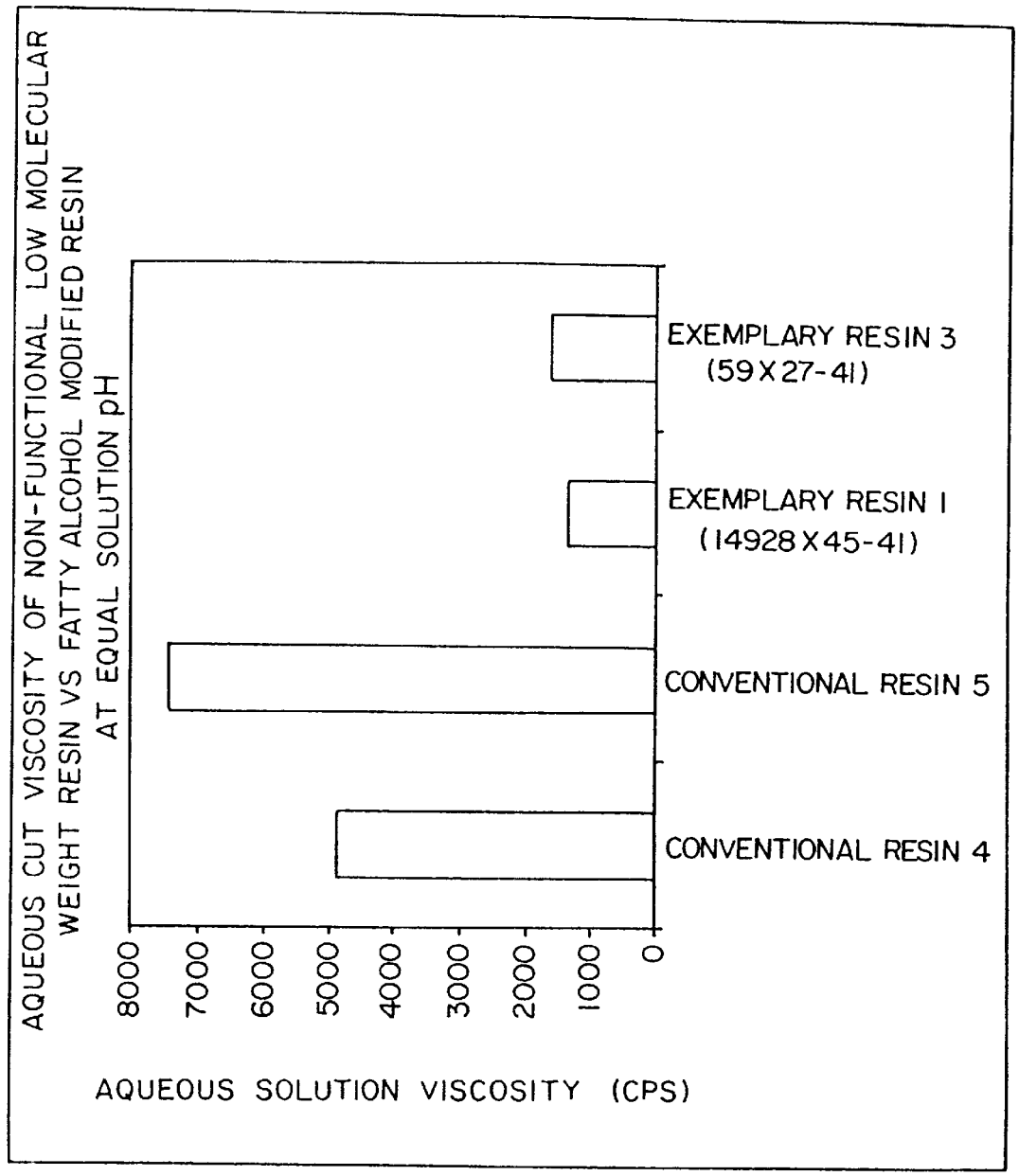
FIG. 3 is a graph of resin type versus cut viscosity at 25° C. for conventional and exemplary resins at approximately equal $M_w$ and acid number with pH ranging from 8.3 to 8.8.

As illustrated in FIGS. 2 and 3, the continuous polymerization and esterification process produces modified polymers that can be used in processes such as in preparing high solids, water-based compositions. As demonstrated in FIGS. 2 and 3, the polymeric products, also referred to as "resins", produced by the bulk polymerization and esterification process have a significantly lower viscosity than do conventional resins at the same percentages of solids in basic aqueous solution. The viscosities of various resins were compared using "resin cuts" which are defined as an aqueous solution or dispersion of a resin in an alkaline aqueous medium. The preparation of resin cuts is described in the following Examples. The unique low viscosity properties of the polymers produced by the continuous polymerization and esterification process, and the high degree of alkanol incorporation into the polymeric product allow production of unique compositions with improved characteristics. For example, the low viscosities of aqueous resin cuts of the polymer product allows for the production of compositions with higher quantities of the polymeric product as compared to conventional polymers because the increased viscosity associated with increasing the solids content is comparatively lower when the polymeric product of the present invention is employed.

Figure 4:
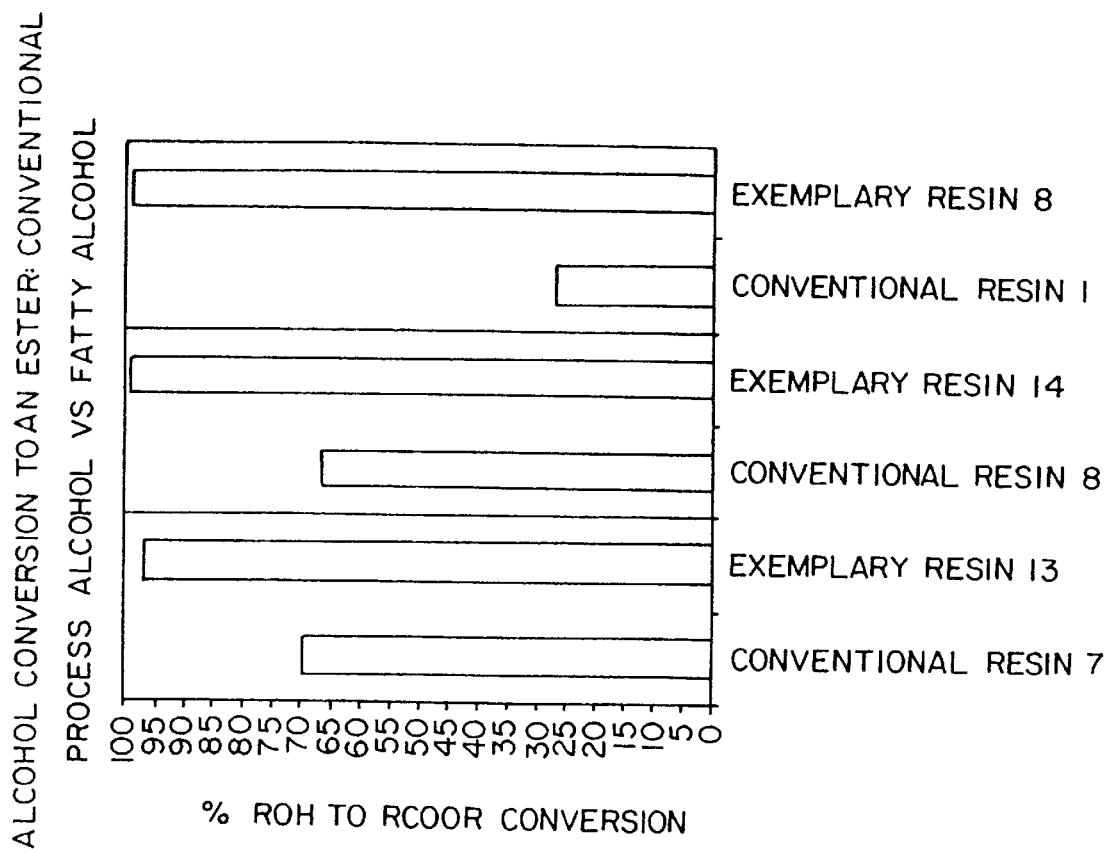
FIG. 4 is a graph comparing the conversion rates of aliphatic alkanols (1-tetradecanol and 1-docosanol) and diethylene glycol monoethyl ether to the corresponding esters in a radically-initiated polymerization of a monomer having an ethylenically unsaturated acid-functional group to obtain a modified polymers exhibiting low solution viscosity in an aqueous medium.

FIG. 4 illustrates the unexpectedly high rates obtained in the conversion of an alkanol to an ester using the continuous process of the present invention utilizing 1-tetradecanol and 1-docosanol as alkanols. The esterified polymer also exhibits the low solution viscosity in an aqueous medium exhibited by the polymeric product of the invention. Conventional Resin 7 was prepared using approximately 33.6 percent acrylic acid; 23 percent styrene; 27.1 percent α-methylstyrene; 7.5 percent xylene; 0.2 percent di-t-butyl peroxide; and 8.7 percent diethylene glycol monoethyl ether in a reactor at 216° C. Conventional Resin 8 was prepared using approximately 33.6 percent acrylic acid; 24.4 percent styrene; 28.7 percent α-methylstyrene; 7.5 percent xylene; 0.2 percent di-t-butyl peroxide; and 5.7 percent diethylene glycol monoethyl ether in a reactor at 216° C. Conventional Resin 1 was prepared using approximately 28.2 percent acrylic acid; 27.4 percent styrene; 30.5 percent α-methylstyrene; 0.2 percent di-t-butyl peroxide; and 13.8 percent diethylene glycol monoethyl ether in a reactor at 228° C. Exemplary Resin 13 was prepared using approximately 33.6 percent acrylic acid; 20.6 percent styrene; 24.3 percent α-methylstyrene; 7.5 percent xylene; 0.2 percent di-t-butyl peroxide; and 13.8 percent 1-tetradecanol in a reactor at 216° C. Exemplary Resin 14 was prepared using approximately 33.6 acrylic acid; 20.6 percent styrene; 24.3 percent α-methylstyrene; 7.5 percent xylene; 0.2 percent di-t-butyl peroxide; and 13.8 percent 1-docosanol in a reactor at 217° C. Exemplary Resin 8 was prepared using approximately 33.6 percent acrylic acid; 14.3 percent styrene; 16.8 percent α-methylstyrene; 7.5 percent xylene; 0.2 percent di-t-butyl peroxide; and 27.7 percent 1-docosanol in a reactor at 216° C. The continuous bulk esterification and polymerization process of the current invention produced unexpectedly high incorporation of the alkanol when compared to conventional systems in the relative weight percent conversion of acrylic acid monomer to acrylate in the polymeric composition.

Figure 5:
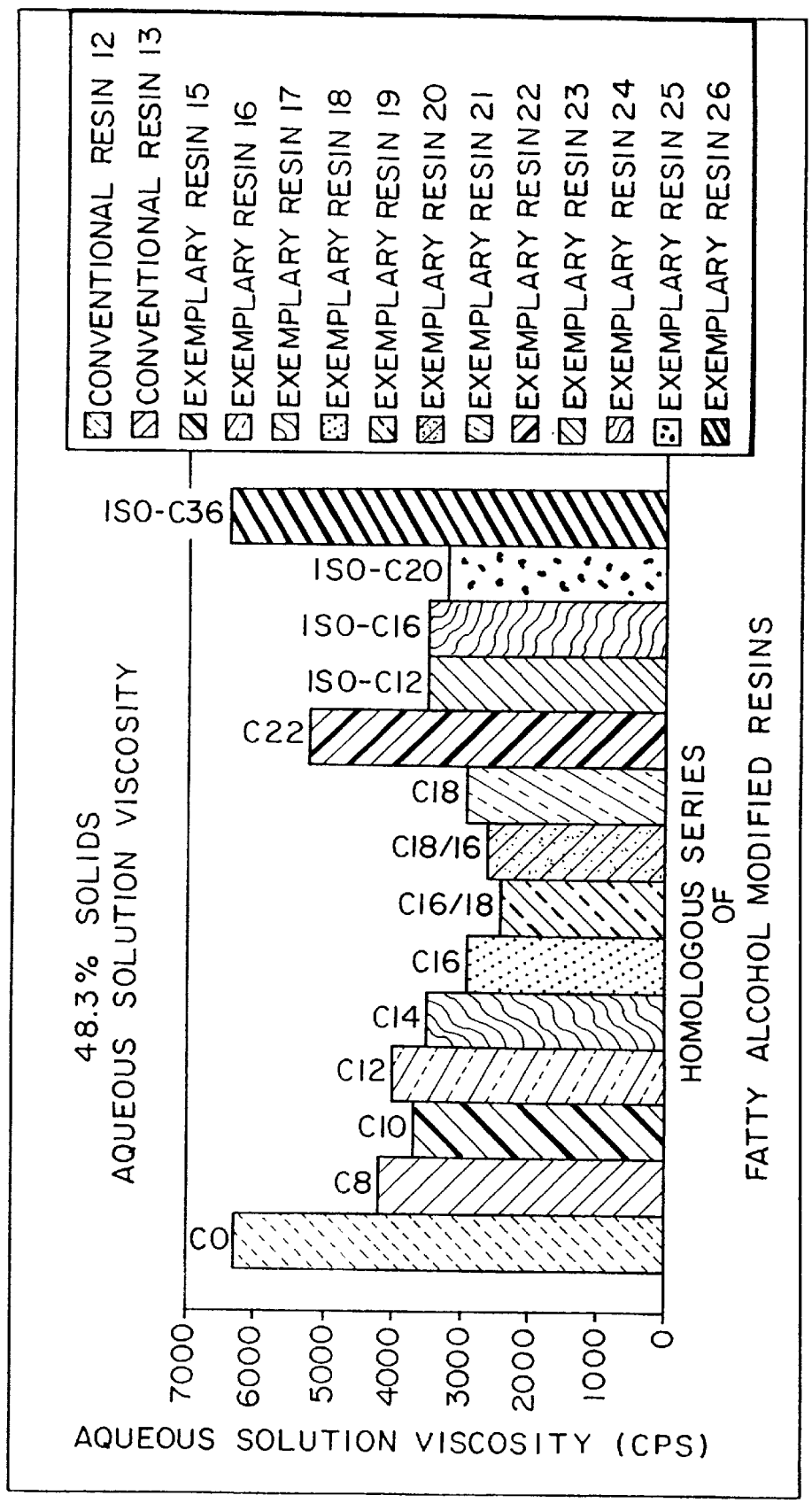
FIG. 5 is a graph illustrating the viscosity of various aqueous resin cuts at 25° C. and 48.3% solids content and the relationship between viscosity and the number of carbons in the alkanol.
Figure 6:
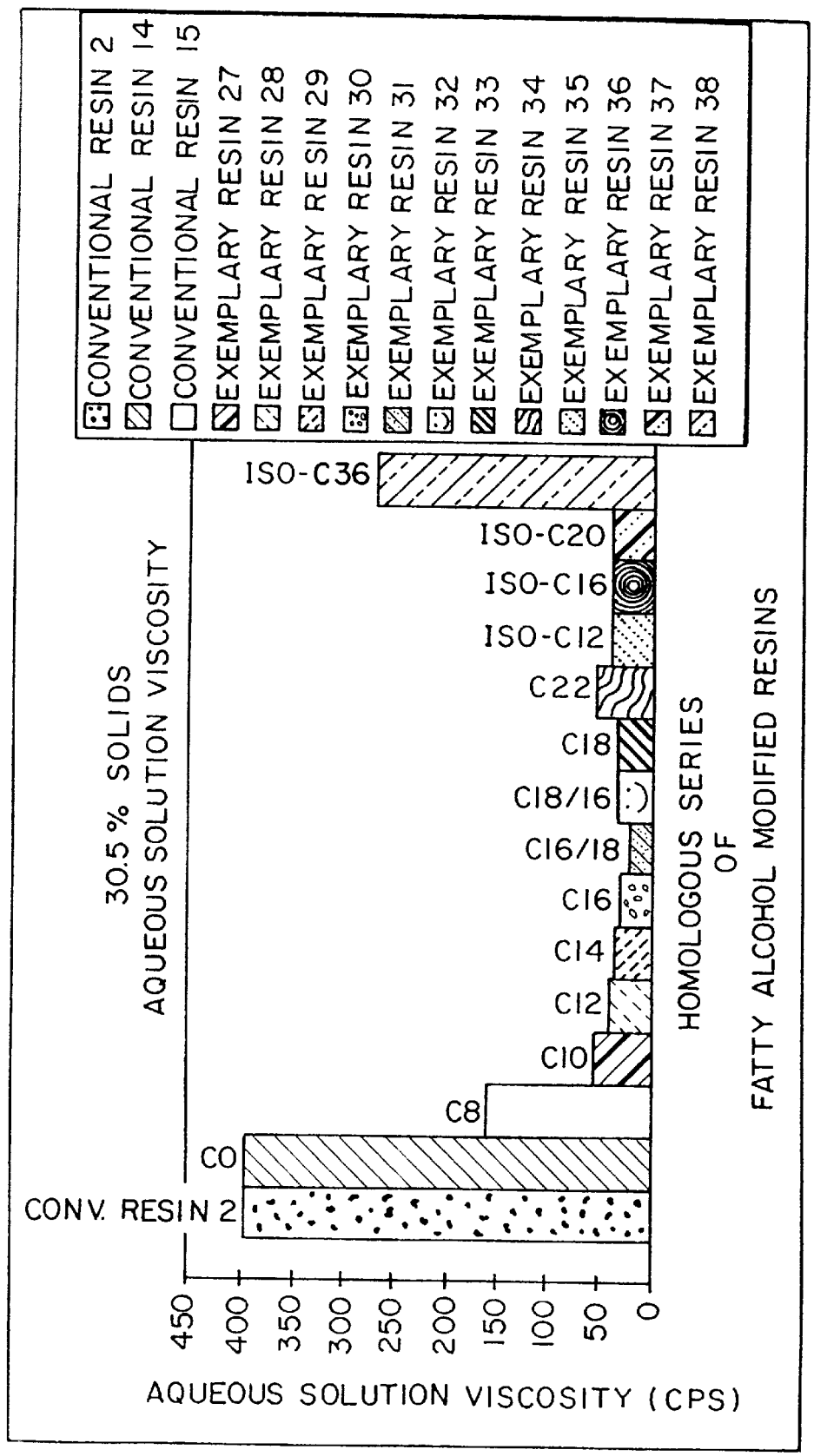
FIG. 6 is a graph illustrating the viscosity of various aqueous resin cuts at 25° C. and 30.5% solids content and the relationship between viscosity and the number of carbons in the alkanol.
Figure 7:
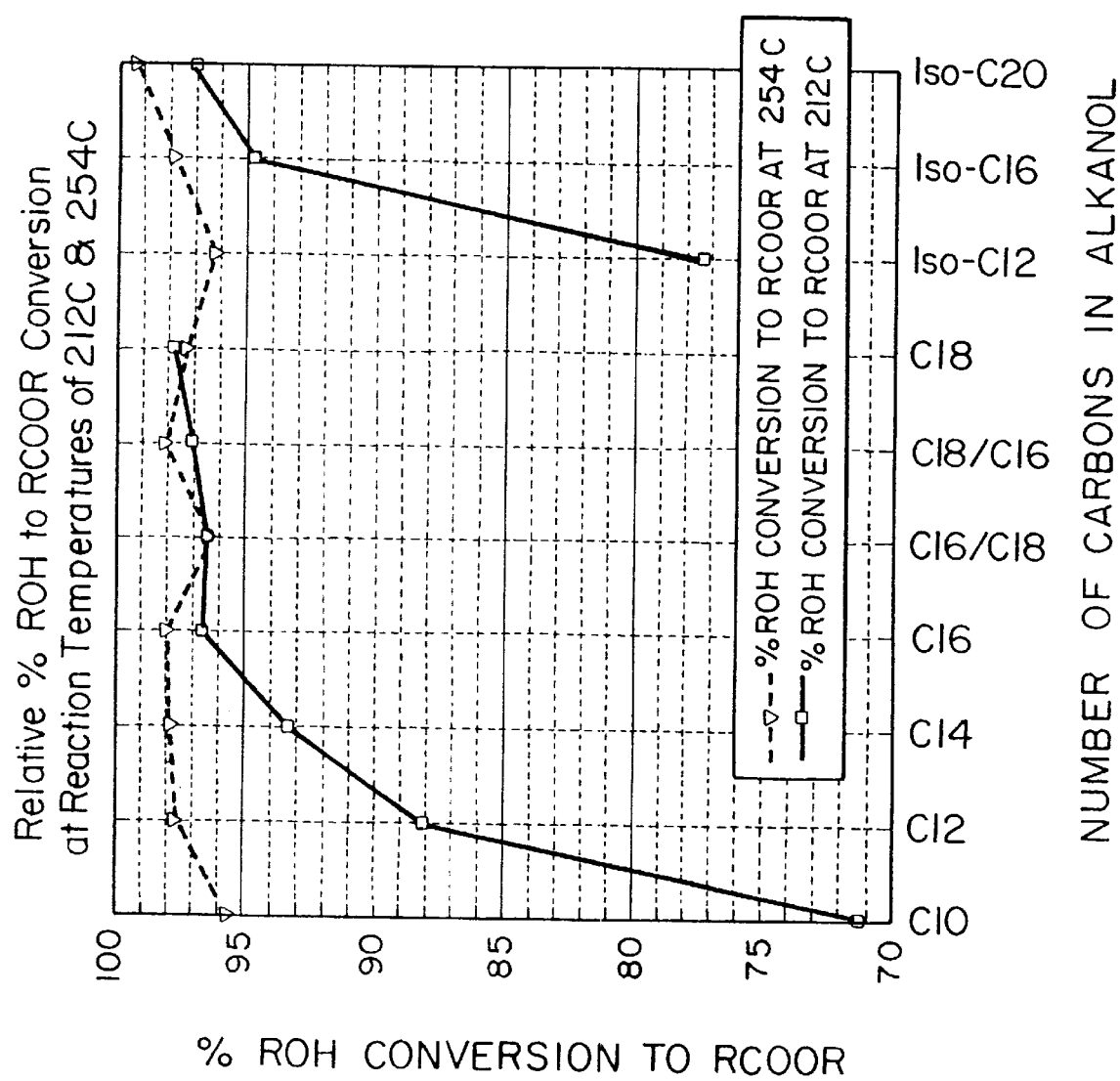
FIG. 7 is a graph illustrating the relative incorporation of various linear and branched chain alkanols at a constant temperature into a polymer formed by polymerizing an ethylenically unsaturated acid-functional monomer using the process of the present invention.

The number of the carbon atoms in the alkanol influences the viscosity of aqueous resin cuts prepared from polymeric products containing the alkanol as illustrated in FIGS. 5 and 6. The degree that the alkanol is incorporated into a polymer through esterification with the carboxylic acid functionality is also dependent upon the number of carbon atoms in the alkanol and the mixture of monomers as illustrated in FIG. 7 which shows the percent of alkanol incorporation occurring under similar reaction conditions.

As noted, the continuous bulk polymerization and esterification process produces a polymeric product with a high percentage of the alkanol incorporated into the polymer as an ester of the polymerized ethylenically unsaturated acid-functional monomer. Preferably, the polymeric product of the continuous bulk polymerization and esterification process incorporates at least 80 percent of the alkanol as an ester of the ethylenically unsaturated acid-functional monomer when the alkanol is present in the reaction zone in an average amount of at least up to 25 mole percent of the total moles of the ethylenically unsaturated monomers. More preferably, the polymeric product of the continuous bulk polymerization and esterification process incorporates at least 85 percent of the alkanol as an ester of the ethylenically unsaturated acid-functional monomer when the alkanol is present in the reaction zone in an average amount of at least up to 20 mole percent of the total moles of the ethylenically unsaturated monomers. Most preferably, the polymeric product of the continuous bulk polymerization and esterification process incorporates at least 90 percent of the alkanol as an ester of the ethylenically unsaturated acid-functional monomer when the alkanol is present in the reaction zone in an average amount of at least up to 15 mole percent of the total moles of the ethylenically unsaturated monomers.

The polymeric product of the polymerization and esterification reaction generally has an acid number ranging from about 10 to about 740, but preferably has an acid number from about 35 to about 400. Even more preferably, the polymeric product has an acid number ranging from about 65 to about 300. Generally, the polymeric product has a number average molecular weight ranging from 600 to 20,000 daltons.

Preferred polymeric products consist essentially of about 3 to about 97 percent, preferably 10 to 95 percent and all combinations and subcombinations contained therein, by weight of at least one incorporated ethylenically unsaturated acid-functional monomer, about 3 to about 97 percent, preferably 5 to 90-percent and all combinations and subcombinations contained therein, by weight of at least one ester of the incorporated ethylenically unsaturated acid-functional monomer having an —OR group, wherein the R group is a linear or branched chain alkyl moiety having greater than 11 carbon atoms; about 0 to about 85 percent by weight, or up to 85 percent by weight, of at least one incorporated aromatic ethylenically unsaturated monomer; and about 0 to about 85 percent by weight, or up to 85 percent by weight, of at least one incorporated non-aromatic ethylenically unsaturated vinyl monomer. In more preferred polymeric products, the R group of the ester of the incorporated acid-functional monomer has from 12 to 50, 12 to 36, 12 to 22, 16 to 18 carbon atoms, or mixtures of from 16 to 18 carbon atoms. Other preferred polymeric products contain at least one incorporated aromatic ethylenically unsaturated monomer or non-aromatic ethylenically unsaturated vinyl monomer and other preferred polymeric products include at least two aromatic ethylenically unsaturated monomers. Additionally, preferred polymeric products will comprise at least two different R alkyl groups.

As noted, aqueous resin cuts of preferred polymeric products of the continuous bulk polymerization and esterification process exhibit low viscosities in aqueous basic solution. For example, aqueous resin cuts of preferred polymeric products have a solution viscosity which is less than about 50 percent of the solution viscosity of the equivalent unmodified polymeric products.

The polymeric products of the bulk polymerization and esterification process can be used in a number of processes to produce compositions having excellent performance characteristics. For example, water-based compositions prepared using the polymeric product have a higher total solids concentration, higher dry film thickness, and better gloss than comparable formulations not using the polymeric product of the present invention.

Numerous types of water-based compositions can utilize the esterified polymeric product. The preparation of a number of compositions is described in greater detail under the Examples section. Exemplary water-based compositions include overprint varnishes, inks, coatings, adhesives, floor polishes, paints, barrier coatings, primers, coil coatings, wax dispersions, oil dispersions, wax emulsions, oil emulsions, functional paper coatings, foil coatings, paper sizing agents, and pigment dispersions. These water-based compositions comprise in the range of about 0.1 to about 100 percent by weight based on the total weight of the composition, disregarding water, of the polymeric product of the bulk polymerization and esterification process. The water-based composition also includes up to about 99.9 percent, preferably from about 10 to about 99 percent, by weight based on the total weight of the composition, disregarding the water, of an adjunct such as, but not limited to, an emulsion polymer, a coalescing solvent, a plasticizer, a cross-linking agent, a defoamer, a pigment, a tackifier, a conventional surfactant, a starch, a wax, a slip aid, a wetting agent, a surface modifier, an inert filler, an inert extender, and mixtures of these in addition to other formulating aids known to those skilled in the art. Preferably the emulsion polymers are free of any additional cross-linking agent.

Other processes that utilize the polymeric product of the continuous bulk polymerization and esterification process include a process for increasing the total solids concentration of an aqueous coating which includes adding the polymeric product to an aqueous coating; and processes that enhance the viscosity profile or increase the total solids concentration of an aqueous pigment dispersion which includes adding the polymeric product to an aqueous pigment dispersion.

The polymeric product, including that made by the polymerization and esterification process, is also beneficially employed in processes for preparing stable emulsions of polyolefin resins. It has been surprisingly and unexpectedly discovered that when preparing an oil or wax emulsion, the addition of the polymeric product according to the present invention to the emulsion will enhance emulsion formation and furthermore, will enhance the stability of the resulting emulsion, i.e., separation of the emulsion will be reduced as compared to emulsions which are identical except that they lack the polymeric product and instead include only conventional resins. An exemplary process for preparing a stable emulsion of a polyolefin resin includes the steps of mixing the polyolefin resin, the polymeric product, and optionally a conventional surfactant, preferably with heating sufficient to melt the components to obtain a molten mixture; adding a base to the molten mixture or alternatively adding the molten mixture to the base; and thereafter adding the molten mixture to water or alternatively adding water to the molten mixture.

An alternative process for preparing an emulsion of a polyolefin resin includes mixing the polyolefin resin, the polymeric product, the base and, optionally, a conventional surfactant, preferably with heating sufficient to melt the components to obtain a molten mixture; and, adding the molten mixture to water, or adding water to the molten mixture.

In preferred processes the base is added to the molten mixture and then, after waiting for an effective time period of about 5 minutes, water is added to the resulting mixture. Generally, the effective period of time is determined empirically based on the particular materials used. The base becomes incorporated into the molten mixture during the effective time period. The polymeric product used in the processes for preparing an emulsion of a polyolefin resin preferably has an acid number ranging from 20 to 740.

The polyolefin resin used in the invented processes and compositions preferably has a number average molecular weight of about 500 to about 20,000 daltons, an acid number of 0 to about 150, and a melting point of about 40° C. to about 250° C. The polyolefin resin may be a crystalline polyolefin resin, a modified polyolefin resin, a natural wax, a synthetic wax, or mixtures of these materials. Exemplary polyolefin resin material include paraffin, beeswax, carnauba, oxidized polyethylene, oxidized polypropylene, ethylene acrylic acid copolymers, vegetable waxes, wax derived form animals, synthetic waxes, mineral waxes, candelilla wax, Fischer-Tropsch wax, microcrystalline wax, lanolin, cottonseed wax, stearin wax, Japan wax, bayberry wax, myrtle wax, mace wax, palm kernel wax, spermaceti wax, Chinese insect wax, mutton tallow wax, polyethylene wax, polypropylene wax, copolymers of ethylene and acrylic acid waxes, a wax obtained by the hydrogenation of coconut oil, a wax obtained by hydrogenation of soybean oil, ozokerite wax, a montan wax, a lignite wax, a ceresin wax, a utah wax, a peat wax, a fir wax, an ouricury wax, a rice-oil wax, a sugar cane wax, an ucuhuba wax, a cocoa butter wax, a shellac wax, a wool wax, a chlorinated wax, a duroxon wax, a synthetic beeswax, a modified spermaceti wax, a modified lanolin wax, an oxazoline wax, and a metallic soap wax.

A wax dispersion may be prepared with the polymeric product of the polymerization and esterification process. The wax dispersion preparation process includes mixing a wax with an aqueous solution of the polymeric product. A conventional surfactant is optionally added to the other components in the process, but addition of a conventional surfactant is not required. Preferably, the wax is in the form of a wax powder.

The wax powder that is used in this method includes a powder of paraffin and beeswax, a carnauba wax, oxidized polyethylene wax, oxidized polypropylene wax, ethylene acrylic acid copolymers, vegetable waxes, waxes derived from animals, synthetic waxes, mineral waxes, candelilla wax, Fischer-Tropsch waxes, microcrystalline waxes, lanolin wax, cottonseed wax, stearin wax, Japan wax, bayberry wax, myrtle wax, mace wax, palm kernel wax, spermaceti wax, Chinese insect wax, mutton tallow wax, polyethylene wax, polypropylene wax, copolymers of ethylene and acrylic acid wax, wax obtained by the hydrogenation of coconut oil, wax obtained by hydrogenation of soybean oil, ozokerite, montan wax, lignite wax, ceresin wax, utah wax, peat wax, fir wax, ouricury wax, rice-oil wax, sugar cane wax, ucuhuba wax, cocoa butter wax, shellac wax, wool wax, chlorinated wax, duroxon wax, synthetic beeswax, modified spermaceti wax, modified lanolin wax, oxazoline wax, metallic soap wax, and combinations and derivatives of these.

A stable oil emulsion containing the polymeric product of the continuous bulk polymerization and esterification process may be prepared by heating the oil, the polymeric product, and optionally a conventional surfactant, to a temperature sufficient to melt the components. A base and then water are then added to the heated mixture or alternatively the heated mixture is added to the base and then the water. Alternatively, the oil, the polymeric product, the base and optionally the conventional surfactant may be heated to a temperature sufficient to melt the components. The melted components may then be added to water or alternatively, water may be added to the melted components.

An oil or a wax may be stabilized in an aqueous medium by providing a resin melt of the polymeric product of the continuous bulk polymerization and esterification process in a reactor at or above atmospheric pressure; charging the reactor with a base and water; dispersing a wax or an oil into the resin melt; and charging additional water into the reactor. The process for stabilizing an oil or a wax in an aqueous medium may be conducted by heating the resin melt with the base prior to or subsequent to dispersing the wax or oil in the mixture.

A base is added in various compositions of the present invention and is present in the resulting compositions. Although various bases known to those skilled in the art may be used in conjunction with the various processes or included in the various compositions, preferred bases of the present invention include ammonia, diethylaminoethanol, morpholine, sodium hydroxide, potassium hydroxide, or mixtures of these.

Similarly, a conventional surfactant is optionally added in various processes and present in various compositions of the present invention. Although varying quantities of surfactants known to those skilled in the art may be used in conjunction with the various processes and compositions, the preferred conventional surfactants are anionic or non-ionic surfactants that are preferably present or used in an amount up to about 10 percent based on the total weight of the solids in the water-based compositions.

It is appreciated that all processes for wax and oil emulsions or dispersions can be carried out at or above atmospheric pressure, and that the temperature of the processes may be varied according to the particular materials present in the compositions.

Surfactants are surface active agents which, when dissolved in a solvent such as water, adsorb preferentially at the water/air interface at the surface of the solution. This causes a reduction in the surface energy or surface tension of the solution's surface. The tendency of surfactant molecules to reduce surface tension results from the attempt to satisfy the opposing affinities of the hydrophobic and hydrophilic portions of the molecule. It is this particular behavior of surfactants that forms the basis for their activity as detergents, wetting agents, and emulsifiers. A careful balance exists between the hydrophobic and hydrophilic moieties to obtain highly efficient surfactants. Although there are several classes of simple non-polymeric surfactants which are very effective in reducing the surface tensions of liquids, it is very difficult to design polymeric surfactants, due to their structural complexity. Most surfactant solutions show a gradual reduction in surface tension with increase in temperature. In most cases, this temperature induced reduction in surface tension results mostly from the lowering surface tension of water that occurs as the temperature is increased. A polymeric surfactant which displays abrupt changes in surface tension with a change in the temperature of a solution containing the surfactant is highly useful in industrial applications. For example, this property can be used to control wetting and dewetting behavior of products such as floor cleaners and inks by changing the temperature by a few degrees. Such systems exhibit low enough surface tensions to wet low surface tension substrates at elevated temperatures, but have high enough surface energy when cooled to accept a second coating. Such properties are highly useful in coatings and printing applications, especially those involving multiple coatings.

It has been discovered that certain polymers may be obtained which have excellent surfactant properties. The polymeric products of the present invention were evaluated as neutralized aqueous solutions and were shown to have excellent surfactant properties. The preferred neutralizing agents include bases well-known in the art as previously described. For example, the surfactants exhibit an abrupt change in surface tension which varies greatly over a small temperature range. Importantly, this surface tension change is exhibited at mild temperatures, ranging from 20 to 70° C., allowing the polymeric products to be useful for printing or coating on low surface tension substrates such as polyethylene film, plastics in general, and foil.

The polymeric surfactants include at least one ethylenically unsaturated acid-functional monomer which has been radically incorporated into the polymer surfactant. They also include at least one ester of the incorporated ethylenically unsaturated acid-functional monomer which has an R alkyl group having the same properties as the alkanol used in the process of the invention. Thus, the R group is a linear or branched chain alkyl moiety having more than 11 carbon atoms. The R group of the polymeric surfactant preferably has from 12 to 50, more preferably has 12 to 36, and even more preferably has 12 to 22 carbon atoms. Most preferably, the R group has 14 carbon atoms.

Preferred polymeric surfactants also include at least one vinyl aromatic monomer, preferably styrene or α-methylstyrene, incorporated into the polymeric surfactant. Other preferred monomers include vinyl non-aromatic monomers including, but not limited to, acrylates, either alone or in combination with vinyl aromatic monomers. In more preferred polymeric surfactants, the ethylenically unsaturated acid-functional monomer is acrylic acid, and in most preferred polymeric surfactants, both styrene and α-methylstyrene are incorporated into the polymeric surfactant.

The molar critical micelle concentration of the polymeric surfactants is preferably less than $1.0 \times 10^{-2}$ moles/liter, is more preferably less than $8.2 \times 10^{-3}$ moles/liter, and is most preferably less than $1.0 \times 10^{-3}$ moles/liter. In more preferred surfactants, the surface area per surfactant molecule is less than 36 Å$^2$, and more preferably less than 20 Å$^2$. Other preferred polymeric surfactants include those in which 2 percent (w/w) neutralized aqueous solutions of the surfactant have a surface tension of less than 45 mN/m at 30° C. These preferred surfactant solutions also undergo a decrease in surface tension of at least about 5 mN/m as the temperature warms from 30° C. to 50° C. Other preferred 2% neutralized aqueous surfactant solutions also undergo a decrease in surface tension of at least about 10 mN/m as the temperature warms from 30° C. to 50° C.

Figure 8:
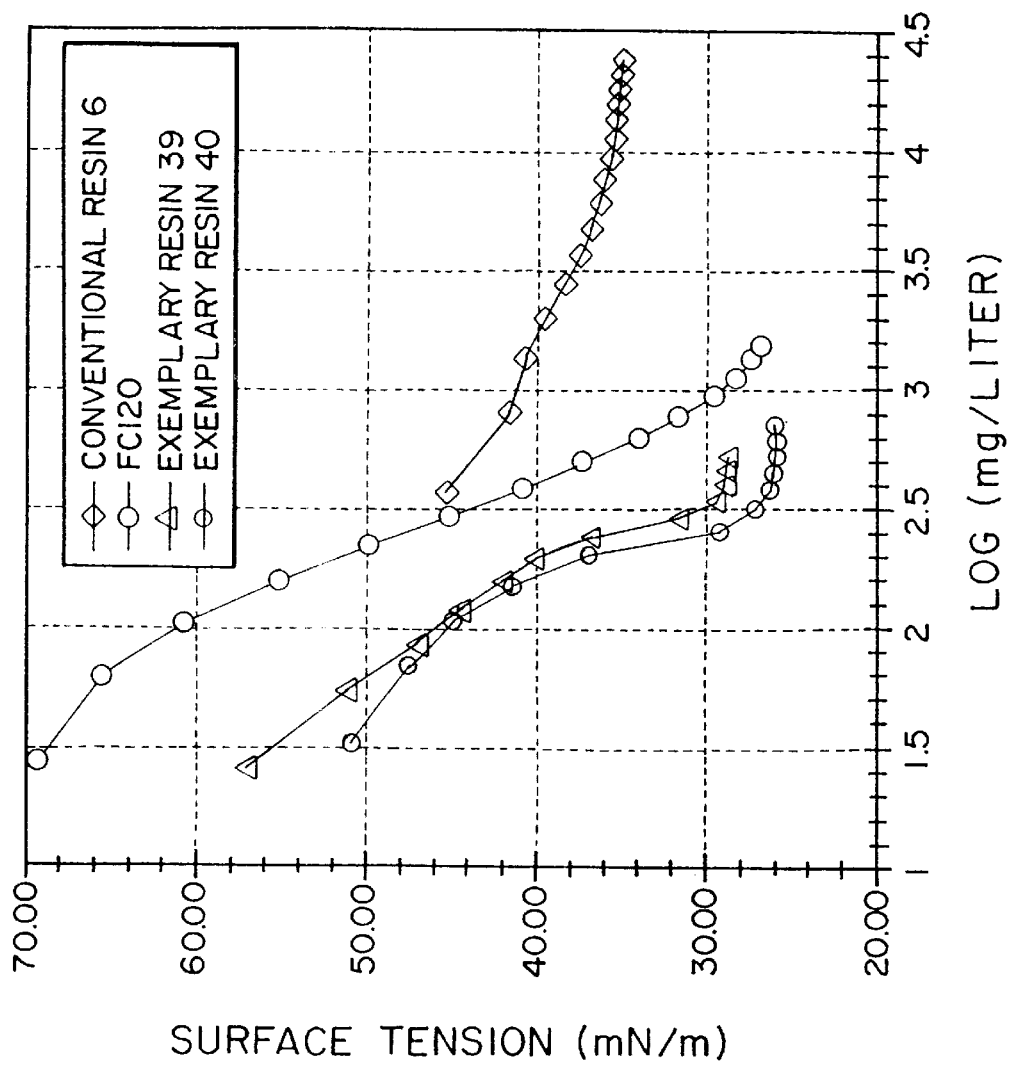
FIG. 8 is a graph comparing the surface tensions of aqueous solutions of Exemplary Resins 39 and 40 with Conventional Resin 6 and FC-120, a brand of fluorosurfactant available from 3M Corporation (Minneapolis, Minn.), at various concentrations.
Figure 9:
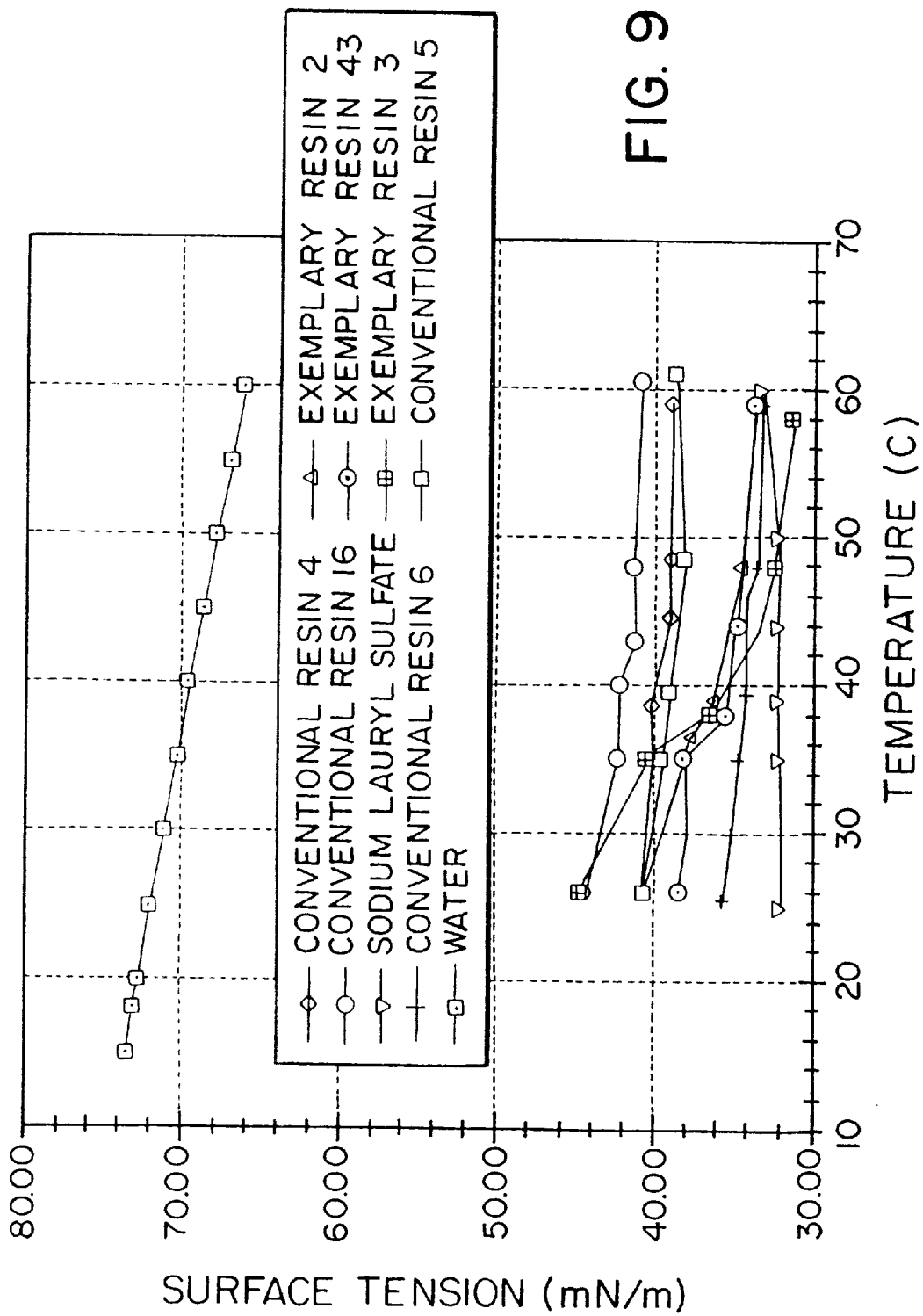
FIG. 9 is a graph comparing the surface tensions of 2% aqueous solutions of Exemplary Resins 2, 3, and 43; Conventional Resins 4–6, and 16; and sodium lauryl sulfate with that of water at various temperatures.
Figure 10:
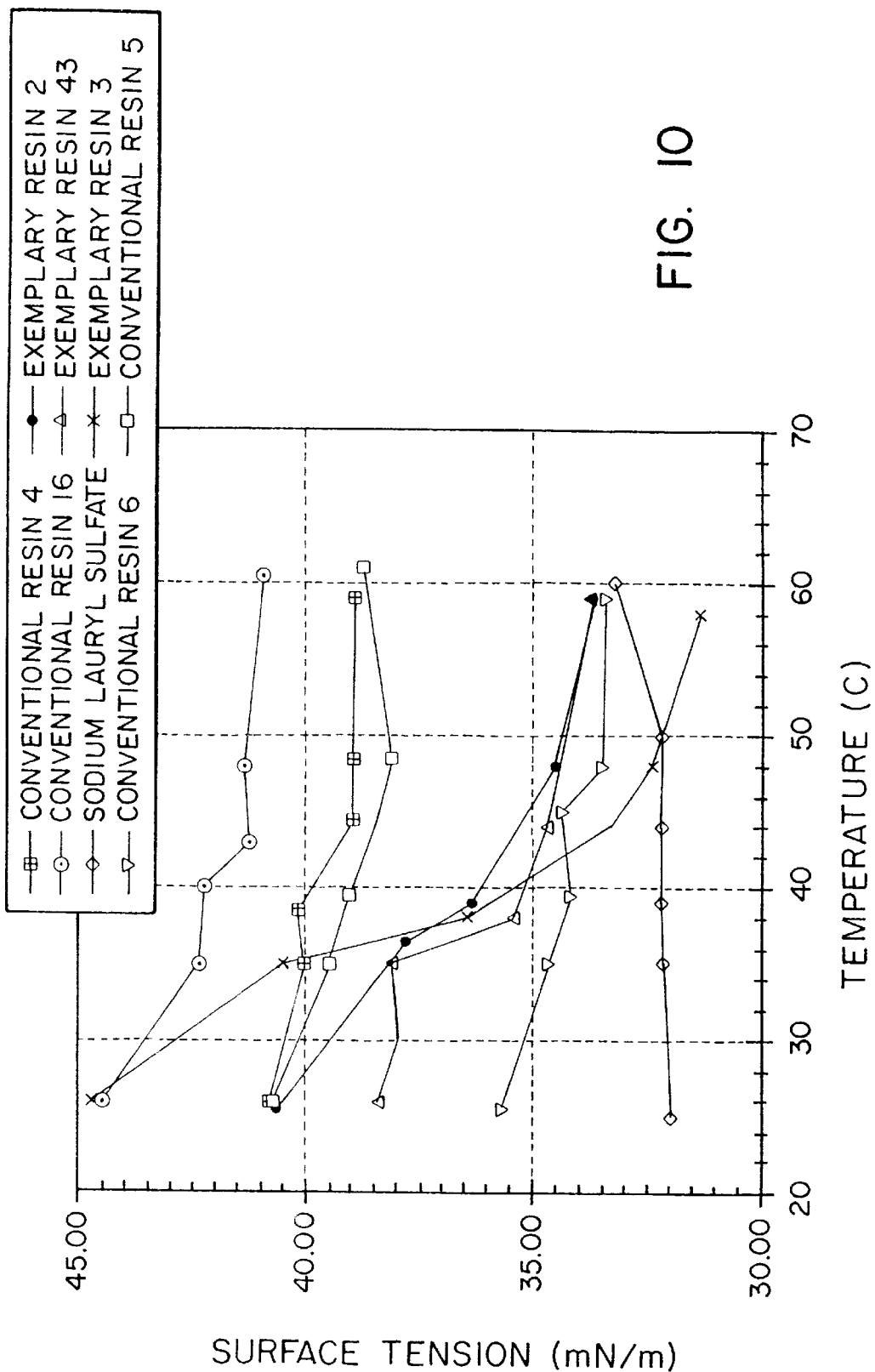
FIG. 10 is a graph comparing the surface tensions of 2% aqueous solutions of Exemplary Resins 2, 3, and 43; Conventional Resins 4–6 and 16; and sodium lauryl sulfate at various temperatures.
Figure 11:
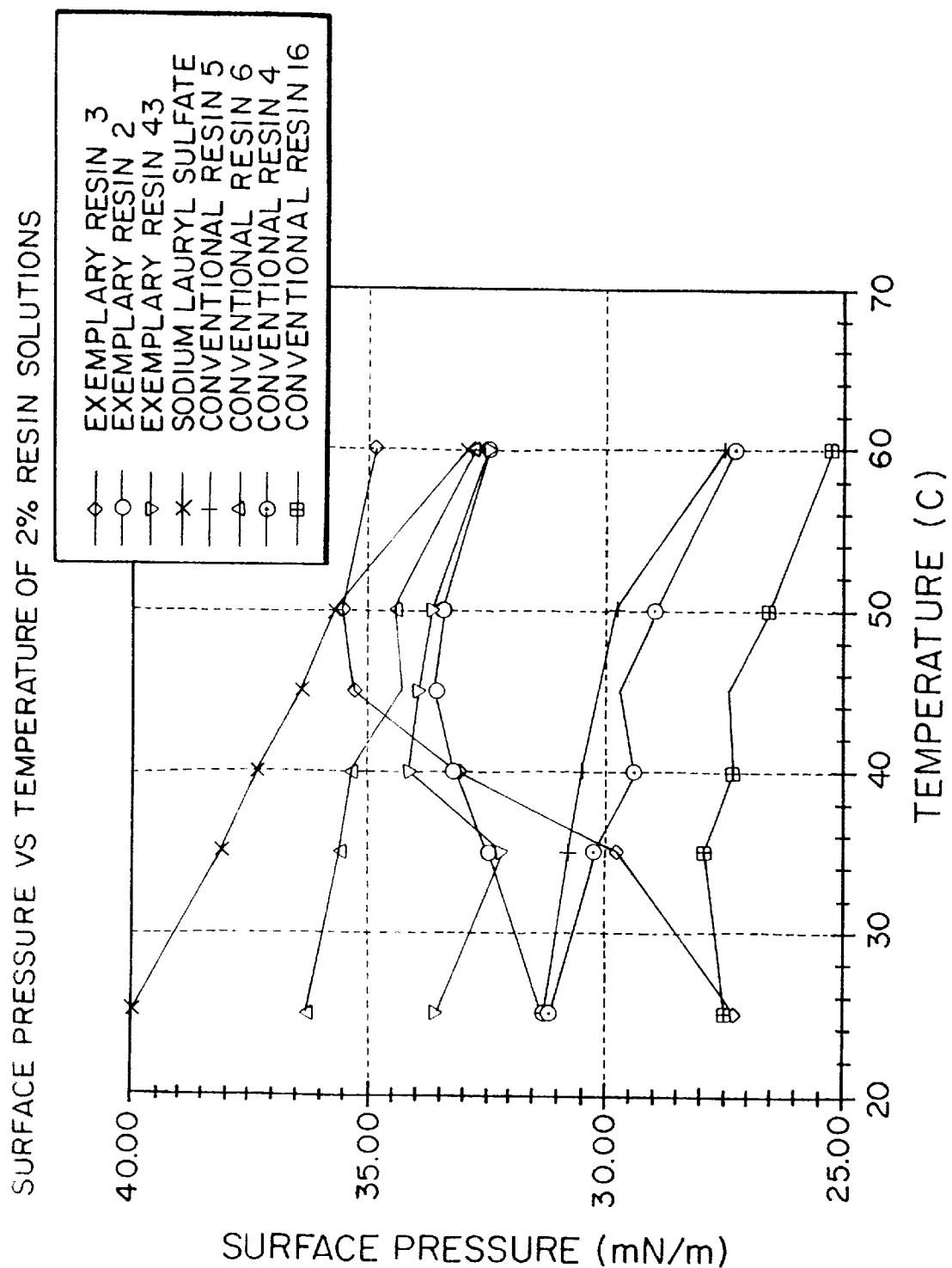
FIG. 11 is a graph comparing the surface pressure (surface tension of water—surface tension of the solution) of 2% aqueous solutions of Exemplary Resins 2,3, and 43; Conventional Resins 4–6 and 16; and sodium lauryl sulfate at various temperatures.

FIGS. 8 through 11 demonstrate the remarkable surfactant properties of the exemplary resins according to the present invention. FIG. 8 illustrates the significantly lower surface tensions of Exemplary Resins 39 and 40 containing the tetradecyl group as compared to Conventional Resin 6 and FC 120, a fluorosurfactant with excellent surfactant properties, as a function of concentration. On the other hand, FIG. 9 demonstrates the surface tension as a function of temperature for 2% aqueous solutions of Exemplary Resins 2, 3 and 43; Conventional Resins 4–6 and 16; water; and sodium lauryl sulfate, a surfactant well-known to those skilled in the art. Exemplary Resins 2 and 43 each contain the hexadecyl group while Exemplary Resin 3 contains a docosyl group. As illustrated in FIG. 9, the surface tensions of each of Exemplary Resins 2, 3, and 43 drop considerably as the temperature is increased from 30° C. to 50° C. whereas the surface tensions of the conventional resins and sodium lauryl sulfate change little with the increase in temperature. The change in the surface tension of the exemplary resins is even more dramatically illustrated in FIG. 10 which is an enlargement of FIG. 9 which does not show the surface tension of the water. Because the surface tension of water changes with changes in temperature, this is an important factor that influences the surface tensions of aqueous solutions containing surfactants. Thus, the surface pressure of the exemplary and conventional resins and that of sodium lauryl sulfate are plotted as a function of temperature in FIG. 11. The surface pressure is equal to the surface tension of water at a given temperature minus the surface tension of the surfactant solution at the same temperature. Thus, FIG. 11 allows the various materials to be compared based on their ability to lower surface tension without the interference of the surface tension of water. The positive slopes observed in the surface pressures of the exemplary resins, particularly Exemplary Resin 3, demonstrate that the surface tensions of aqueous solutions of the polymeric surfactants of the present invention decrease at a much faster rate than does the surface tension of water. This property allows the polymeric surfactants of the invention to be used in a wide variety of applications as described above.

The present invention is further described in the following non-limiting examples.

EXAMPLES

Preparation of Exemplary and Conventional Resins

Exemplary resins created by the invention described above are described below in the various examples. The materials and products described in the examples are characterized by a number of standard techniques. The molecular weight of each polymer was determined via gel permeation chromatography ("GPC") techniques using tetrahydrofuran ("THF") as eluent and poly(styrene) standards. The poly(styrene) standards employed are presently available from Polymer Laboratories Limited (Church Stretton, Great Britain) and are further characterized as having number average molecular weights of 2,250,000; 1,030,000; 570,000; 156,000; 66,000; 28,500; 9,200; 3,250; and 1,250. Acid numbers were determined by titration with a standardized base and are defined as the number of milligrams of potassium hydroxide needed to neutralize one gram of polymer. Viscosity was measured using a Brookfield viscometer available from Brookfield Engineering Laboratories (Stoughton, Mass.) with the appropriate LV spindle at an appropriate speed.

Exemplary Resin 1

Exemplary Resin 1 was prepared by the bulk polymerization and esterification process. The reaction components utilized, reactor feeds and resin composition are summarized in Table 1. The polymerization reaction conditions included about 15 minute reactor residence time and a reaction temperature of about 254° C. The resultant resin had a molecular weight ($M_w$) of about 1,800 daltons and an acid number of 237. Analysis of the polymeric product and process indicated that about 95.2 percent of the alkanol had been incorporated into the polymer.

TABLE 1

| Reaction Components | Reactor Feed (% w/w) | Normalized Reactor Feed (% w/w)[a] | Resin Composition (% w/w) |
|---|---|---|---|
| Styrene | 16.20 | 16.70 | 17.7 |
| Acrylic Acid | 35.50 | 36.60 | 35.4 |
| α-Methylstyrene | 35.30 | 36.39 | 33.7 |
| 1-Hexadecanol | 10.00 | 10.31 | |
| Hexadecyl acrylate | | | 13.2 |
| Di-t-butyl peroxide | 3.00 | — | — |

[a]Normalized reactor feed was calculated by assuming that initiator was not present in the feed.

Exemplary Resin 2

Exemplary Resin 2 was prepared by the bulk polymerization and esterification process. The reaction components utilized, reactor feeds and resin composition are summarized in Table 2. The polymerization reaction conditions included an about 15 minute reactor residence time and a reaction temperature of about 254° C. The resultant resin had a molecular weight ($M_w$) of about 1,800 daltons and an acid number of 155. Analysis of the polymeric product and process indicated that about 84.6 percent of the alkanol had been incorporated into the polymer.

TABLE 2

| Reaction Components | Reactor Feed (% w/w) | Normalized Reactor Feed (% w/w)[a] | Resin Composition (% w/w) |
|---|---|---|---|
| Styrene | 19.09 | 19.68 | 23.1 |
| Acrylic Acid | 21.32 | 21.98 | 20.0 |
| α-Methylstyrene | 41.59 | 42.88 | 36.6 |
| 1-Hexadecanol | 15.00 | 15.46 | |
| 1-Hexadecyl acrylate | | | 20.3 |
| Di-t-butyl peroxide | 3.00 | — | — |

[a]Normalized reactor feed was calculated by assuming that initiator was not present in the feed.

Exemplary Resin 3

Exemplary Resin 3 was prepared by the bulk polymerization and esterification process. The reaction components utilized, reactor feeds and resin composition are summarized in Table 3. The polymerization reaction conditions included an about 15 minute reactor residence time and a reaction temperature of about 254° C. The resultant resin had a molecular weight ($M_w$) of about 2,100 daltons and an acid number of 233. Analysis of the polymeric product and process indicated that about 95.1 percent of the alkanol had been incorporated into the polymer.

TABLE 3

| Reaction Components | Reactor Feed (% w/w) | Normalized Reactor Feed (% w/w)[a] | Resin Composition (% w/w) |
|---|---|---|---|
| Styrene | 15.56 | 16.04 | 17.5 |
| Acrylic Acid | 34.07 | 35.12 | 30.1 |
| α-Methylstyrene | 33.87 | 34.92 | 34.8 |
| 1-Docosanol | 13.50 | 13.92 | |
| Docosyl acrylate | | | 17.6 |
| Di-t-butyl peroxide | 3.00 | — | — |

[a]Normalized reactor feed was calculated by assuming that initiator was not present in the feed.

Exemplary Resin 4

Exemplary Resin 4 was prepared by the bulk polymerization and esterification process. The reaction components utilized, reactor feeds and resin composition are summarized in Table 4. The polymerization reaction conditions included an about 15 minute reactor residence time and a reaction temperature of about 210° C. The resultant resin had a molecular weight ($M_w$) of about 6,300 daltons and an acid number of 159. Analysis of the polymeric product and process indicated that about 57.2 percent of the alkanol had been incorporated into the polymer.

TABLE 4

| Reaction Components | Reactor Feed (% w/w) | Normalized Reactor Feed (% w/w)[a] | Resin Composition (% w/w) |
|---|---|---|---|
| Styrene | 32.38 | 32.99 | 35.9 |
| Acrylic Acid | 21.05 | 21.45 | 20.9 |
| α-Methylstyrene | 38.10 | 38.82 | 38.6 |
| 1-Docosanol | 6.62 | 6.74 | |
| Docosyl acrylate | | | 4.6 |
| Di-t-butyl peroxide | 1.85 | — | — |

[a]Normalized reactor feed was calculated by assuming that initiator was not present in the feed.

Exemplary Resin 5

Exemplary Resin 5 was prepared by the bulk polymerization and esterification process. The reaction components utilized, reactor feeds and resin composition are summarized in Table 5. The polymerization reaction conditions included an about 15 minute reactor residence time and a reaction temperature of about 216° C. The resultant resin had a molecular weight ($M_w$) of about 9,100 daltons and an acid number of 221. Analysis of the polymeric product and process indicated that about 95.5 percent of the alkanol had been incorporated into the polymer.

TABLE 5

| Reaction Components | Reactor Feed (% w/w) | Normalized Reactor Feed (% w/w)[a] | Resin Composition (% w/w) |
|---|---|---|---|
| Styrene | 25.78 | 25.91 | 26.7 |
| Acrylic Acid | 33.39 | 33.56 | 30.7 |
| α-Methylstyrene | 30.33 | 30.48 | 29.7 |

TABLE 5-continued

| Reaction Components | Reactor Feed (% w/w) | Normalized Reactor Feed (% w/w)[a] | Resin Composition (% w/w) |
|---|---|---|---|
| 1-Hexadecanol | 10.00 | 10.10 | |
| Hexadecyl acrylate | | | 12.9 |
| Di-t-butyl peroxide | 0.50 | — | — |

[a]Normalized reactor feed was calculated by assuming that initiator was not present in the feed.

Exemplary Resin 6

Exemplary Resin 6 was prepared by the bulk polymerization and esterification process. The reaction components utilized, reactor feeds and resin composition are summarized in Table 6. The polymerization reaction conditions included an about 15 minute reactor residence time and a reaction temperature of about 230° C. The resultant resin had a molecular weight ($M_w$) of about 6,000 daltons and an acid number of 223. Analysis of the polymeric product and process indicated that about 93.0 percent of the alkanol had been incorporated into the polymer.

TABLE 6

| Reaction Components | Reactor Feed (% w/w) | Normalized Reactor Feed (% w/w)[a] | Resin Composition (% w/w) |
|---|---|---|---|
| Styrene | 25.78 | 25.91 | 26.8 |
| Acrylic Acid | 33.39 | 33.56 | 31.4 |
| α-Methylstyrene | 30.33 | 30.48 | 28.6 |
| 1-Hexadecanol | 10.00 | 10.10 | |
| Hexadecyl acrylate | | | 13.2 |
| Di-t-butyl peroxide | 0.50 | — | — |

[a]Normalized reactor feed was calculated by assuming that initiator was not present in the feed.

Exemplary Resin 7

Exemplary Resin 7 was prepared by the bulk polymerization and esterification process. The reaction components utilized, reactor feeds and resin composition are summarized in Table 7. The polymerization reaction conditions included an about 15 minute reactor residence time and a reaction temperature of about 244° C. The resultant resin had a molecular weight ($M_w$) of about 4,300 daltons and an acid number of 223. Analysis of the polymeric product and process indicated that about 95.5 percent of the alkanol had been incorporated into the polymer.

TABLE 7

| Reaction Components | Reactor Feed (% w/w) | Normalized Reactor Feed (% w/w)[a] | Resin Composition (% w/w) |
|---|---|---|---|
| Styrene | 25.78 | 25.91 | 26.5 |
| Acrylic Acid | 33.39 | 33.56 | 31.4 |
| α-Methylstyrene | 30.33 | 30.48 | 29.1 |
| 1-Hexadecanol | 10.00 | 10.10 | |
| Hexadecyl acrylate | | | 13.0 |
| Di-t-butyl peroxide | 0.50 | — | — |

[a]Normalized reactor feed was calculated by assuming that initiator was not present in the feed.

Exemplary Resin 8

Exemplary Resin 8 was prepared by the polymerization and esterification process with added solvent. The reaction components utilized, reactor feeds and resin composition are summarized in Table 8. The polymerization reaction conditions included an about 15 minute reactor residence time and a reaction temperature of about 216° C. The resultant resin had a molecular weight ($M_w$) of about 13,700 daltons and an acid number of 208. Analysis of the polymeric product and process indicated that about 99.4 percent of the alkanol had been incorporated into the polymer.

TABLE 8

| Reaction Components | Reactor Feed (% w/w) | Normalized Reactor Feed (% w/w)[a] | Resin Composition (% w/w) |
|---|---|---|---|
| Styrene | 14.27 | 15.46 | 15.4 |
| Acrylic Acid | 33.57 | 36.36 | 29.0 |
| α-Methylstyrene | 16.79 | 18.18 | 17.6 |
| 1-Docosanol | 27.70 | 30.00 | — |
| Docosyl acrylate | | | 38.2 |
| Xylene | 7.50 | — | — |
| Di-t-butyl peroxide | 0.18 | — | — |

[a]Normalized reactor feed was calculated by assuming that initiator and solvent were not present in the feed.

Exemplary Resin 9

Exemplary Resin 9 was prepared by the polymerization and esterification process with added solvent. The reaction components utilized, reactor feeds and resin composition are summarized in Table 9. The polymerization reaction conditions included an about 15 minute reactor residence time and a reaction temperature of about 211° C. The resultant resin had a molecular weight ($M_w$) of about 6,800 daltons and an acid number of 223. Analysis of the polymeric product and process indicated that about 96.3 percent of the 1-hexadecanol and 97.9 percent of the 1-octadecanol had been incorporated into the polymer.

TABLE 9

| Reaction Components | Reactor Feed (% w/w) | Normalized Reactor Feed (% w/w)[a] | Resin Composition (% w/w) |
|---|---|---|---|
| Styrene | 15.61 | 17.60 | 17.7 |
| Acrylic Acid | 28.50 | 32.14 | 31.7 |
| α-Methylstyrene | 34.69 | 39.12 | 36.5 |
| 1-Hexadecanol | 2.74 | 3.09 | 3.9 |
| Hexadecyl acrylate | | | |
| 1-Octadecanol | 7.13 | 8.04 | |
| Octadecyl acrylate | | | 10.2 |
| Xylene | 10.0 | — | |
| Di-t-butyl peroxide | 1.32 | — | |

[b]Normalized reactor feed was calculated by assuming that initiator and solvent were not present in the feed.

Exemplary Resin 10

Exemplary Resin 10 was prepared by the polymerization and esterification process with added solvent. The reaction components utilized, reactor feeds and resin composition are summarized in Table 10. The polymerization reaction conditions included an about 15 minute reactor residence time and a reaction temperature of about 232° C. The resultant resin had a molecular weight ($M_w$) of about 7,000 daltons and an acid number of 188. Analysis of the polymeric product and process indicated that about 93.1 percent of the 1-tetradecanol and about 95.2 percent of the 1-docosanol had been incorporated into the polymer.

TABLE 10

| Reaction Components | Reactor Feed (% w/w) | Normalized Reactor Feed (% w/w)[a] | Resin Composition (% w/w) |
|---|---|---|---|
| Styrene | 19.40 | 21.02 | 20.8 |
| Acrylic Acid | 29.32 | 31.76 | 27.4 |
| α-Methylstyrene | 22.82 | 24.72 | 23.4 |

TABLE 10-continued

| Reaction Components | Reactor Feed (% w/w) | Normalized Reactor Feed (% w/w)[a] | Resin Composition (% w/w) |
|---|---|---|---|
| 1-Tetradecanol | 8.23 | 8.92 | 11.6 |
| Tetradecyl acrylate | | | |
| 1-Docosanol | 12.54 | 13.58 | |
| Docosyl acrylate | | | 16.8 |
| Xylene | 7.50 | — | — |
| Di-t-butyl peroxide | 0.19 | — | — |

[a]Normalized reactor feed was calculated by assuming that initiator and solvent were not present in the feed.

Exemplary Resin 11

Exemplary Resin 11 was prepared by the bulk polymerization and esterification process. The reaction components utilized, reactor feeds and resin composition are summarized in Table 11. The polymerization reaction conditions included an about 12 minute reactor residence time and a reaction temperature of about 254° C. The resultant resin had a molecular weight ($M_w$) of about 2,100 daltons and an acid number of 248. Analysis of the polymeric product and process indicated that about 97.0 percent of the alkanol had been incorporated into the polymer.

TABLE 11

| Reaction Components | Reactor Feed (% w/w) | Normalized Reactor Feed (% w/w)[a] | Resin Composition (% w/w) |
|---|---|---|---|
| Styrene | 16.20 | 16.70 | 17.5 |
| Acrylic Acid | 35.50 | 36.60 | 35.0 |
| α-Methylstyrene | 35.30 | 36.39 | 34.3 |
| 1-Hexadecanol | 10.0 | 10.31 | |
| Hexadecyl acrylate | | | 13.2 |
| Di-t-butyl peroxide | 3.0 | — | — |

[a]Normalized reactor feed was calculated by assuming that initiator was not present in the feed.

Exemplary Resin 12

Exemplary Resin 12 was prepared by the polymerization and esterification process with added solvent. The reaction components utilized, reactor feeds and resin composition are summarized in Table 12. The polymerization reaction conditions included an about 15 minute reactor residence time and a reaction temperature of about 207° C. The resultant resin had a molecular weight ($M_w$) of about 7,500 daltons and an acid number of 167. Analysis of the polymeric product and process indicated that about 96.1 percent of the 1-tetradecanol and about 98.9 percent of the 1-docosanol had been incorporated into the polymer.

TABLE 12

| Reaction Components | Reactor Feed (% w/w) | Normalized Reactor Feed (% w/w)[a] | Resin Composition (% w/w) |
|---|---|---|---|
| Acrylic Acid | 22.20 | 24.74 | 22.6 |
| Methyl Methacrylate | 34.32 | 38.24 | 37.4 |
| Butyl Acrylate | 20.60 | 22.95 | 22.5 |
| 1-Tetradecanol | 5.06 | 5.64 | 7.2 |
| Tetradecyl acrylate | | | |
| 1-Docosanol | 7.57 | 8.43 | |
| Docosyl acrylate | | | 10.3 |
| Xylene | 10.00 | — | — |
| Di-t-butyl peroxide | 0.25 | — | — |

[a]Normalized reactor feed was calculated by assuming that initiator and solvent were not present in the feed.

Exemplary Resin 13

Exemplary Resin 13 was prepared by the polymerization and esterification process with added solvent. The reaction components utilized, reactor feeds and resin composition are summarized in Table 13. The polymerization reaction conditions included an about 15 minute reactor residence time and a reaction temperature of about 215° C. The resultant resin had a molecular weight ($M_w$) of about 11,480 daltons and an acid number of 226. Analysis of the polymeric product and process indicated that about 96.9 percent of the alkanol had been incorporated into the polymer.

TABLE 13

| Reaction Components | Reactor Feed (% w/w) | Normalized Reactor Feed (% w/w)[a] | Resin Composition (% w/w) |
|---|---|---|---|
| Styrene | 20.63 | 22.35 | 22.6 |
| Acrylic Acid | 33.56 | 36.36 | 31.3 |
| α-Methylstyrene | 24.26 | 26.29 | 26.0 |
| 1-Tetradecanol | 13.84 | 15.00 | |
| Tetradecyl acrylate | | | 20.1 |
| Xylene | 7.50 | — | — |
| Di-t-butyl peroxide | 0.21 | — | — |

[a]Normalized reactor feed was calculated by assuming that initiator was not present in the feed.

Exemplary Resin 14

Exemplary Resin 14 was prepared by the polymerization and esterification process with added solvent. The reaction components utilized, reactor feeds and resin composition are summarized in Table 14. The polymerization reaction conditions included an about 15 minute reactor residence time and a reaction temperature of about 214° C. The resultant resin had a molecular weight ($M_w$) of about 13,000 daltons and an acid number of 236. Analysis of the polymeric product and process indicated that about 99.4 percent of the alkanol had been incorporated into the polymer.

TABLE 14

| Reaction Components | Reactor Feed (% w/w) | Normalized Reactor Feed (% w/w)[a] | Resin Composition (% w/w) |
|---|---|---|---|
| Styrene | 20.63 | 22.35 | 22.3 |
| Acrylic Acid | 33.56 | 36.36 | 33.2 |
| α-Methylstyrene | 24.26 | 26.29 | 26.4 |
| 1-Docosanol | 13.84 | 15.00 | |
| Docosyl acrylate | | | 18.1 |
| Xylene | 7.50 | — | — |
| Di-t-butyl peroxide | 0.21 | — | — |

[a]Normalized reactor feed was calculated by assuming that initiator was not present in the feed.

Exemplary Resin 15

Exemplary Resin 15 was prepared by the bulk polymerization and esterification process. The reaction components utilized, reactor feeds and resin composition are summarized in Table 15. The polymerization reaction conditions included an about 15 minute reactor residence time and a reaction temperature of about 254° C. The resultant resin had a molecular weight ($M_w$) of about 1,800 daltons and an acid number of 223. Analysis of the polymeric product and process indicated that about 95.6 percent of the alkanol had been incorporated into the polymer.

TABLE 15

| Reaction Components | Reactor Feed (% w/w) | Normalized Reactor Feed (% w/w)[a] | Resin Composition (% w/w) |
|---|---|---|---|
| Styrene | 18.39 | 18.98 | 20.2 |
| Acrylic Acid | 31.14 | 32.13 | 31.4 |
| α-Methylstyrene | 40.86 | 42.15 | 38.8 |
| 1-Decanol | 6.51 | 6.72 | |
| Decyl acrylate | | | 9.6 |
| Di-t-butyl peroxide | 3.10 | — | — |

[a]Normalized reactor feed was calculated by assuming that initiator was not present in the feed.

Exemplary Resin 16

Exemplary Resin 16 was prepared by the bulk polymerization and esterification process. The reaction components utilized, reactor feeds and resin composition are summarized in Table 16. The polymerization reaction conditions included an about 15 minute reactor residence time and a reaction temperature of about 254° C. The resultant resin had a molecular weight ($M_w$) of about 2,000 daltons and an acid number of 219. Analysis of the polymeric product and process indicated that about 97.6 percent of the alkanol had been incorporated into the polymer.

TABLE 16

| Reaction Components | Reactor Feed (% w/w) | Normalized Reactor Feed (% w/w)[a] | Resin Composition (% w/w) |
|---|---|---|---|
| Styrene | 18.03 | 18.60 | 19.6 |
| Acrylic Acid | 31.15 | 32.14 | 31.1 |
| α-Methylstyrene | 40.07 | 41.34 | 38.3 |
| 1-Dodecanol | 7.68 | 7.92 | |
| Dodecyl acrylate | | | 11.0 |
| Di-t-butyl peroxide | 3.07 | — | — |

[a]Normalized reactor feed was calculated by assuming that initiator was not present in the feed.

Exemplary Resin 17

Exemplary Resin 17 was prepared by the bulk polymerization and esterification process. The reaction components utilized, reactor feeds and resin composition are summarized in Table 17. The polymerization reaction conditions included an about 15 minute reactor residence time and a reaction temperature of about 254° C. The resultant resin had a molecular weight ($M_w$) of about 1,900 daltons and an acid number of 223. Analysis of the polymeric product and process indicated that about 97.9 percent of the alkanol had been incorporated into the polymer.

TABLE 17

| Reaction Components | Reactor Feed (% w/w) | Normalized Reactor Feed (% w/w)[a] | Resin Composition (% w/w) |
|---|---|---|---|
| Styrene | 17.68 | 18.23 | 19.1 |
| Acrylic Acid | 31.16 | 32.14 | 30.9 |
| α-Methylstyrene | 39.29 | 40.52 | 37.7 |
| 1-Tetradecanol | 8.83 | 9.11 | |
| Tetradecyl acrylate | | | 12.3 |
| Di-t-butyl peroxide | 3.03 | — | — |

[a]Normalized reactor feed was calculated by assuming that initiator was not present in the feed.

Exemplary Resin 18

Exemplary Resin 18 was prepared by the bulk polymerization and esterification process. The reaction components utilized, reactor feeds and resin composition are summarized in Table 18. The polymerization reaction conditions included an about 15 minute reactor residence time and a reaction temperature of about 254° C. The resultant resin had a molecular weight ($M_w$) of about 1,900 daltons and an acid number of 221. Analysis of the polymeric product and process indicated that about 98.0 percent of the alkanol had been incorporated into the polymer.

TABLE 18

| Reaction Components | Reactor Feed (% w/w) | Normalized Reactor Feed (% w/w)[a] | Resin Composition (% w/w) |
|---|---|---|---|
| Styrene | 17.33 | 17.87 | 18.9 |
| Acrylic Acid | 31.18 | 32.14 | 31.2 |
| α-Methylstyrene | 38.50 | 39.69 | 36.2 |
| 1-Hexadecanol | 9.99 | 10.30 | |
| Hexadecyl acrylate | | | 13.7 |
| Di-t-butyl peroxide | 3.00 | — | — |

[a]Normalized reactor feed was calculated by assuming that initiator was not present in the feed.

Exemplary Resin 19

Exemplary Resin 19 was prepared by the bulk polymerization and esterification process. The reaction components utilized, reactor feeds and resin composition are summarized in Table 19. The polymerization reaction conditions included an about 15 minute reactor residence time and a reaction temperature of about 254° C. The resultant resin had a molecular weight ($M_w$) of about 2,000 daltons and an acid number of 221. Analysis of the polymeric product and process indicated that about 98.4 percent of the 1-hexadecanol and about 94.2 percent of the 1-octadecanol had been incorporated into the polymer.

TABLE 19

| Reaction Components | Reactor Feed (% w/w) | Normalized Reactor Feed (% w/w)[a] | Resin Composition (% w/w) |
|---|---|---|---|
| Styrene | 17.22 | 17.75 | 18.4 |
| Acrylic Acid | 31.18 | 32.14 | 31.5 |
| α-Methylstyrene | 38.27 | 39.45 | 36.5 |
| 1-Hexadecanol | 6.99 | 7.21 | 9.4 |
| Hexadecyl acrylate | | | |
| 1-Octadecanol | 3.34 | 3.44 | |
| Octadecyl acrylate | | | 4.2 |
| Di-t-butyl peroxide | 2.99 | — | — |

[a]Normalized reactor feed was calculated by assuming that initiator was not present in the feed.

Exemplary Resin 20

Exemplary Resin 20 was prepared by the bulk polymerization and esterification process. The reaction components utilized, reactor feeds and resin composition are summarized in Table 20. The polymerization reaction conditions included an about 15 minute reactor residence time and a reaction temperature of about 254° C. The resultant resin had a molecular weight ($M_w$) of about 1,900 daltons and an acid number of 220. Analysis of the polymeric product and process indicated that about 98.7 percent of the 1-hexadecanol and about 97.5 percent of the 1-octadecanol had been incorporated into the polymer.

TABLE 20

| Reaction Components | Reactor Feed (% w/w) | Normalized Reactor Feed (% w/w)[a] | Resin Composition (% w/w) |
|---|---|---|---|
| Styrene | 17.08 | 17.61 | 18.0 |
| Acrylic Acid | 31.18 | 32.14 | 32.3 |
| α-Methylstyrene | 37.95 | 39.12 | 35.7 |
| 1-Hexadecanol | 3.00 | 3.09 | 4.0 |
| Hexadecyl acrylate | | | |
| 1-Octadecanol | 7.80 | 8.04 | |
| Octadecyl acrylate | | | 10.0 |
| Di-t-butyl peroxide | 2.98 | — | — |

[a]Normalized reactor feed was calculated by assuming that initiator was not present in the feed.

Exemplary Resin 21

Exemplary Resin 21 was prepared by the bulk polymerization and esterification process. The reaction components utilized, reactor feeds and resin composition are summarized in Table 21. The polymerization reaction conditions included an about 15 minute reactor residence time and a reaction temperature of about 254° C. The resultant resin had a molecular weight ($M_w$) of about 2,000 daltons and an acid number of 222. Analysis of the polymeric product and process indicated that about 97.3 percent of the alkanol had been incorporated into the polymer.

TABLE 21

| Reaction Components | Reactor Feed (% w/w) | Normalized Reactor Feed (% w/w)[a] | Resin Composition (% w/w) |
|---|---|---|---|
| Styrene | 16.98 | 17.50 | 18.9 |
| Acrylic Acid | 31.19 | 32.14 | 29.1 |
| α-Methylstyrene | 37.72 | 38.87 | 36.7 |
| 1-Octadecanol | 11.15 | 11.49 | |
| Octadecyl acrylate | | | 15.3 |
| Di-t-butyl peroxide | 2.97 | — | — |

[a]Normalized reactor feed was calculated by assuming that initiator was not present in the feed.

Exemplary Resin 22

Exemplary Resin 22 was prepared by the bulk polymerization and esterification process. The reaction components utilized, reactor feeds and resin composition are summarized in Table 22. The polymerization reaction conditions included an about 15 minute reactor residence time and a reaction temperature of about 254° C. The resultant resin had a molecular weight ($M_w$) of about 2,100 daltons and an acid number of 211.

TABLE 22

| Reaction Components | Reactor Feed (% w/w) | Normalized Reactor Feed (% w/w)[a] |
|---|---|---|
| Styrene | 15.45 | 15.92 |
| Acrylic Acid | 29.65 | 30.55 |
| α-Methylstyrene | 34.34 | 25.39 |
| 1-Docosanol | 12.80 | 13.19 |
| Docosyl acrylate | | |
| Xylene | 5.00 | — |
| Di-t-butyl peroxide | 2.76 | — |

[a]Normalized reactor feed was calculated by assuming that initiator was not present in the feed.

Exemplary Resin 23

Exemplary Resin 23 was prepared by the bulk polymerization and esterification process. The reaction components utilized, reactor feeds and resin composition are summarized in Table 23. The polymerization reaction conditions included an about 15 minute reactor residence time and a reaction temperature of about 254° C. The resultant resin had a molecular weight ($M_w$) of about 1,800 daltons and an acid number of 224. Analysis of the polymeric product and process indicated that about 96.2 percent of the alkanol had been incorporated into the polymer.

TABLE 23

| Reaction Components | Reactor Feed (% w/w) | Normalized Reactor Feed (% w/w)[a] | Resin Composition (% w/w) |
|---|---|---|---|
| Styrene | 18.03 | 18.60 | 19.8 |
| Acrylic Acid | 31.15 | 32.14 | 31.4 |
| α-Methylstyrene | 40.07 | 41.34 | 37.9 |
| Isododecanol | 7.68 | 7.92 | |
| Isododecyl acrylate | | | 11.0 |
| Di-t-butyl peroxide | 3.07 | — | — |

[a]Normalized reactor feed was calculated by assuming that initiator was not present in the feed.

Exemplary Resin 24

Exemplary Resin 24 was prepared by the bulk polymerization and esterification process. The reaction components utilized, reactor feeds and resin composition are summarized in Table 24. The polymerization reaction conditions included an about 15 minute reactor residence time and a reaction temperature of about 254° C. The resultant resin had a molecular weight ($M_w$) of about 1,900 daltons and an acid number of 222. Analysis of the polymeric product and process indicated that about 97.8 percent of the alkanol had been incorporated into the polymer.

TABLE 24

| Reaction Components | Reactor Feed (% w/w) | Normalized Reactor Feed (% w/w)[a] | Resin Composition (% w/w) |
|---|---|---|---|
| Styrene | 17.33 | 17.87 | 18.3 |
| Acrylic Acid | 31.18 | 32.14 | 35.3 |
| α-Methylstyrene | 38.50 | 39.69 | 30.2 |
| Isohexadecanol | 9.99 | 10.30 | |
| Isohexadecyl acrylate | | | 16.2 |
| Di-t-butyl peroxide | 3.00 | — | — |

[a]Normalized reactor feed was calculated by assuming that initiator was not present in the feed.

Exemplary Resin 25

Exemplary Resin 25 was prepared by the bulk polymerization and esterification process. The reaction components utilized, reactor feeds and resin composition are summarized in Table 25. The polymerization reaction conditions included an about 15 minute reactor residence time and a reaction temperature of about 254° C. The resultant resin had a molecular weight ($M_w$) of about 1,900 daltons and an acid number of 222. Analysis of the polymeric product and process indicated that about 99.3 percent of the alkanol had been incorporated into the polymer.

TABLE 25

| Reaction Components | Reactor Feed (% w/w) | Normalized Reactor Feed (% w/w)[a] | Resin Composition (% w/w) |
|---|---|---|---|
| Styrene | 16.88 | 17.39 | 18.3 |
| Acrylic Acid | 31.19 | 32.14 | 31.1 |
| α-Methylstyrene | 37.50 | 38.64 | 35.3 |
| Isoeicosanol | 11.47 | 11.82 | |

TABLE 25-continued

| Reaction Components | Reactor Feed (% w/w) | Normalized Reactor Feed (% w/w)[a] | Resin Composition (% w/w) |
|---|---|---|---|
| Isoeicosyl acrylate | | | 15.3 |
| Di-t-butyl peroxide | 2.96 | — | — |

[a]Normalized reactor feed was calculated by assuming that initiator was not present in the feed.

Exemplary Resin 26

Exemplary Resin 26 was prepared by the bulk polymerization and esterification process. The reaction components utilized, reactor feeds and resin composition are summarized in Table 26. The polymerization reaction conditions included an about 15 minute reactor residence time and a reaction temperature of about 254° C. The resultant resin had a molecular weight ($M_w$) of about 2,400 daltons and an acid number of 208.

TABLE 26

| Reaction Components | Reactor Feed (% w/w) | Normalized Reactor Feed (% w/w)[a] |
|---|---|---|
| Styrene | 13.79 | 14.17 |
| Acrylic Acid | 31.28 | 32.14 |
| α-Methylstyrene | 30.57 | 31.41 |
| Isohexatriacontanol | 21.68 | |
| Isohexatriacosyl acrylate | | 22.28 |
| Di-t-butyl peroxide | 2.68 | — |

[a]Normalized reactor feed was calculated by assuming that initiator was not present in the feed.

Exemplary Resin 27

Exemplary Resin 27 was prepared by the polymerization and esterification process with added solvent. The reaction components utilized, reactor feeds and resin composition are summarized in Table 27. The polymerization reaction conditions included an about 15 minute reactor residence time and a reaction temperature of about 212° C. The resultant resin had a molecular weight ($M_w$) of about 6,100 daltons and an acid number of 235. Analysis of the polymeric product and process indicated that about 71.2 percent of the alkanol had been incorporated into the polymer.

TABLE 27

| Reaction Components | Reactor Feed (% w/w) | Normalized Reactor Feed (% w/w)[a] | Resin Composition (% w/w) |
|---|---|---|---|
| Styrene | 16.82 | 18.98 | 19.9 |
| Acrylic Acid | 28.48 | 32.13 | 31.8 |
| α-Methylstyrene | 37.37 | 42.16 | 41.1 |
| 1-Decanol | 5.96 | 6.72 | |
| Decyl acrylate | | | 7.2 |
| Xylene | 10.00 | — | — |
| Di-t-butyl peroxide | 1.46 | — | — |

[a]Normalized reactor feed was calculated by assuming that initiator and solvent were not present in the feed.

Exemplary Resin 28

Exemplary Resin 28 was prepared by the polymerization and esterification process with added solvent. The reaction components utilized, reactor feeds and resin composition are summarized in Table 28. The polymerization reaction conditions included an about 15 minute reactor residence time and a reaction temperature of about 211° C. The resultant resin had a molecular weight ($M_w$) of about 6,200 daltons and an acid number of 229. Analysis of the polymeric product and process indicated that about 88.1 percent of the alkanol had been incorporated into the polymer.

TABLE 28

| Reaction Components | Reactor Feed (% w/w) | Normalized Reactor Feed (% w/w)[a] | Resin Composition (% w/w) |
|---|---|---|---|
| Styrene | 16.49 | 18.60 | 19.4 |
| Acrylic Acid | 28.49 | 32.14 | 31.1 |
| α-Methylstyrene | 36.64 | 41.34 | 39.4 |
| 1-Dodecananol | 7.02 | 7.92 | |
| Dodecyl acrylate | | | 10.1 |
| Xylene | 10.00 | — | — |
| Di-t-butyl peroxide | 1.36 | — | — |

[a]Normalized reactor feed was calculated by assuming that initiator and solvent were not present in the feed.

Exemplary Resin 29

Exemplary Resin 29 was prepared by the polymerization and esterification process with added solvent. The reaction components utilized, reactor feeds and resin composition are summarized in Table 29. The polymerization reaction conditions included an about 15 minute reactor residence time and a reaction temperature of about 212° C. The resultant resin had a molecular weight ($M_w$) of about 6,400 daltons and an acid number of 227. Analysis of the polymeric product and process indicated that about 93.3 percent of the alkanol had been incorporated into the polymer.

TABLE 29

| Reaction Components | Reactor Feed (% w/w) | Normalized Reactor Feed (% w/w)[a] | Resin Composition (% w/w) |
|---|---|---|---|
| Styrene | 16.16 | 18.23 | 18.8 |
| Acrylic Acid | 28.49 | 32.14 | 30.4 |
| α-Methylstyrene | 35.92 | 40.52 | 39.0 |
| 1-Tetradecanol | 8.08 | 9.11 | |
| Tetradecyl acrylate | | | 11.8 |
| Xylene | 10.00 | — | — |
| Di-t-butyl peroxide | 1.35 | — | — |

[a]Normalized reactor feed was calculated by assuming that initiator and solvent were not present in the feed.

Exemplary Resin 30

Exemplary Resin 30 was prepared by the polymerization and esterification process with added solvent. The reaction components utilized, reactor feeds and resin composition are summarized in Table 30. The polymerization reaction conditions included an about 15 minute reactor residence time and a reaction temperature of about 212° C. The resultant resin had a molecular weight ($M_w$) of about 6,400 daltons and an acid number of 223. Analysis of the polymeric product and process indicated that about 96.6 percent of the alkanol had been incorporated into the polymer.

TABLE 30

| Reaction Components | Reactor Feed (% w/w) | Normalized Reactor Feed (% w/w)[a] | Resin Composition (% w/w) |
|---|---|---|---|
| Styrene | 15.84 | 17.86 | 18.4 |
| Acrylic Acid | 28.50 | 32.14 | 30.3 |
| α-Methylstyrene | 35.20 | 39.70 | 37.8 |
| 1-Hexadecanol | 9.13 | 10.30 | |
| Hexadecyl acrylate | | | 13.5 |

TABLE 30-continued

| Reaction Components | Reactor Feed (% w/w) | Normalized Reactor Feed (% w/w)[a] | Resin Composition (% w/w) |
|---|---|---|---|
| Xylene | 10.00 | — | — |
| Di-t-butyl peroxide | 1.34 | — | — |

[a]Normalized reactor feed was calculated by assuming that initiator and solvent were not present in the feed.

Exemplary Resin 31

Exemplary Resin 31 was prepared by the polymerization and esterification process with added solvent. The reaction components utilized, reactor feeds and resin composition are summarized in Table 31. The polymerization reaction conditions included an about 15 minute reactor residence time and a reaction temperature of about 212° C. The resultant resin had a molecular weight ($M_w$) of about 6,500 daltons and an acid number of 224. Analysis of the polymeric product and process indicated that about 96.4 percent of the 1-hexadecanol and about 96.6 percent of the 1-octadecanol had been incorporated into the polymer.

TABLE 31

| Reaction Components | Reactor Feed (% w/w) | Normalized Reactor Feed (% w/w)[a] | Resin Composition (% w/w) |
|---|---|---|---|
| Styrene | 15.74 | 17.75 | 18.2 |
| Acrylic Acid | 28.50 | 32.14 | 31.0 |
| α-Methylstyrene | 34.98 | 39.45 | 37.1 |
| 1-Hexadecanol | 6.39 | 7.21 | |
| Hexadecyl acrylate | | | 9.4 |
| 1-Octadecanol | 3.06 | 3.45 | |
| Octadecyl acrylate | | | 4.4 |
| Xylene | 10.00 | — | — |
| Di-t-butyl peroxide | 1.33 | — | — |

[a]Normalized reactor feed was calculated by assuming that initiator and solvent were not present in the feed.

Exemplary Resin 32

Exemplary Resin 32 was prepared by the polymerization and esterification process with added solvent. The reaction components utilized, reactor feeds and resin composition are summarized in Table 32. The polymerization reaction conditions included an about 15 minute reactor residence time and a reaction temperature of about 211° C. The resultant resin had a molecular weight ($M_w$) of about 6,800 daltons and an acid number of 223. Analysis of the polymeric product and process indicated that about 96.3 percent of the 1-hexadecanol and about 97.9 percent of the 1-octadecanol had been incorporated into the polymer.

TABLE 32

| Reaction Components | Reactor Feed (% w/w) | Normalized Reactor Feed (% w/w)[a] | Resin Composition (% w/w) |
|---|---|---|---|
| Styrene | 15.61 | 17.60 | 17.7 |
| Acrylic Acid | 28.50 | 32.14 | 31.7 |
| α-Methylstyrene | 34.69 | 39.12 | 36.5 |
| 1-Hexadecanol | 2.74 | 3.09 | 3.9 |
| Hexadecyl acrylate | | | |
| 1-Octadecanol | 7.13 | 8.04 | |
| Octadecyl acrylate | | | 10.2 |

TABLE 32-continued

| Reaction Components | Reactor Feed (% w/w) | Normalized Reactor Feed (% w/w)[a] | Resin Composition (% w/w) |
|---|---|---|---|
| Xylene | 10.00 | — | — |
| Di-t-butyl peroxide | 1.32 | — | — |

[a]Normalized reactor feed was calculated by assuming that initiator and solvent were not present in the feed.

Exemplary Resin 33

Exemplary Resin 33 was prepared by the polymerization and esterification process with added solvent. The reaction components utilized, reactor feeds and resin composition are summarized in Table 33. The polymerization reaction conditions included an about 15 minute reactor residence time and a reaction temperature of about 212° C. The resultant resin had a molecular weight ($M_w$) of about 6,700 daltons and an acid number of 224. Analysis of the polymeric product and process indicated that about 97.8 percent of the alkanol had been incorporated into the polymer.

TABLE 33

| Reaction Components | Reactor Feed (% w/w) | Normalized Reactor Feed (% w/w)[a] | Resin Composition (% w/w) |
|---|---|---|---|
| Styrene | 15.51 | 17.49 | 18.0 |
| Acrylic Acid | 28.50 | 32.14 | 30.1 |
| α-Methylstyrene | 34.37 | 38.87 | 37.0 |
| 1-Octadecanol | 10.19 | 11.49 | |
| Octadecyl acrylate | | | 14.9 |
| Xylene | 10.00 | — | — |
| Di-t-butyl peroxide | 1.32 | — | — |

[a]Normalized reactor feed was calculated by assuming that initiator and solvent were not present in the feed.

Exemplary Resin 34

Exemplary Resin 34 was prepared by the polymerization and esterification process with added solvent. The reaction components utilized, reactor feeds and resin composition are summarized in Table 34. The polymerization reaction conditions included an about 15 minute reactor residence time and a reaction temperature of about 211° C. The resultant resin had a molecular weight ($M_w$) of about 6,600 daltons and an acid number of 218.

TABLE 34

| Reaction Components | Reactor Feed (% w/w) | Normalized Reactor Feed (% w/w)[a] |
|---|---|---|
| Styrene | 14.04 | 16.76 |
| Acrylic Acid | 26.93 | 32.14 |
| α-Methylstyrene | 31.19 | 37.22 |
| 1-Docosanol | 11.63 | |
| Docosyl acrylate | | 13.88 |
| Xylene | 15.00 | — |
| Di-t-butyl peroxide | 1.22 | — |

[a]Normalized reactor feed was calculated by assuming that initiator and solvent were not present in the feed.

Exemplary Resin 35

Exemplary Resin 35 was prepared by the polymerization and esterification process with added solvent. The reaction components utilized, reactor feeds and resin composition are summarized in Table 35. The polymerization reaction conditions included an about 15 minute reactor residence time and a reaction temperature of about 212° C. The resultant resin had a molecular weight ($M_w$) of about 6,200 daltons and an acid number of 236. Analysis of the polymeric product and process indicated that about 77.4 percent of the alkanol had been incorporated into the polymer.

TABLE 35

| Reaction Components | Reactor Feed (% w/w) | Normalized Reactor Feed (% w/w)[a] | Resin Composition (% w/w) |
|---|---|---|---|
| Styrene | 16.49 | 18.60 | 19.5 |
| Acrylic Acid | 28.49 | 32.14 | 31.3 |
| α-Methylstyrene | 36.64 | 41.34 | 40.3 |
| Isododecanol | 7.02 | 7.92 | |
| Isododecyl acrylate | | | 8.9 |
| Xylene | 10.00 | — | — |
| Di-t-butyl peroxide | 1.36 | — | — |

[a]Normalized reactor feed was calculated by assuming that initiator and solvent were not present in the feed.

Exemplary Resin 36

Exemplary Resin 36 was prepared by the polymerization and esterification process with added solvent. The reaction components utilized, reactor feeds and resin composition are summarized in Table 36. The polymerization reaction conditions included an about 15 minute reactor residence time and a reaction temperature of about 211° C. The resultant resin had a molecular weight ($M_w$) of about 6,300 daltons and an acid number of 225. Analysis of the polymeric product and process indicated that about 94.8 percent of the alkanol had been incorporated into the polymer.

TABLE 36

| Reaction Components | Reactor Feed (% w/w) | Normalized Reactor Feed (% w/w)[a] | Resin Composition (% w/w) |
|---|---|---|---|
| Styrene | 15.84 | 17.86 | 18.5 |
| Acrylic Acid | 28.50 | 32.14 | 30.4 |
| α-Methylstyrene | 35.20 | 39.70 | 37.9 |
| Isohexadecanol | 9.13 | 10.30 | |
| Isohexadecyl acrylate | | | 13.2 |
| Xylene | 10.00 | — | — |
| Di-t-butyl peroxide | 1.34 | — | — |

[a]Normalized reactor feed was calculated by assuming that initiator and solvent were not present in the feed.

Exemplary Resin 37

Exemplary Resin 37 was prepared by the polymerization and esterification process with added solvent. The reaction components utilized, reactor feeds and resin composition are summarized in Table 37. The polymerization reaction conditions included an about 15 minute reactor residence time and a reaction temperature of about 211° C. The resultant resin had a molecular weight ($M_w$) of about 6,500 daltons and an acid number of 225. Analysis of the polymeric product and process indicated that about 97.2 percent of the alkanol had been incorporated into the polymer.

TABLE 37

| Reaction Components | Reactor Feed (% w/w) | Normalized Reactor Feed (% w/w)[a] | Resin Composition (% w/w) |
|---|---|---|---|
| Styrene | 15.42 | 17.39 | 17.9 |
| Acrylic Acid | 28.50 | 32.14 | 30.3 |
| α-Methylstyrene | 34.27 | 39.65 | 36.8 |
| Isoeicosanol | 10.48 | 11.82 | |
| Isoeicosyl acrylate | | | 15.0 |

TABLE 37-continued

| Reaction Components | Reactor Feed (% w/w) | Normalized Reactor Feed (% w/w)[a] | Resin Composition (% w/w) |
|---|---|---|---|
| Xylene | 10.00 | — | — |
| Di-t-butyl peroxide | 1.32 | — | — |

[a]Normalized reactor feed was calculated by assuming that initiator and solvent were not present in the feed.

Exemplary Resin 38

Exemplary Resin 38 was prepared by the polymerization and esterification process with added solvent. The reaction components utilized, reactor feeds and resin composition are summarized in Table 38. The polymerization reaction conditions included an about 15 minute reactor residence time and a reaction temperature of about 212° C. The resultant resin had a molecular weight ($M_w$) of about 7,700 daltons and an acid number of 212.

TABLE 38

| Reaction Components | Reactor Feed (% w/w) | Normalized Reactor Feed (% w/w)[a] |
|---|---|---|
| Styrene | 12.58 | 14.17 |
| Acrylic Acid | 28.54 | 32.14 |
| α-Methylstyrene | 27.95 | 31.48 |
| Isohexatriacontanol | 19.73 | |
| Isohexatriacosyl acrylate | | 22.22 |
| Xylene | 10.00 | — |
| Di-t-butyl peroxide | 1.19 | — |

[a]Normalized reactor feed was calculated by assuming that initiator and solvent were not present in the feed.

Exemplary Resin 39

Exemplary Resin 39 was prepared by the polymerization and esterification process with added solvent. The reaction components utilized, reactor feeds and resin composition are summarized in Table 39. The polymerization reaction conditions included an about 15 minute reactor residence time and a reaction temperature of about 215° C. The resultant resin had a molecular weight ($M_w$) of about 6,600 daltons and an acid number of 149. Analysis of the polymeric product and process indicated that about 71.3 percent of the alkanol had been incorporated into the polymer.

TABLE 39

| Reaction Components | Reactor Feed (% w/w) | Normalized Reactor Feed (% w/w)[a] | Resin Composition (% w/w) |
|---|---|---|---|
| Styrene | 19.05 | 22.56 | 25.9 |
| Acrylic Acid | 15.62 | 18.49 | 19.9 |
| α-Methylstyrene | 42.32 | 50.11 | 42.7 |
| 1-Tetradecanol | 7.47 | 8.84 | |
| Tetradecyl acrylate | | | 11.5 |
| Xylene | 15.00 | — | — |
| Di-t-butyl peroxide | 0.54 | — | — |

[a]Normalized reactor feed was calculated by assuming that initiator and solvent were not present in the feed.

Exemplary Resin 40

Exemplary Resin 40 was prepared by the polymerization and esterification process with added solvent. The reaction components utilized, reactor feeds and resin composition are summarized in Table 40. The polymerization reaction conditions included an about 15 minute reactor residence time and a reaction temperature of about 215° C. The resultant resin had a molecular weight ($M_w$) of about 3,800 daltons and an acid number of 150. Analysis of the polymeric product and process indicated that about 66.7 percent of the alkanol had been incorporated into the polymer.

TABLE 40

| Reaction Components | Reactor Feed (% w/w) | Normalized Reactor Feed (% w/w)[a] | Resin Composition (% w/w) |
|---|---|---|---|
| Styrene | 18.69 | 22.55 | 26.0 |
| Acrylic Acid | 15.33 | 18.50 | 20.3 |
| α-Methylstyrene | 41.53 | 50.11 | 43.9 |
| 1-Tetradecanol | 7.33 | 8.84 | |
| Tetradecyl acrylate | | | 9.8 |
| Xylene | 15.00 | — | — |
| Di-t-butyl peroxide | 2.13 | — | — |

[a]Normalized reactor feed was calculated by assuming that initiator and solvent were not present in the feed.

Exemplary Resin 41

Exemplary Resin 41 was prepared by the polymerization and esterification process with added solvent. The reaction components utilized, reactor feeds and resin composition are summarized in Table 41. The polymerization reaction conditions included an about 15 minute reactor residence time and a reaction temperature of about 215° C. The resultant resin had a molecular weight ($M_w$) of about 7,200 daltons and an acid number of 205. Analysis of the polymeric product and process indicated that about 87.3 percent of the alkanol had been incorporated into the polymer.

TABLE 41

| Reaction Components | Reactor Feed (% w/w) | Normalized Reactor Feed (% w/w)[a] | Resin Composition (% w/w) |
|---|---|---|---|
| Styrene | 16.42 | 19.45 | 16.8 |
| Acrylic Acid | 24.05 | 28.49 | 28.8 |
| α-Methylstyrene | 36.49 | 43.22 | 42.1 |
| 1-Tetradecanol | 7.46 | 8.84 | |
| Tetradecyl acrylate | | | 12.3 |
| Xylene | 15.00 | — | — |
| Di-t-butyl peroxide | 0.57 | — | — |

[a]Normalized reactor feed was calculated by assuming that initiator and solvent were not present in the feed.

Exemplary Resin 42

Exemplary Resin 42 was prepared by the polymerization and esterification process with added solvent. The reaction components utilized, reactor feeds and resin composition are summarized in Table 42. The polymerization reaction conditions included an about 15 minute reactor residence time and a reaction temperature of about 212° C. The resultant resin had a molecular weight ($M_w$) of about 18,200 daltons and an acid number of 187. Analysis of the polymeric product and process indicated that about 84.4 percent of the alkanol had been incorporated into the polymer.

Exemplary Resin 43

Exemplary Resin 43 was prepared by the polymerization and esterification process with added solvent. The reaction components utilized, reactor feeds and resin composition are summarized in Table 43. The polymerization reaction conditions included an about 15 minute reactor residence time and a reaction temperature of about 254° C. The resultant resin had a molecular weight ($M_w$) of about 1,900 daltons and an acid number of 212. Analysis of the polymeric product and process indicated that about 95.4 percent of the alkanol had been incorporated into the polymer.

TABLE 43

| Reaction Components | Reactor Feed (% w/w) | Normalized Reactor Feed (% w/w)[a] | Resin Composition (% w/w) |
|---|---|---|---|
| Styrene | 15.81 | 16.30 | 17.4 |
| Acrylic Acid | 31.73 | 32.71 | 32.5 |
| α-Methylstyrene | 34.46 | 35.53 | 30.0 |
| 1-Hexadecanol | 15.00 | 15.46 | |
| Hexadecyl acrylate | | | 20.1 |
| Di-t-butyl peroxide | 3.00 | — | — |

[a]Normalized reactor feed was calculated by assuming that initiator was not present in the feed.

Exemplary Resin 44

Exemplary Resin 44 was prepared by the polymerization and esterification process with added solvent. The reaction components utilized, reactor feeds and resin composition are summarized in Table 44. The polymerization reaction conditions included an about 15 minute reactor residence time and a reaction temperature of about 216° C. The resultant resin had a molecular weight ($M_w$) of about 5,100 daltons and an acid number of 169. Analysis of the polymeric product and process indicated that about 84.1 percent of the alkanol had been incorporated into the polymer.

Exemplary Resin 45

Exemplary Resin 45 was prepared by the polymerization and esterification 20 process with added solvent. The reaction components utilized, reactor feeds and resin composition are summarized in Table 45. The polymerization reaction conditions included an about 15 minute reactor residence time and a reaction temperature of about 207° C. The resultant resin had a molecular weight ($M_w$) of about 8,000 daltons and an acid number of 167. Analysis of the polymeric product and process indicated that about 93.1 percent of 1-tetradecanol and about 90.9 percent of 1-docosanol had been incorporated into the polymer.

TABLE 45

| Reaction Components | Reactor Feed (% w/w) | Normalized Reactor Feed (% w/w)[a] | Resin Composition (% w/w) |
|---|---|---|---|
| Acrylic Acid | 22.20 | 24.74 | 22.9 |
| Methyl methacrylate | 34.32 | 38.24 | 37.9 |
| Butyl acrylate | 20.59 | 22.94 | 22.7 |
| 1-Tetradecanol | 5.06 | 5.64 | |
| Tetradecyl acrylate | | | 7.0 |
| 1-Docosanol | 7.57 | 8.44 | |
| Docosyl acrylate | | | 9.6 |
| Xylene | 10.00 | — | — |
| Di-t-butyl peroxide | 0.25 | — | — |

[a]Normalized reactor feed was calculated by assuming that initiator and solvent were not present in the feed.

Exemplary Resin 46

Exemplary Resin 46 was prepared by the polymerization and esterification process with added solvent. The reaction components utilized, reactor feeds and resin composition are summarized in Table 46. The polymerization reaction conditions included an about 15 minute reactor residence time and a reaction temperature of about 216° C. The resultant resin had a molecular weight ($M_w$) of about 11,300 daltons and an acid number of 192. Analysis of the polymeric product and process indicated that about 95.3 percent of the alkanol had been incorporated into the polymer.

TABLE 46

| Reaction Components | Reactor Feed (% w/w) | Normalized Reactor Feed (% w/w)[a] | Resin Composition (% w/w) |
|---|---|---|---|
| Styrene | 14.27 | 15.46 | 15.7 |
| Acrylic Acid | 33.57 | 36.36 | 26.0 |
| α-Methylstyrene | 16.79 | 18.18 | 17.9 |
| 1-Tetradecanol | 27.70 | 30.00 | |
| Tetradecyl acrylate | | | 40.4 |
| Xylene | 7.50 | — | — |
| Di-t-butyl peroxide | 0.18 | — | — |

[a]Normalized reactor feed was calculated by assuming that initiator and solvent were not present in the feed.

Exemplary Resin 47

Exemplary Resin 47 was prepared by the polymerization and esterification process with added solvent. The reaction components utilized, reactor feeds and resin composition are summarized in Table 47. The polymerization reaction conditions included an about 15 minute reactor residence time and a reaction temperature of about 216° C. The resultant resin had a molecular weight ($M_w$) of about 7,400 daltons and an acid number of 144.

TABLE 47

| Reaction Components | Reactor Feed (% w/w) | Normalized Reactor Feed (% w/w)[a] |
|---|---|---|
| Styrene | 17.84 | 21.11 |
| Acrylic Acid | 15.63 | 18.50 |
| α-Methylstyrene | 39.64 | 46.92 |
| 1-Docosanol | 11.38 | |
| Docosyl acrylate | | 13.47 |
| Xylene | 15.00 | — |
| Di-t-butyl peroxide | 0.52 | — |

[a]Normalized reactor feed was calculated by assuming that initiator and solvent were not present in the feed.

Exemplary Resin 48

Exemplary Resin 48 was prepared by the polymerization and esterification process with added solvent. The reaction components utilized, reactor feeds and resin composition are summarized in Table 48. The polymerization reaction conditions included an about 15 minute reactor residence time and a reaction temperature of about 216° C. The resultant resin had a molecular weight ($M_w$) of about 3,700 daltons and an acid number of 145. Analysis of the polymeric product and process indicated that about 67.6 percent of the alkanol had been incorporated into the polymer.

TABLE 48

| Reaction Components | Reactor Feed (% w/w) | Normalized Reactor Feed (% w/w)[a] | Resin Composition (% w/w) |
|---|---|---|---|
| Styrene | 17.52 | 21.12 | 24.3 |
| Acrylic Acid | 15.35 | 18.50 | 19.8 |
| α-Methylstyrene | 38.91 | 46.90 | 41.8 |
| 1-Docosanol | 11.18 | 13.48 | |
| Docosyl acrylate | | | 14.1 |
| Xylene | 15.00 | — | — |
| Di-t-butyl peroxide | 2.04 | — | — |

[a]Normalized reactor feed was calculated by assuming that initiator and solvent were not present in the feed.

Exemplary Resin 49

Exemplary Resin 49 was prepared by the polymerization and esterification process with added solvent. The reaction components utilized, reactor feeds and resin composition are summarized in Table 49. The polymerization reaction conditions included an about 15 minute reactor residence time and a reaction temperature of about 216° C. The resultant resin had a molecular weight ($M_w$) of about 4,200 daltons and an acid number of 198. Analysis of the polymeric product and process indicated that about 88.6 percent of the alkanol had been incorporated into the polymer.

Exemplary Resin 50

Exemplary Resin 50 was prepared by the polymerization and esterification process with added solvent. The reaction components utilized, reactor feeds and resin composition are summarized in Table 50. The polymerization reaction conditions included an about 15 minute reactor residence time and a reaction temperature of about 216° C. The resultant resin had a molecular weight ($M_w$) of about 7,800 daltons and an acid number of 202. Analysis of the polymeric product and process indicated that about 91.6 percent of the alkanol had been incorporated into the polymer.

TABLE 50

| Reaction Components | Reactor Feed (% w/w) | Normalized Reactor Feed (% w/w)[a] | Resin Composition (% w/w) |
|---|---|---|---|
| Styrene | 15.21 | 18.01 | 18.7 |
| Acrylic Acid | 24.06 | 28.49 | 27.1 |
| α-Methylstyrene | 33.81 | 40.03 | 37.0 |
| 1-Docosanol | 11.38 | 13.47 | |
| Docosyl acrylate | | | 17.2 |
| Xylene | 15.00 | — | — |
| Di-t-butyl peroxide | 0.55 | — | — |

[a]Normalized reactor feed was calculated by assuming that initiator and solvent were not present in the feed.

Exemplary Resin 51

Exemplary Resin 51 was prepared by the polymerization and esterification process with added solvent. The reaction components utilized, reactor feeds and resin composition are summarized in Table 51. The polymerization reaction conditions included an about 15 minute reactor residence time and a reaction temperature of about 216° C. The resultant resin had a molecular weight ($M_w$) of about 4,400 daltons and an acid number of 201. Analysis of the polymeric product and process indicated that about 94.0 percent of the alkanol had been incorporated into the polymer.

TABLE 51

| Reaction Components | Reactor Feed (% w/w) | Normalized Reactor Feed (% w/w)[a] | Resin Composition (% w/w) |
|---|---|---|---|
| Styrene | 14.92 | 18.01 | 18.8 |
| Acrylic Acid | 23.60 | 28.49 | 27.1 |
| α-Methylstyrene | 33.16 | 40.03 | 37.5 |
| 1-Docosanol | 11.16 | 13.47 | |
| Docosyl acrylate | | | 16.6 |
| Xylene | 15.00 | — | — |
| Di-t-butyl peroxide | 2.15 | — | — |

[a]Normalized reactor feed was calculated by assuming that initiator and solvent were not present in the feed.

Exemplary Resin 52

Exemplary Resin 52 was prepared by the polymerization and esterification process with added solvent. The reaction components utilized, reactor feeds and resin composition are summarized in Table 52. The polymerization reaction conditions included an about 15 minute reactor residence time and a reaction temperature of about 216° C. The resultant resin had a molecular weight ($M_w$) of about 5,000 daltons and an acid number of 178. Analysis of the polymeric product and process indicated that about 87.2 percent of the alkanol had been incorporated into the polymer.

TABLE 52

| Reaction Components | Reactor Feed (% w/w) | Normalized Reactor Feed (% w/w)[a] | Resin Composition (% w/w) |
|---|---|---|---|
| Styrene | 16.96 | 20.27 | 21.6 |
| Acrylic Acid | 19.65 | 23.49 | 23.5 |
| α-Methylstyrene | 37.70 | 45.07 | 40.8 |
| 1-Octadecanol | 9.34 | 11.17 | |
| Octadecyl acrylate | | | 14.1 |
| Xylene | 15.00 | — | — |
| Di-t-butyl peroxide | 1.35 | — | — |

[a]Normalized reactor feed was calculated by assuming that initiator and solvent were not present in the feed.

Exemplary Resin 53

Exemplary Resin 53 was prepared by the bulk polymerization and esterification process. The reaction components utilized, reactor feeds and resin composition are summarized in Table 53. The polymerization reaction conditions included an about 15 minute reactor residence time and a reaction temperature of about 255° C. The resultant resin had a molecular weight ($M_w$) of about 1,200 daltons and an acid number of 201. Analysis of the polymeric product and process indicated that about 97.6 percent of the alkanol had been incorporated into the polymer.

TABLE 53

| Reaction Components | Reactor Feed (% w/w) | Normalized Reactor Feed (% w/w)[a] | Resin Composition (% w/w) |
|---|---|---|---|
| Styrene | 45.59 | 46.52 | 49.5 |
| Methacrylic Acid | 42.41 | 43.28 | 36.4 |
| 1-Hexadecanol | 10.00 | 10.20 | |
| Hexadecyl acrylate | | | 14.1 |
| Di-t-butyl peroxide | 2.00 | — | — |

[a]Normalized reactor feed was calculated by assuming that initiator was not present in the feed.

Exemplary Resin 54

Exemplary Resin 54 was prepared by the bulk polymerization and esterification process using an unsaturated C18 alkanol. The reaction components utilized, reactor feeds and resin composition are summarized in Table 54. The polymerization reaction conditions included an about 15 minute reactor residence time and a reaction temperature of about 254° C. The resultant resin had a molecular weight ($M_w$) of about 4,200 daltons and an acid number of 242. Analysis of the polymeric product and process indicated that about 94.0 percent of the unsaturated alkanol had been incorporated into the polymer.

TABLE 54

| Reaction Components | Reactor Feed (% w/w) | Normalized Reactor Feed (% w/w)[a] | Resin Composition (% w/w) |
|---|---|---|---|
| Styrene | 14.32 | 14.76 | 15.2 |
| Acrylic Acid | 36.49 | 37.62 | 38.4 |
| α-Methylstyrene | 31.19 | 32.15 | 30.9 |
| Oleyl alcohol | 15.00 | 15.46 | |
| Oleyl acrylate | | | 15.5 |
| Di-t-butyl peroxide | 3.00 | — | — |

[a]Normalized reactor feed was calculated by assuming that initiator was not present in the feed.

Conventional Resin 1

A series of conventional resins were also prepared. These conventional resins were prepared by a similar process as the exemplary resins of the present invention, but were prepared without the presence of the R—OH alkanol of the present invention, with R being a linear or branched chain alkyl moiety having greater than 11 carbon atoms. These conventional resins were then compared to the exemplary resins of the present invention in a number of applications.

Conventional Resin 1 was prepared by the bulk polymerization and esterification process. The reaction components utilized and reactor feeds are summarized in Table 55. The polymerization reaction conditions included an about 12 minute reactor residence time and a reaction temperature of about 228° C. The resultant resin had a molecular weight ($M_w$) of about 9,000 daltons and an acid number of 220.

TABLE 55

| Reaction Components | Reactor Feed (% w/w) |
|---|---|
| Styrene | 27.35 |
| Acrylic Acid | 28.19 |
| α-Methylstyrene | 30.49 |
| Diethylene Glycol Monoethyl Ether | 13.79 |
| Di-t-butyl peroxide | 0.18 |

Conventional Resin 2

Conventional Resin 2 was prepared by the bulk polymerization and esterification process. The reaction components utilized and reactor feeds are summarized in Table 56. The polymerization reaction conditions included an about 12 minute reactor residence time and a reaction temperature of about 240° C. The resultant resin had a molecular weight ($M_w$) of about 6,500 daltons and an acid number of 201.

TABLE 56

| Reaction Components | Reactor Feed (% w/w) |
|---|---|
| Styrene | 42.39 |
| Acrylic Acid | 31.00 |
| α-Methylstyrene | 18.50 |
| Diethylene Glycol Monoethyl Ether | 7.94 |
| Di-t-butyl peroxide | 0.16 |

Conventional Resin 3

Conventional Resin 3 was prepared by the bulk polymerization and esterification process. The reaction components utilized and reactor feeds are summarized in Table 57. The polymerization reaction conditions included an about 12 minute reactor residence time and a reaction temperature of about 250° C. The resultant resin had a molecular weight ($M_w$) of about 4,700 daltons and an acid number of 219.

TABLE 57

| Reaction Components | Reactor Feed (% w/w) |
|---|---|
| Styrene | 40.56 |
| Acrylic Acid | 33.25 |
| α-Methylstyrene | 18.16 |
| Diethylene Glycol Monoethyl Ether | 7.87 |
| Di-t-butyl peroxide | 0.16 |

Conventional Resin 4

Conventional Resin 4 was prepared by the bulk polymerization and esterification process. The reaction components utilized and reactor feeds are summarized in Table 58. The polymerization reaction conditions included an about 12 minute reactor residence time and a reaction temperature of about 278° C. The resultant resin had a molecular weight ($M_w$) of about 1,800 daltons and an acid number of 244.

TABLE 58

| Reaction Components | Reactor Feed (% w/w) |
|---|---|
| Styrene | 32.28 |
| Acrylic Acid | 33.78 |
| α-Methylstyrene | 33.94 |

Conventional Resin 5

Conventional Resin 5 was prepared by the bulk polymerization and esterification process. The reaction components utilized and reactor feeds are summarized in Table 59. The polymerization reaction conditions included an about 12 minute reactor residence time and a reaction temperature of about 254° C. The resultant resin had a molecular weight ($M_w$) of about 1,800 daltons and an acid number of 244.

TABLE 59

| Reaction Components | Reactor Feed (% w/w) |
|---|---|
| Styrene | 20.67 |
| Acrylic Acid | 31.04 |
| α-Methylstyrene | 45.29 |
| Di-t-butyl peroxide | 3.00 |

Conventional Resin 6

Conventional Resin 6 was prepared by the bulk polymerization and esterification process. The reaction components utilized and reactor feeds are summarized in Table 60. The polymerization reaction conditions included an about 12 minute reactor residence time and a reaction temperature of about 254° C. The resultant resin had a molecular weight ($M_w$) of about 1,800 daltons and an acid number of 243.

TABLE 60

| Reaction Components | Reactor Feed (% w/w) |
|---|---|
| Styrene | 17.82 |
| Acrylic Acid | 32.33 |
| α-Methylstyrene | 39.57 |
| 2-Ethylhexyl Acrylate | 7.27 |
| Di-t-butyl peroxide | 3.00 |

Conventional Resin 7

Conventional Resin 7 was prepared by the polymerization and esterification process with added solvent. The reaction components utilized and reactor feeds are summarized in Table 61. The polymerization reaction conditions included an about 15 minute reactor residence time and a reaction temperature of about 216° C. The resultant resin had a molecular weight ($M_w$) of about 11,300 daltons and an acid number of 250. Analysis indicated that 68.9 percent of the ethylene glycol monoethyl ether was incorporated into the polymeric product.

TABLE 61

| Reaction Components | Reactor Feed (% w/w) | Normalized Reactor Feed (% w/w)[a] | Resin Composition (% w/w) |
|---|---|---|---|
| Styrene | 23.00 | 24.93 | 25.9 |
| Acrylic Acid | 33.56 | 36.37 | 33.9 |
| α-Methylstyrene | 27.05 | 29.32 | 29.7 |
| Diethylene Glycol Monoethyl Ether | 8.66 | 9.39 | |
| Diethylene Glycol Monoethyl Ether Acrylate | | | 10.5 |
| Xylene | 7.50 | — | — |
| Di-t-butyl peroxide | 0.22 | — | — |

[a]Normalized reactor feed was calculated by assuming that initiator and solvent were not present in the feed.

Conventional Resin 8

Conventional Resin 8 was prepared by the polymerization and esterification process with added solvent. The reaction components utilized and reactor feeds are summarized in Table 62. The polymerization reaction conditions included an about 15 minute reactor residence time and a reaction temperature of about 216° C. The resultant resin had a molecular weight ($M_w$) of about 11,100 daltons and an acid number of 254. Analysis of the polymeric product and process indicated that 67 percent of the ethylene glycol monoethyl ether was incorporated into the polymeric product.

TABLE 62

| Reaction Components | Reactor Feed (% w/w) | Normalized Reactor Feed (% w/w)[a] | Resin Composition (% w/w) |
|---|---|---|---|
| Styrene | 24.37 | 26.41 | 27.3 |
| Acrylic Acid | 33.56 | 36.36 | 34.9 |
| α-Methylstyrene | 28.67 | 31.07 | 31.2 |
| Diethylene Glycol Monoethyl Ether | 5.69 | 6.17 | |
| Diethylene Glycol Monoethyl Ether Acrylate | | | 6.6 |
| Xylene | 7.50 | — | — |
| Di-t-butyl peroxide | 0.21 | — | — |

[a]Normalized reactor feed was calculated by assuming that initiator and solvent were not present in the feed.

Conventional Resin 9

Conventional Resin 9 was prepared by the bulk polymerization and esterification process. The reaction components utilized and reactor feeds are summarized in Table 63. The polymerization reaction conditions included an about 90 minute reactor residence time and a reaction temperature of about 160° C. The resultant resin had a molecular weight ($M_w$) of about 8,200 daltons and an acid number of 162.

TABLE 63

| Reaction Components | Reactor Feed (% w/w) |
|---|---|
| Styrene | 23.35 |
| Acrylic Acid | 15.51 |
| α-Methylstyrene | 23.19 |
| Diethylene Glycol Monoethyl Ether | 36.03 |
| Di-t-butyl peroxide | 1.92 |

Conventional Resin 10

Conventional Resin 10 was prepared by the bulk polymerization and esterification process. The reaction components utilized and reactor feeds are summarized in Table 64. The polymerization reaction conditions included an about 12 minute reactor residence time and a reaction temperature of about 209° C. The resultant resin had a molecular weight ($M_w$) of about 16,200 daltons and an acid number of 212.

TABLE 64

| Reaction Components | Reactor Feed (% w/w) |
|---|---|
| Styrene | 36.56 |
| Acrylic Acid | 29.00 |
| α-Methylstyrene | 26.70 |
| Diethylene Glycol Monoethyl Ether | 3.20 |
| Butyl acrylate | 4.40 |
| Di-t-butyl peroxide | 0.14 |

Conventional Resin 11

Conventional Resin 11 was prepared by the bulk polymerization and esterification process. The reaction components utilized and reactor feeds are summarized in Table 65. The polymerization reaction conditions included an about 90 minute reactor residence time and a reaction temperature of about 161° C. The resultant resin had a molecular weight ($M_w$) of about 9,400 daltons and an acid number of 200.

TABLE 65

| Reaction Components | Reactor Feed (% w/w) |
|---|---|
| Styrene | 17.80 |
| Acrylic Acid | 18.52 |
| α-Methylstyrene | 22.82 |
| Diethylene Glycol Monoethyl Ether | 39.07 |
| Di-t-butyl peroxide | 1.79 |

Conventional Resin 12

Conventional Resin 12 was prepared by the polymerization and esterification process with added solvent. The reaction components utilized and reactor feeds are summarized in Table 66. The polymerization reaction conditions included an about minute reactor residence time and a reaction temperature of about 254° C. The resultant resin had a molecular weight ($M_w$) of about 1,600 daltons and an acid number of 224.

TABLE 66

| Reaction Components | Reactor Feed (% w/w) | Normalized Reactor Feed (% w/w)[a] | Resin Composition (% w/w) |
|---|---|---|---|
| Styrene | 19.57 | 22.49 | 25.3 |
| Acrylic Acid | 23.95 | 27.53 | 31.9 |
| α-Methylstyrene | 43.48 | 49.98 | 42.8 |
| Xylene | 10.00 | — | — |
| Di-t-butyl peroxide | 3.00 | — | — |

[a]Normalized reactor feed was calculated by assuming that initiator and solvent were not present in the feed.

Conventional Resin 13

Conventional Resin 13 was prepared by the bulk polymerization and esterification process. The reaction components utilized and reactor feeds are summarized in Table 67. The polymerization reaction conditions included an about minute reactor residence time and a reaction temperature of about 254° C. The resultant resin had a molecular weight ($M_w$) of about 1,600 daltons and an acid number of 221.

TABLE 67

| Reaction Components | Reactor Feed (% w/w) | Normalized Reactor Feed (% w/w)[a] | Resin Composition (% w/w) |
|---|---|---|---|
| Styrene | 17.03 | 19.57 | 21.0 |
| Acrylic Acid | 25.30 | 29.08 | 31.7 |
| α-Methylstyrene | 37.85 | 43.51 | 38.7 |
| 2-Ethylhexyl Acrylate | 6.82 | 7.84 | 8.6 |
| Xylene | 10.00 | — | — |
| Di-t-butyl peroxide | 3.00 | — | — |

[a]Normalized reactor feed was calculated by assuming that initiator and solvent were not present in the feed.

Conventional Resin 14

Conventional Resin 14 was prepared by the polymerization and esterification process with added solvent. The reaction components utilized and reactor feeds are summarized in Table 68. The polymerization reaction conditions included an about minute reactor residence time and a reaction temperature of about 211° C. The resultant resin had a molecular weight ($M_w$) of about 6,300 daltons and an acid number of 220.

TABLE 68

| Reaction Components | Reactor Feed (% w/w) | Normalized Reactor Feed (% w/w)[a] | Resin Composition (% w/w) |
|---|---|---|---|
| Styrene | 19.93 | 22.49 | 23.8 |
| Acrylic Acid | 44.28 | 49.98 | 46.5 |
| α-Methylstyrene | 24.39 | 27.53 | 29.8 |
| Xylene | 10.00 | — | — |
| Di-t-butyl peroxide | 1.40 | — | — |

[a]Normalized reactor feed was calculated by assuming that initiator and solvent were not present in the feed.

Conventional Resin 15

Conventional Resin 15 was prepared by the polymerization and esterification process with added solvent. The reaction components utilized and reactor feeds are summarized in Table 69. The polymerization reaction conditions included an about minute reactor residence time and a reaction temperature of about 211° C. The resultant resin had a molecular weight ($M_w$) of about 6,500 daltons and an acid number of 217.

TABLE 69

| Reaction Components | Reactor Feed (% w/w) | Normalized Reactor Feed (% w/w)[a] | Resin Composition (% w/w) |
|---|---|---|---|
| Styrene | 17.35 | 19.58 | 20.2 |
| Acrylic Acid | 38.54 | 43.50 | 30.3 |
| α-Methylstyrene | 25.76 | 29.07 | 41.3 |
| 2-Ethylhexyl acrylate | 6.95 | 7.84 | 8.2 |
| Xylene | 10.00 | — | — |
| Di-t-butyl peroxide | 1.40 | — | — |

[a]Normalized reactor feed was calculated by assuming that initiator and solvent were not present in the feed.

Conventional Resin 16

Conventional Resin 16 was prepared by the bulk polymerization and esterification process. The reaction components utilized and reactor feeds are summarized in Table 70. The polymerization reaction conditions included an about 12 minute reactor residence time and a reaction temperature of about 204° C. The resultant resin had a molecular weight ($M_w$) of about 8,500 daltons and an acid number of 205.

TABLE 70

| Reaction Components | Reactor Feed (% w/w) |
|---|---|
| Styrene | 28.83 |
| Acrylic Acid | 27.56 |
| α-Methylstyrene | 34.03 |
| Diethylene Glycol Monoethyl Ether | 8.40 |
| Di-t-butyl peroxide | 1.18 |

Preparation of Resin Cuts

The term "resin cut" or "resin solution" denotes an aqueous mixture of a resin, water, and a base. Exemplary resin cuts are described herein. An aqueous cut of an acid-functional acrylic or styrene/acrylic resin can be prepared by mixing the resin, water, and a base. The mixture is stirred from about 25° C. to about 90° C. until the resin is completely dissipated. The acid functional resin comprises about 5 to about 70 weight percent of the final resin cut. A sufficient amount of a base is added to neutralize about 50 to 150 percent of the acid in the acid functional resin. Typical bases used for neutralization of the acid functional resin are ammonia, hydroxides of group I elements, primary amines, secondary amines, and tertiary amines. The remainder of the resin cut is comprised of water, and optionally, a water-miscible solvent. The amount of water used in a resin cut is dependent on the acid value of the resin and its molecular weight. Typically, water is added at a level, such that the cut viscosity is below about 10,000 cps. Water-miscible solvents, such as lower alkyl alcohols, glycol ethers, tetrahydrofuran, and tetrahydrofurfuryl alcohol, can be added up to about 10 weight percent of the resin cut.

Resin Cut A: Preparation of an Aqueous Resin Cut of Exemplary Resin 1

The aqueous resin cut of Exemplary Resin 1 was prepared by the method described above. The cut was prepared from 488 grams of Exemplary Resin 1, 125.17 grams of 28 percent ammonia, and 386.83 grams of water. The resultant clear, amber resin cut exhibited a viscosity of 1,350 cps at a pH of 48.8 percent solids.

Resin Cut B: Preparation of an Aqueous Resin Cut of Exemplary Resin 5

The aqueous resin cut of Exemplary Resin 5 was prepared by the method described above. The cut was prepared from 340 grams of Exemplary Resin 5, 81.69 grams of 28 percent ammonia, and 428.47 grams of water. The resultant clear, amber resin cut exhibited a viscosity of 41,500 cps at a pH of 8.9 at 40 percent solids. After dilution to 34 percent solids, the cut had a viscosity of 520 cps.

Resin Cut C: Preparation of an Aqueous Resin Cut of Exemplary Resin 6

The aqueous cut of Exemplary Resin 6 was prepared by the method described above. The cut was prepared from 400 grams of Exemplary Resin 6, 96.10 grams of 28 percent ammonia, and 503.90 grams of water. The resultant clear, amber resin cut exhibited a viscosity of 3,680 cps at a pH of 8.5 at 40 percent solids. After dilution to 33 percent solids, the cut had a viscosity of 120 cps.

Resin Cut D: Preparation of an Aqueous Resin Cut of Exemplary Resin 7

The aqueous cut of Exemplary Resin 7 was prepared by the method described above. The cut was prepared from 450 grams of Exemplary Resin 7, 108.12 grams of 28 percent ammonia, and 441.88 grams of water. The resultant clear, amber resin cut exhibited a viscosity of 7,500 cps at a pH of 8.5 at 45 percent solids. After dilution to 37 percent solids, the cut had a viscosity of 280 cps.

Conventional Resin Cut A: Preparation of an Aqueous Resin Cut of Conventional Resin 1

The aqueous cut of Conventional Resin 1 was prepared by the method described above. The cut was prepared from 330 grams of Conventional Resin 1, 75.0 grams of 28 percent ammonia, and 585.0 grams of water. The resultant clear, amber resin cut exhibited a viscosity of 5,350 cps at a pH of 8.5 at 34 percent solids.

Conventional Resin Cut B: Preparation of an Aqueous Resin Cut of Conventional Resin 2

The aqueous cut of Conventional Resin 2 was prepared by the method described above. The cut was prepared from 330 grams of Conventional Resin 2, 71.0 grams of 28 percent ammonia, and 599.0 grams of water. The resultant clear, amber resin cut exhibited a viscosity of 4,500 cps at a pH of 8.5 at 33 percent solids.

Conventional Resin Cut C: Preparation of an Aqueous Resin Cut of Conventional Resin 3

The aqueous cut of Conventional Resin 3 was prepared by the method described above. The cut was prepared from 370 grams of Conventional Resin 3, 86.0 grams of 28 percent ammonia, and 543.0 grams of water. The resultant clear, amber resin cut exhibited a viscosity of 5,000 cps at a pH of 8.4 at 37 percent solids.

Conventional Resin Cut D: Preparation of an Aqueous Resin Cut of Conventional Resin 4

The aqueous cut of Conventional Resin 4 was prepared by the method described above. The cut was prepared from 488 grams of Conventional Resin 4, 125.70 grams of 28 percent ammonia, and 386.3 grams of water. The resultant clear, amber resin cut exhibited a viscosity of 4,900 cps at a pH of 8.5 at 48.8 percent solids.

Conventional Resin Cut E: Preparation of an Aqueous Resin Cut of Conventional Resin 5

The aqueous cut of Conventional Resin 5 was prepared by the method described above. The cut was prepared from 488 grams of Conventional Resin 5, 129.39 grams of 28 percent ammonia, and 382.61 grams of water. The resultant clear, amber resin cut exhibited a viscosity of 7,400 cps at a pH of 8.9 at 48.8 percent solids.

Tabulated Viscosity Measurements and Other Polymer Properties

Tables 71 through 77 present various data regarding the viscosity of resin cuts at various pH and concentrations for exemplary and conventional resins. The comparative data presented in Tables 71 through 77 are respectively illustrated in FIGS. 2–7 for convenience. These tables demonstrate the surprising and unexpected discovery that aqueous basic solutions containing the polymeric products of the invention exhibit remarkably low viscosities.

TABLE 71

| Resin | Aqueous Solution Viscosity (cps) | Resin Acid Number | Resin $M_W$ | Solution % Solids | Solution pH |
|---|---|---|---|---|---|
| Conventional Resin 1 | 5,500 | 220 | 9,000 | 34 | 8.4 |
| Exemplary Resin 5 | 520 | 221 | 9,100 | 34 | 8.0 |
| Conventional Resin 2 | 4,500 | 201 | 6,500 | 33 | 8.5 |
| Exemplary Resin 6 | 120 | 223 | 6,000 | 33 | 8.1 |
| Exemplary Resin 6 | 3,680 | 223 | 6,000 | 40 | 8.1 |
| Conventional Resin 3 | 5,000 | 219 | 4,700 | 37 | 8.4 |

TABLE 71-continued

| Resin | Aqueous Solution Viscosity (cps) | Resin Acid Number | Resin $M_W$ | Solution % Solids | Solution pH |
|---|---|---|---|---|---|
| Exemplary Resin 7 | 280 | 223 | 4,300 | 37 | 8.0 |
| Exemplary Resin 7 | 7,500 | 223 | 4,300 | 45 | 8.0 |

TABLE 72

| Resin | Aqueous Solution Viscosity (cps) | Resin Acid Number | Resin $M_W$ | Solution % Solids | Solution pH |
|---|---|---|---|---|---|
| Conventional Resin 4 | 4,900 | 244 | 1,800 | 48.8 | 8.4 |
| Conventional Resin 5 | 7,400 | 244 | 1,800 | 48.8 | 8.8 |
| Exemplary Resin 1 | 1,350 | 237 | 1,800 | 48.8 | 8.3 |
| Exemplary Resin 3 | 1,600 | 233 | 2,100 | 48.8 | 8.5 |

TABLE 73

| Resin | % Alcohol to Ester Conversion | Weight % Alcohol in Reactor Feed | Moles in Alcohol in Reactor Feed | Alcohol Type |
|---|---|---|---|---|
| Conventional Resin 7 | 69.9 | 9.39 | 0.0700 | diethylene glycol monoethyl ether |
| Exemplary Resin 13 | 96.9 | 15.00 | 0.0700 | 1-tetradecanol |
| Conventional Resin 8 | 67.0 | 6.17 | 0.0460 | diethylene glycol monoethyl ether |
| Exemplary Resin 14 | 99.4 | 15.00 | 0.0460 | 1-docosanol |
| Conventional Resin 1 | 27.0 | 13.80 | 0.1029 | diethylene glycol monoethyl ether |
| Exemplary Resin 8 | 99.4 | 30.00 | 0.0919 | 1-docosanol |

TABLE 74

| Number of Carbons in Alkanol | Exemplary Resin | 48.3% Solids Viscosity (cps) | Solution pH | Resin Acid Number | $M_W$ |
|---|---|---|---|---|---|
| C0 | Conventional Resin 12 | 6,300 | 9.3 | 224 | 1,600 |
| C8 | Conventional Resin 13 | 4,200 | 9.1 | 221 | 1,600 |
| C10 | Exemplary Resin 15 | 3,700 | 8.9 | 223 | 1,800 |
| C12 | Exemplary Resin 16 | 4,000 | 8.4 | 219 | 2,000 |
| C14 | Exemplary Resin 17 | 3,500 | 9.5 | 223 | 1,900 |
| C16 | Exemplary Resin 18 | 2,900 | 9.4 | 221 | 1,900 |
| C16/18 | Exemplary Resin 19 | 2,400 | 9.1 | 221 | 2,000 |
| C18/16 | Exemplary Resin 20 | 2,600 | 8.3 | 220 | 1,900 |
| C18 | Exemplary Resin 21 | 2,900 | 9.1 | 222 | 2,000 |
| C22 | Exemplary Resin 22 | 5,200 | 9.3 | 211 | 2,100 |
| Iso-C12 | Exemplary Resin 23 | 3,500 | 9.3 | 224 | 1,800 |
| Iso-C16 | Exemplary Resin 24 | 3,500 | 9.4 | 222 | 1,900 |

TABLE 74-continued

| Number of Carbons in Alkanol | Exemplary Resin | 48.3% Solids Viscosity (cps) | Solution pH | Resin Acid Number | $M_w$ |
|---|---|---|---|---|---|
| Iso-C20 | Exemplary Resin 25 | 3,200 | 8.8 | 222 | 1,900 |
| Iso-C36 | Exemplary Resin 26 | 6,400 | 9.1 | 208 | 2,400 |

TABLE 75

| Resin (Number of Carbons in Alkanol) | Exemplary Resin | 30.5% Solids Viscosity (cps) | Solution pH | Resin Acid Number | $M_w$ |
|---|---|---|---|---|---|
| Conventional Resin 2 | Conventional Resin 2 | 394 | 8.1 | 201 | 6,500 |
| C0 | Conventional Resin 14 | 395 | 7.8 | 220 | 6,300 |
| C8 | Conventional Resin 15 | 160 | 7.5 | 217 | 6,500 |
| C10 | Exemplary Resin 27 | 55 | 8.0 | 235 | 6,100 |
| C12 | Exemplary Resin 28 | 40 | 8.0 | 229 | 6,200 |
| C14 | Exemplary Resin 29 | 35 | 8.0 | 227 | 6,400 |
| C16 | Exemplary Resin 30 | 30 | 7.9 | 223 | 6,400 |
| C16/18 | Exemplary Resin 31 | 20 | 8.0 | 224 | 6,500 |
| C18/16 | Exemplary Resin 32 | 35 | 8.0 | 223 | 6,800 |
| C18 | Exemplary Resin 33 | 35 | 8.1 | 224 | 6,700 |
| C22 | Exemplary Resin 34 | 55 | 8.2 | 218 | 6,600 |
| Iso-C12 | Exemplary Resin 35 | 40 | 8.0 | 236 | 6,200 |
| Iso-C16 | Exemplary Resin 36 | 40 | 8.1 | 225 | 6,300 |
| Iso-C20 | Exemplary Resin 37 | 40 | 8.1 | 225 | 6,500 |
| Iso-C36 | Exemplary Resin 38 | 270 | 7.7 | 212 | 7,700 |

TABLE 76

| Number of Carbons in Alkanol | Fatty Alcohol Modified Resin Prepared at 254° C. | % ROH Conversion of RCOOR | Fatty Alcohol Modified Resin Prepared at 212° C. | % ROH Conversion of RCOOR |
|---|---|---|---|---|
| C10 | Exemplary Resin 15 | 95.6 | Exemplary Resin 27 | 71.2 |
| C12 | Exemplary Resin 16 | 97.6 | Exemplary Resin 28 | 88.1 |
| C14 | Exemplary Resin 17 | 97.9 | Exemplary Resin 29 | 93.3 |
| C16 | Exemplary Resin 18 | 98.0 | Exemplary Resin 30 | 96.6 |
| C16/C18 | Exemplary Resin 19 | 96.3 | Exemplary Resin 31 | 96.5 |
| C18/C16 | Exemplary Resin 20 | 98.1 | Exemplary Resin 32 | 97.1 |
| C18 | Exemplary Resin 21 | 97.3 | Exemplary Resin 33 | 97.8 |
| Iso-C12 | Exemplary Resin 23 | 96.2 | Exemplary Resin 35 | 77.4 |
| Iso-C16 | Exemplary Resin 24 | 97.8 | Exemplary Resin 36 | 94.8 |
| Iso-C20 | Exemplary Resin 25 | 99.3 | Exemplary Resin 37 | 97.2 |

Preparation of Exemplary Coatings, Pigment Dispersions, Paints, Inks, and Paper-Sizing Agents The high solids polymers have many applications. They are readily formulated into enamel appliance coatings, overprint varnishes, adhesives, and auto, truck, or airplane exterior finishes, coatings, and the like. They are also readily formulated into floor finishes, ink dispersants, water-based clear overprint varnishes, impregnants, binders, plasticizers, leveling agents, melt flow improvers and the like. Formulations containing the polymeric products of the present invention surprisingly and unexpectedly demonstrate performance characteristics over similar formulations that differ only in that the formulation incorporates a conventional resin in place of the resins of the present invention.

It was surprisingly and unexpectedly discovered that by employing the polymeric products of the invention, essentially solvent-free coatings systems may be obtained having usable viscosities at room temperature. Such systems are applicable in standard industrial coating processes, including spray coating, roll coating and the like. The products prepared from the process of the invention are formulated into such coating systems by addition of solvents, fillers, pigments, flow control agents and the like. Such coatings can be applied, with the addition of conventional adjuvants, to cans, coils, fabrics, vinyl, paper, metal, furniture, wire, metal parts, wood paneling and the like. Additionally, the polymeric products can also be formulated into excellent paper-sizing agents.

The alkali soluble resins may be formulated into resin cuts employing available aqueous bases, to provide exceptional leveling properties when incorporated into a floor polish composition with a suitable metallized acrylic, methacrylic or copolymer emulsion, a wax emulsion, and adjuvants such as plasticizers, conventional surfactants, and anti-foaming agents for organic solvents and/or organic bases.

It is contemplated that the esterification of the polymeric product in the continuous bulk polymerization and esterification process dramatically modifies the solubility of the resins in various solvents as compared to resins without the ester alkyl groups, and hence provides utility of the resins of the present invention in solvent-based inks. The incorporation of the ester groups in the resins of the present invention also dramatically enhances the ability of the resin to stabilize various materials, such as pigments, oils, waxes, other resins, solvents, monomers, or polymer colloids, in an aqueous environment. Furthermore, the resins of the present invention are contemplated to be useful in water-based air dry coatings systems, high gloss systems applications, and OPV applications. The resins are also contemplated to be useful components in moisture vapor transmission rate (MVTR) applications, and self-stratifying systems applications.

Preparation of Exemplary and Conventional Coatings from Exemplary Resin 1 and Conventional Resins 4 and 5

Coatings were formulated using the resins of the invention and a series of emulsion polymers. The emulsion polymers were prepared using the same processes as described below, but with varying polymer compositions.

The emulsion polymers were prepared by first preparing a resin solution. The resin solutions was prepared by mixing 20.2 grams of Polyglycol™ P1200, 314.6 grams of deionized water, and 825.7 grams of a solution of an acid functional styrene/acrylic resin in aqueous ammonia at 28.5 percent solids in a round bottom flask. The acid functional styrene/acrylic resin had a 34 α-methylstyrene/33 styrene/33 acrylic acid composition with an $M_w$ of about 9,500 daltons and an acid number of about 226. Polyglycol™ P1200 is a polypropylene glycol manufactured by The Dow Chemical Company of Midland, Mich. This mixture was heated to 82° C. under nitrogen.

A mixture of 14.8 grams of Tergitol™ 15-S-9, a linear alcohol ethoxylate available from Union Carbide (Danbury, Conn.), and a total of 668.3 grams of a hard non film-forming polymer, a hard film-forming polymer or a soft film-forming polymer was prepared. Ten percent of the Tergitol™-containing mixture was charged to the flask containing the hot resin solution and mixed for 3 minutes. A solution containing 4.4 grams of ammonium persulfate in 17.6 grams of water was then added and the resulting mixture was mixed for 5 minutes. The remainder of the Tergitol™-containing mixture was then added over 70 minutes. With 10 minutes remaining in the addition, the temperature was raised to 85° C. After the addition was complete, 112.0 grams of water and a second ammonium persulfate solution (2.6 grams in 10.4 grams of water) were added and the reaction mixture was heated at 85° C. for 1 hour. The emulsion polymer was then cooled and 3.0 grams of 28 percent ammonia was added.

Three polymer compositions were used to prepare the emulsion polymer. These included: a 100 percent styrene homopolymer, a hard non film-forming composition; a 50 percent methyl methacrylate/10 percent butyl acrylate/40 percent 2-ethylhexyl acrylate terpolymer composition, a hard film-forming composition; and a 20 percent methyl methacrylate/40 percent butyl acarylate/40 percent 2-ethylhexyl acrylate terpolymer composition, a soft film-forming polymer.

Coatings were prepared by mixing 10.7 parts of emulsion polymer, 45 parts of a resin as specified below, 11.6 parts of 28 percent ammonia, and 32.7 parts of water in a blender for 6 minutes at a medium speed. The resulting mixture was cooled and diluted to 105 cps with an appropriate amount of water to produce a coating. The coating was applied on a N2C Leneta™ card obtained from Leneta™ Company (Mahwah, N.J.), with a 165Q anilox handproofer. Exemplary Resin 1 and Conventional Resins 4 and 5 were used as the resin component of these coatings. Gloss (60°) was measured over the black and the white portions of Leneta™ cards with a gloss meter. Wetting, leveling, holdout, and distinctness of image (DOI) were assessed visually and compared. The results of these tests are presented in Tables 77 through 79. In Tables 77–79, "Std." denotes reference standard for visual assessments; "=" denotes performance equal to the standard; ">" denotes performance better than the standard; and ">>" denotes performance much better than the standard.

TABLE 77

Coatings Containing Poly(styrene) Emulsion Polymer

| Resin | Gloss/Black | Gloss/White | Wetting | Leveling | Hold-out | DOI |
|---|---|---|---|---|---|---|
| Exemp. Resin 1 | 88 | 81 | = | > | >> | >> |
| Conv. Resin 4 | 84 | 78 | Std. | Std. | Std. | Std. |

TABLE 78

Coatings Containing Hard, Film-Forming Emulsion Polymer.

| Resin | Gloss/Black | Gloss/White | Wetting | Leveling | Hold-out | DOI |
|---|---|---|---|---|---|---|
| Exemp. Resin 1 | 86 | 79 | = | > | >> | >> |
| Conv. Resin 4 | 84 | 75 | Std. | Std. | Std. | Std. |
| Conv. Resin 5 | 81 | 74 | = | = | = | = |

TABLE 79

Coatings Containing Soft, Film-Forming Emulsion Polymer.

| Resin | Gloss/Black | Gloss/White | Wetting | Leveling | Hold-out | DOI |
|---|---|---|---|---|---|---|
| Exemp. Resin 1 | 85 | 79 | = | > | >> | >> |
| Conv. Resin 4 | 81 | 73 | Std. | Std. | Std. | Std. |
| Conv. Resin 5 | 81 | 74 | = | = | = | = |

Preparation of Exemplary and Conventional Coatings from Exemplary Resins 39 and 40 and Conventional Resin 9

Clear coatings were formulated from emulsion polymers containing resin cuts of Exemplary Resins 39 and 40. A control emulsion polymer was prepared using Conventional Resin 9. A monomer mixture of 41 percent styrene, 28 percent methyl methacrylate, and 31 percent 2-ethylhexyl acrylate was used in each of the emulsion polymers. The final emulsion polymers had a solids content of about 43 percent.

Each of the three emulsion polymers was formulated into a clear coating. The coating formulation consisted of: 30 parts polymer solids; 9 parts of Dowanol™ EB, an ethylene glycol butyl ether product of the Dow Chemical Company of Midland, Mich.; 0.02 parts Zonyl™ FSJ solids, a wetting agent and product of E. I. duPont de Nemours, of Wilmington, Del.; and water added to produce a total of 100 parts.

The clear coatings were drawn down on variety of substrates for testing. A paddle blade and electric mixing motor was used to make the coatings. A series of properties were evaluated and the results are reported in the following table. It was surprisingly and unexpectedly discovered that the clear coatings incorporating the polymeric products of the present invention showed a greatly enhanced early water resistance as compared to clear coatings incorporating conventional resins.

TABLE 80

| Test | Substrate | Coating with Conventional Resin 9 | Coating with Exemplary Resin 40 | Coating with Exemplary Resin 39 |
|---|---|---|---|---|
| Early Water Resistance-4 hour dry | Leneta ™ 1B (black sealed part) | 5.8/7.3 | 9.8/10 | 9.9/10 |
| Early Water Resistance-24 hour dry | Leneta ™ 1B (black sealed part) | 9.3/8.7 | 9.7/10 | 9.8/9.5 |
| Chemical Resistance-50% Ethanol | Leneta ™ 1B (black sealed part) | 8.8/8.6 | 9.2/9.2 | 10/10 |
| Chemical Resistance-5% NaOH | Leneta ™ 1B (black sealed part) | 7.8/9.3 | 7.8/9.0 | 6.3/8.2 |
| Corrosion Resistance-Face rust | Bonderite ™ 1000 cold rolled steel; 3 mil Bird Bar | 5.5 | 5.5 | 5.5 |
| Corrosion Resistance-Undercut | Bonderite ™ 1000 cold rolled steel; 3 mil Bird Bar | 3/32" | 3/32" | 3/32" |
| Corrosion Resistance-Blisters | Bonderite ™ 1000 cold rolled steel | None | #4 few (10%) | None |
| Konig Hardness, rocks | Bonderite ™ 1000 cold rolled steel | 136 | 109 | 129 |
| Pencil Hardness | Bonderite ™ 1000 cold rolled steel | H | B | H |
| Gloss, 20 degrees | Leneta 1B white sealed part | 50 | 45 | 47 |
| 1 Gloss, 60 degree | Leneta ™ 1B white sealed part | 93 | 90 | 92 |
| Cross Hatch Tape adhesion | Bonderite ™ 1000 treated CRS | 5 | 4 | 4.5 |

The following test protocols were followed for each test shown in Table 80:

Early Water Resistance: The coating was applied to the substrate with a #50 wire wound draw bar and allowed to air dry for the indicated amount of time. At the end of the indicated time, a filter paper disk saturated with deionized water was placed on the coating for one hour. A watch glass was placed over the filter paper disk to reduce water evaporation. The test panel was flushed with tap water and the panels were inspected for damage to the coating. Six responses were gathered for each coating and rated on a 0–10 scale with 10 being the best. An average of the six responses for each coating is shown in the table. The first number corresponds to the average rating immediately after the test, and the second number is the average rating after the coating has fully recovered.

Chemical Resistance: The coating was applied to the substrate, initially dried in an oven at 35° C. overnight, and then allowed to air dry for 7 days. The procedure from the early water resistance test was followed for each of the indicated chemicals.

Corrosion Resistance: The clear coating was applied with a 3 mil Bird drawbar to Bonderite™ 1000, a cold rolled steel product of ACT Labs, Inc. of Hillsdale, Mich. The coating was allowed to dry for 47 days. The coating was scribed and subjected to 83 hours in a salt spray cabinet. Face rust was evaluated using ASTM B117 method. Undercut is the distance from the scribe to the edge of the corrosion about the scribe. Blistering was evaluated using ASTM D714.

Hardness: Hardness was measured using a Pendulum Hardness Tester, Konig from the Byk Gardner Company of Rivers Park, Md. The coating was air dried for 21 days. An average of 3 readings for each coating is reported in the table above. Pencil hardness measurements used Eagle Turquoise Pencils. The same drawdown procedure used in the corrosion resistance test was used.

Gloss: Gloss was measured on the white sealed portion of a Leneta 1B panel. The coating was applied to the panel with a #50 wire wound drawbar, and allowed to air dry for 2 days. A Micro-tri Gloss meter from Byk Gardner, a product of the Byk Gardner Company of Rivers Park, Md., was used to measure the gloss. The average reported in the table was based on 6 to 9 measurements.

Cross Hatch Tape Adhesion (according to ASTM D3359-95): A coating was applied to a panel of Bonderite™ 1000 cold rolled steel with a 3 mil Bird Drawbar and allowed to air dry for 26 days. The same drawdown procedure used in the corrosion resistance test was used. The coating was scored in a cross hatch pattern with an 11 blade Paint Adhesion Tester with 1.5 mm spacings obtained from Paul Gardner (Pompano Beach, Fla.). A piece of Scotch™ #610 tape from 3M Company of St. Paul, Minn. was applied to the coating; rubbed on with a pencil eraser; set in place for 60 to 120 seconds and then pulled at a 180 degree angle. The removal of the coating was evaluated with the 0–5 ("B") scale where a numerical value of 5 is equal to perfect adhesion.

Preparation of Exemplary and Conventional White Enamels from Exemplary Resins 39 and 40 and Conventional Resin 9

White enamel paints were formulated from emulsion polymers containing resin cuts of Exemplary Resin 39 and Exemplary Resin 40. A control emulsion polymer was prepared using Conventional Resin 9. A monomer mixture of 41 percent styrene, 28 percent methyl methacrylate, and 31 percent 2-ethylhexyl acrylate was used in each of the emulsion polymers. The final emulsion polymers had a solids content of about 43 percent. Each of the three emulsion polymers was formulated into a white enamel paint. It was surprisingly and unexpectedly discovered that paints incorporating the polymeric product of the present invention had a much higher gloss retention than similar paints which differed only in that they incorporated conventional resins rather than the polymeric products of the present invention.

A grind base was prepared by mixing the following materials shown in Table 81 in a high speed mixer for 15 minutes:

TABLE 81

| Grind Base Components | Quantity of Component |
| --- | --- |
| Water | 8.414 grams |
| Surfynol ™ CT-151 | 0.401 grams |
| Surfynol ™ 104DPM | 0.161 grams |
| Dehydran ™ 1620 | 0.048 grams |
| DSX ™-1550 | 0.040 grams |
| TiPure ™ R-706 | 20.034 grams |

Surfynol™ CT-151 and Surfynol™ 104DPM are brands of surfactant available from Air Products and Chemicals, Inc. (Allentown, Pa.). Dehydran™ 1620 is a brand of defoaming agent available from Henkel Corporation (Ambler, Pa.), and DSXTM-1550 is a brand associative thickener manufactured by Henkel Corporation (Ambler, Pa.). TiPure™ R-706 is a brand of titanium dioxide pigment available from E. I. duPont de Nemours (Wilmington, Del.).

Three white enamel paints were formulated by mixing the materials in the table below. For each paint, a different emulsion polymer was used.

TABLE 82

| Materials | Paint with Conventional Resin 9 | Paint with Exemplary Resin 40 | Paint with Exemplary Resin 39 |
| --- | --- | --- | --- |
| Emulsion Polymer | 58.1 | 58.8 | 58.1 |
| Grind base (Table 81) | 29.1 | 29.1 | 29.1 |
| Deionized Water | 67.5 | 67.5 | 67.5 |
| Dehydran ™ 1620 | 0.2 | 0.2 | 0.2 |
| Dowanol ™ EB | 5.0 | 5.0 | 5.0 |
| Dowanol ™ DPnB | 2.5 | 2.5 | 2.5 |
| Raybo ™ 60 | 0.3 | 0.3 | 0.3 |
| RM825 ™ | 4.7 | 0.9 | 6.3 |

Dowanol™ EB and Dowanol™ DPnB, plasticizing solvent brands of The Dow Chemical Company (Midland, Mich.), were mixed together and added as a mixture to the paint formula. Raybo™ 60 a flash rust inhibitor is a product of the Raybo Corporation (Huntington, W.Va.). RM825™ is an associative thickener available from Rohm & Haas Company (Spring House, Pa.). The associative thickener was added in various amounts to attain the appropriate application viscosity for the paint.

The white enamel paints were drawn down on variety of substrates for testing. A 0.003' Bird applicator was used to make the coatings. A series of properties were evaluated coating and the results are reported in the Table 83 below.

TABLE 83

| Test | Conventional Substrate | Paint with Exemplary Resin 9 | Paint with Exemplary Resin 40 | Paint with Resin 39 |
| --- | --- | --- | --- | --- |
| Humidity Resistance-Rusting | Bare rolled steel | 6 | none | none |
| Humidity Resistance-Blistering | Bare rolled steel | #8D | none | none |
| Durability- 20 Gloss retention | Aluminum panels | 13% | 79% | 41% |
| Durability- 60 Gloss retention | Aluminum panels | 49% | 97% | 78% |
| Scrub Resistance | Leneta ™ plastic scrub charts [#121-10N] | 457 | 1140 | 500 |
| Chemical Resistance- 10% Ethanol | Bonderite ™ 1000 cold rolled steel | 9.3 | 10 | 9.8 |
| Chemical Resistance- 10% NaOH | Bonderite ™ 1000 cold rolled steel | 8 | 8.5 | 8 |
| Corrosion Resistance- Face rust | Bare rolled steel | 4 | 4 | 5 |
| Corrosion Resistance- Undercut | Bare rolled steel | 10/32" | 7/32" | 8/32" |
| Corrosion Resistance- Blisters | Bare rolled steel | #8MD | #6D | #4MD |
| Konig Hardness, rocks | Bare rolled steel | 76 | 85 | 73 |
| Gloss, 20 degrees | Leneta ™ 1B | 35/38 | 50/35 | 34/36 |
| Gloss, 60 degree | Leneta ™ 1B | 79/83 | 88/83 | 78/81 |
| Cross Hatch Tape adhesion | Bare rolled steel | 5B | 5B | 5B |

The following test protocols were followed for each test:

Humidity Resistance: Humidity resistance was tested by placing panels in a QCT Cleveland Condensation cabinet, a product of Q-Panel Lab Products of Cleveland, Ohio, for 200 hours. The face rusting evaluation follows ASTM D-610. The blistering evaluation follows ASTM D-714.

Durability: The coating is tested for QUV durability for 1000 hours with the A bulbs. The exposure is performed in a QUV cabinet, a product of Q-Panel Lab Products of Cleveland, Ohio. The gloss loss is presented as a measure of the effect of UV radiation on these coatings. The gloss of the treated panel is presented as a percentage of the sample's original gloss.

Scrub Resistance: The scrub resistance of the coatings was evaluated using an Abrasion Tester, a product of Byk-Gardner Company of Rivers Park, Md. Films were applied using a 0.007-inch blade applicator to plastic scrub charts (Leneta™ #121-ION) and allowed to dry 14 days. The coating was scrubbed with an abrasive medium as per ASTM D-2486. The number of strokes needed to completely penetrate the coating is reported.

Chemical Resistance: The coating was applied to the substrate and allowed to air dry for at least 14 days. At the end of the indicated time, a filter paper disk saturated with the chemical was placed on the coating for one hour. A watch glass was placed over the filter paper disk to reduce water evaporation. The test panel was flushed with tap water and the panels were inspected for damage to the coating. Six responses were gathered for each coating and rated on a 0–10 scale with 10 being the best. An average of the six responses for each coating is shown in the table.

Corrosion Resistance: The clear coating was applied to bare cold rolled steel obtained from ACT Labs, Inc. (Hillsdale, Mich.). The coating was allowed to dry for at least 7 days. The coating was scribed and subjected to 86 hours in a salt spray cabinet, a product of Q-Panel Lab Products of Cleveland, Ohio. The tests were run according to ASTM B-117–90. Face rust was evaluated using ASTM D-610 method. Undercut was measured based on ASTM D-1654. Blistering was evaluated using ASTM D714.

Hardness: Hardness was measured using a Pendulum Hardness Tester, Konig from the Byk Gardner Company of Rivers Park, Md. An average of 3 readings for each coating is reported in the table above.

Gloss: Gloss was measured on the sealed portion of a Leneta™ 1B panel. The coating was applied to the panel with a 3-mil (0.003-inch) Bird blade applicator, and allowed to air dry. A Byk-Gardner micro tri-glossmeter, a product of the Byk Gardner Company of Rivers Park, Md., was used to measure the gloss.

Cross Hatch Tape Adhesion: A coating was applied to a panel of bare cold rolled steel and allowed to air dry for 14 days. The coating was scored in a cross hatch pattern with 4 a multiple tip cutter with eleven parallel blades spaced 1.5 mm apart, specified in ASTM D-3359. A piece of Scotch™ #610 tape was applied to the coating. The tape was pulled at a 90 degree angle and the removal of the coating was evaluated. The number represents the extent of adhesion loss, with 5 equal to no loss, 4 equal to very slight, and so on, with 0 equal to greater than 65% loss.

Preparation of Exemplary Water-Based Coating with Improved Barrier Properties and Preparation of Conventional Water-Based Coating.

The barrier properties of clay coated carton stock was evaluated after coating with a composition containing an acrylic emulsion polymer, a conventional or exemplary styrene acrylic resin, and a paraffin wax emulsion (Michelman 62330, Michelman Corp. Cincinnati, Ohio). Barrier performance was determined by a gravimetric method (TAPPI test method T 448 om-89 [TAPPI Press, 1992]), where the rate of water vapor passing through the coated stock was measured. Table 84 summarizes the water vapor transmission rate for a composition containing a standard styrene acrylic resin, and for a composition containing a resin of the present invention. The coating composition containing Exemplary Resin 33 provided improved barrier properties (lower water vapor transmission rate) compared to the coating composition containing Conventional Resin 1 even though the film thickness of the coating containing Exemplary Resin 33 was thinner than that containing Conventional Resin 1. This indicates that the reins of the present invention have important properties for use as MVTR applications.

TABLE 84

| Composition | Components[a] | | Coating Film Thickness | Water Vapor Trans. Rate[b] |
|---|---|---|---|---|
| Conventional Water-Barrier Coating | Acrylic Emulsion Polymer | 56% | 1.2 mils | 6 |
| | Conventional Resin 1 | 24% | | |
| | Paraffin Wax Emulsion | 20% | | |
| Exemplary Water-Barrier Coating | Acrylic Emulsion Polymer | 56% | 0.9 mils | 2 |
| | Exemplary Resin 33 | 24% | | |
| | Paraffin Wax Emulsion | 20% | | |

[a]Formula represented as parts of solids of each component.
[b]Expressed as grams per 100 square inches per 24 hours at 90% relative humidity and 37.8° C.

Preparation of Exemplary and Conventional High Solids Pigment Dispersions, Inks, and Bleachouts Various high solids pigment dispersions can be made utilizing the polymers of the present invention. For example, a higher solids yellow pigment dispersion was prepared by combining 220.86 grams of Roma Color 014-HS-1054 (a 48.9 percent solids presscake from Roma Color of Fall River, Mass.), 67.5 grams of Resin cut B, 9 grams of a polyalkylene glycol, 1.5 grams of Ultra Additives PI-35 (a product of Ultra Additives, inc. of Paterson, N.J.), and 1.14 grams of water in a 1 quart blending cup. This mixture was stirred and then poured into an Eiger mill. This mixture was processed for 40 minutes at 5,000 rpm using 70 mL of 1.0 to 1.5 mm glass beads as the grinding media. The cut had a viscosity of 41.50 seconds in a #3 Zahn cup and a pH of about 8.5 after 24 hours. The viscosity was 41.50 seconds in a #3 Zahn cup after 1 week.

A comparable yellow pigment dispersion was prepared using 220.86 grams of the Roma Color 014-HS-1054, 27 grams of powdered resin (1:1 mixture of Joncryl™ HPD 671 and Joncryl™ 678, both products of S. C. Johnson & Sons, Inc. of Racine, Wis.), 9 grams of polyalkylene glycol, 1.5 grams of Ultra Additives PI-35, 6.31 grams of 28 percent ammonia, and 35.33 grams of water. The dispersion was processed using the procedure described above. The resins had to be formulated into this system as powders because resin solutions were too thick to handle at the appropriate solids level. The dispersion had a viscosity of 50 seconds in a #3 Zahn cup and a pH of about 8.5 after 24 hours. The viscosity was 50 seconds in a #3 Zahn cup after 1 week.

Inks were made using 50 grams of the yellow pigment dispersion, 50 grams of Joncryl™ 624, and 5.25 grams of water. A drawdown was made on a N2A Leneta™ card using a #4 wire wound rod. Gloss measurements (60°) were taken using a gloss meter. The gloss of the ink containing resin dispersion B was 63 over the white portion of the card, while the gloss of the ink with the commercial resins was 62. It was surprisingly and unexpectedly discovered that inks that incorporated the polymeric products of the present invention exhibited less bronzing as compared to conventional inks which incorporated conventional resins.

Bleachouts were made with 95 grams of a bleaching white formula (50 percent Flexiverse™ WFD-5006 and 50 percent Joncryl™ 74), 4 grams of the yellow pigment dispersion, and 1 gram of Flexiverse™ BFD-1121. This formula was mixed thoroughly by adding 25 mL of glass beads to the container and tumbling the container on a roller mill. A drawdown was made on a N2A Leneta™ card using a #6 wire wound rod. The bleachouts containing Resin solution B exhibited better color development in comparison to the dispersion based on the commercial resins.

Joncryl™ 624 and Joncryl™ 74 are film-forming emulsions manufactured by S. C. Johnson & Sons, Inc. of Racine, Wis. Flexiverse™ WFD-5006 and Flexiverse™ BFD-1121 are white and blue pigment dispersions, respectively, manufactured by Sun Chemical Corporation of Fort Lee, N.J.

Preparation of Exemplary and Conventional Pigment Dispersions and Inks for Printing on Film and Foil An ink based on Exemplary Resin 42 was prepared for printing on film and foil. A conventional ink based on Conventional Resin 10 was prepared and used as a control. To prepare the inks, base pigment dispersions were prepared with the components listed in Table 85.

TABLE 85

| Conventional Pigment Dispersion | | Exemplary Pigment Dispersion | |
|---|---|---|---|
| Component | Quantity | Component | Quantity |
| Cut of Conventional Resin 10 | 170.45 grams | Cut of Exemplary Resin 42 | 170.04 grams |
| Water | 140.80 grams | Water | 124.20 grams |
| Surfynol ™ DF-58 | 1.25 grams | Surfynol ™ DF-58 | 1.18 grams |
| Sun 249-1282 ™ Blue | 187.50 grams | Sun 249-1282 ™ Blue | 177.25 grams |

The components of the pigment dispersion were combined and stirred with a spatula to wet out the pigment. The pigment was dispersed in the aqueous resin solution by milling the mixture in an Eiger mill for 20 minutes at 5000 rpm using about 70 mL of 1.0 to 1.5 mm glass beads as the grinding medium. The pigment dispersion formula contain 37.5 percent pigment and a 4 to 1 pigment to binder ratio. Surfynol™ DF-58 is a defoamer manufactured by Air Products and Chemicals, Inc. of Allentown, Pa. Sun 249–1282™ blue is a phthalo blue pigment manufactured by Sun Chemical Corporation of Cincinnati, Ohio.

Inks were prepared by mixing the pigment dispersions, emulsion polymers and water with an overhead stirring apparatus according to the composition presented in Table 86. The emulsion polymers were prepared in the presence of resin cuts of Conventional Resin 11 and Exemplary Resin 41. A monomer mixture of 48 percent butyl acrylate, 21 percent methyl methacrylate, and 31 percent 2-ethylhexyl acrylate was used in each of the emulsion polymers. The final emulsion polymers had a solids content of about 48 percent.

TABLE 86

| Conventional Ink | | Exemplary Ink | |
|---|---|---|---|
| Component | Quantity | Component | Quantity |
| Conventional Pigment Dispersion | 43.00 grams | Exemplary Pigment Dispersion | 43.00 grams |
| Conventional Emulsion | 50.00 grams | Exemplary Emulsion | 50.00 grams |
| Water | 8.00 grams | Water | 3.00 grams |

The water was used to adjust the ink viscosity to about 24 seconds on a #2 Zahn cup. Zahn cups can be purchased from Paul N. Gardner Company of Pompano Beach, Fla.

Side by side drawdowns were made on Leneta™ N2A panels with a #4 wire wound rod to test gloss and other ink appearance properties. The results are presented in Table 87.

TABLE 87

| Property | Conventional Ink | Exemplary Ink |
|---|---|---|
| 60 gloss, black portion | 44.4 | 44.1 |
| 60 gloss, black portion | 33.6 | 34.9 |
| Transparency | Standard | Slightly less |
| Bronzing | Yes | No |
| Color Strength | Equal | Equal |

Side by side drawdowns were made on paper backed aluminum foil with a #4 wire wound rod to test gloss and other ink appearance properties. The results are presented in Table 88.

TABLE 88

| Property | Conventional Ink | Exemplary Ink |
|---|---|---|
| 60 gloss | 90.6 | 94.2 |
| Color Strength | Equal | Equal |
| Transparency | Standard | Slightly less |

The inks were coated, side by side, onto a white medium slip LDPE (low density polyethylene) film, manufactured by the James River Corporation of Orange, Tex., using a 200P line anilox handproofer. The inked substrate was placed in a forced air oven at 50° C. for 10 seconds.

TABLE 89

| Property | Conventional Ink | Exemplary Ink |
|---|---|---|
| Gloss | Standard | Slightly less |
| Bronzing | Yes | No |
| Ink Transfer | Standard | Slightly less |
| Immediate Wet Crinkle | Standard-much ink loss | Much better-little ink loss |
| 24 hour Wet Crinkle | Standard-little ink loss | Equal-little ink loss |
| Immediate Tape Adhesion | Standard-little ink loss, slow pull | Equal-little ink loss, slow pull |
| 24 hour Tape Adhesion | Standard- little ink loss, slow pull | Equal-little ink loss, slow pull |
| Film Wetting | Good | Good |

Gloss, bronzing, ink transfer, and film wetting were evaluated by visual inspection and the results are presented in Table 89. Tape adhesion was measured with 3M #610 tape, a product of the 3M Company of St. Paul, Minn. The tape was applied with a four pound roller. The tape was then pulled at an angle 180 degrees from the plane of the inked film. Both a slow and a fast pull were performed with the same tape. A visual assessment of the ink removal was made. In the wet crinkle test, the inked substrate was immersed in room temperature water for 1 minute. The substrate was removed and crinkled between the thumb and forefinger of each hand for 50 to 100 crinkles or until the ink began to come off. The ink loss was evaluated visually. In the 24 hour wet crinkle test, the inked substrate, which was dried under ambient conditions for 24 hours, was immersed in room temperature water for 4 hours. The substrate was removed and crinkled between the thumb and forefinger of each hand for 200 crinkles or until the ink begins to come off. The ink loss was evaluated visually.

Preparation of Exemplary and Conventional Paper Surface Sizing Agents

Surface sizing agents are applied to paper to improve the ink receptivity and the surface properties of paper. The following example illustrates the utility of the aforementioned resin compositions as Surface Sizing Agents.

A 12% solids starch solution was prepared by charging 780 grams of deionized water and 120 grams of Penford 230, a starch obtained from Penford Products (Cedar Rapids, Iowa), into a two liter 4-necked round bottomed flask equipped with a thermometer, heating mantle, condenser, and mechanical agitator. While agitating, the temperature was raised to 95° C. over approximately 30 minutes, and an additional 30 minute conditioning was implemented. After the additional conditioning, an additional 432 grams of deionized water was added and the temperature was reduced to 65° C. The resulting solution was an 8% solids aqueous solution of Penford 230 starch.

Three equal 370 gram portions of the above starch solution were transferred to beakers, and additional water and additive were charged to complete the preparation of the surface size compositions described in the Table 90.

TABLE 90

|  | Example A | Example B | Example C |
|---|---|---|---|
| 8% Starch Solution Used | 370 grams | 370 grams | 370 grams |
| Deionized Water | 2.35 grams | 2.46 grams | 5.0 grams |
| Conventional Resin 1 | — | 2.54 grams | — |
| Exemplary Resin 34 | 2.65 | — | — |

Tests were performed to determine the efficacy of the paper sizing agents on paper stock. TAPPI (Technical Association of the Pulp and Paper Industry) 530 pm-89 test method was employed to determine the ink resistance of the coated paper stock. The method utilized a Hercules Size Tester (Hercules, Wilmington, Del.), an apparatus that provides a relative measure of the ink printability of paper. A volume of ink was placed on the paper, and the time needed to penetrate the liquid ink through the paper was measured. In addition to printability derived from the Surface Size Composition, the foaming attributes of the Size Composition are critical for proper application of the Size Composition.

Table 91 summarizes the ink printability as measured by the Hercules Size Tester and the foaming character of the corresponding Size Compositions.

TABLE 91

Ink Printability as Determined by Hercules Size Tester (TAPPI T530)

|  | Paper Coated with Example A | Paper Coated with Example B | Paper Coated with Example C |
|---|---|---|---|
| Description | Surface Size Composition of the Present Invention | Surface Size prepared from Conventional Resin | Control Example with no added resin |

TABLE 91-continued

Ink Printability as Determined by Hercules Size Tester (TAPPI T530)

|  | Paper Coated with Example A | Paper Coated with Example B | Paper Coated with Example C |
|---|---|---|---|
| HST (Seconds)[8] | 56 seconds | 47 seconds | 2 seconds |
| Foaming | Minimal | Considerable | None |

[8]Hercules Size Tester reading in seconds

As the above example illustrates, the resin composition of the present invention provides improvement in ink printability as well as reduced foaming in paper sizing applications.

Preparation of Exemplary Oil and Wax Emulsions

Various oil and wax emulsions were prepared using conventional and exemplary resins. Three types of oil were used to prepare oil emulsions including mineral oil, castor oil, and silicone oil. Mineral oil was selected as a representative of a common hydrocarbon oil, castor oil was chosen as a representative natural oil, and silicone oil was chosen as an example of a low-surface tension synthetic oil. All three oils formed emulsions with the exemplary resins using sonication to agitate the mixture and produce the emulsion.

Emulsions were prepared with paraffin wax, carnauba wax, AC-629 polyethylene wax, a wax manufactured by Allied Signal (Morristown, N.J.), and with Epolene E-15 wax, a product of Eastman Chemical Company (Kingsport, Tenn.). In each of the following preparations, parts were determined on the basis of weight.

Exemplary Oil Emulsion 1

A mixture of 43.72 parts of water and 33 parts of a 30.3% solids aqueous resin cut of Exemplary Resin 44 (83.9% neutralized with ammonia) was heated to 85° C. Drakeol 7, a white mineral oil available from Penreco Inc. (Karns City, Pa.) (20.00 parts), was separately heated to 85° C. and then 1.28 parts of diethylaminoethanol was blended into the heated oil. The aqueous mixture containing the resin cut of Exemplary Resin 44 was mixed with the oil/diethylaminoethanol mixture at 85° C. using a two inch, 3 blade propeller mixer increasing the speed from 200 to 620 rpm. After mixing the resulting emulsion for 15 minutes at 85° C., mixing was stopped and the mixture was allowed to stand for 3 minutes. The resulting mixture was then mixed for 10 minutes at 550 rpm and 85° C. and then it was force-cooled. An aliquot of the force-cooled product was removed and sonicated for 45 seconds at a setting of 5 using a Vibra-Cell™ sonicator available from Sonics & Materials (Bridgeport, Conn.). Without sonication, an oil/water emulsion was obtained which was opaque and unstable and phase separation began almost immediately. After sonication, on the other hand, a highly opaque and stable oil/water emulsion was obtained. No phase separation was detectable one hour after sonication although a lower layer comprising 25% of the total mixture occurred on standing overnight.

Exemplary Oil Emulsion 2

A mixture of 35.71 parts of water and 39.60 parts of a 30.3% solids aqueous resin cut of Exemplary Resin 44 (83.9% neutralized with ammonia) was mixed at 25° C. Drakeol 7 (20.00 parts) was separately blended with 0.68 parts of diethylaminoethanol. The aqueous mixture containing the resin cut of Exemplary Resin 44 was slowly added to the oil/diethylaminoethanol mixture at 25° C. while blended using a two inch, 3 blade propeller mixer increasing the speed from 200 to 750 rpm. After the addition was complete, the mixture was blended for an additional 5 minutes. The mixture was then allowed to stand for 5 minutes. The resulting mixture was then mixed for 20 minutes at 600 rpm and 25° C. While mixing was continued, the mixture was sonicated for 2 minutes at a setting of 5 using a Vibra-Cell™ sonicator. The mixer speed was decreased to 450 rpm as the emulsion thinned. Without sonication, an opaque water/oil emulsion was obtained. The water/oil emulsion was unstable and phase separation began almost immediately. After sonication, on the other hand, a highly opaque, low viscosity, and stable oil/water emulsion was obtained. Slight creaming was observed several hours after sonication and mixing was stopped, and lower layer comprising 5% of the total mixture was observed.

Exemplary Oil Emulsions 3–12

Exemplary Oil Emulsions 3–12 were prepared using the following procedure. At 25° C., 20 parts of Drakeol 7 and diethylaminoethanol (DEAE) were blended. The amount of diethylaminoethanol added was sufficient to completely react with any remaining carboxylic acid functionalities remaining on the polymer after the resin cut had been added. Thus, the amount of diethylaminoethanol used varied slightly from one oil emulsion to another. An aqueous resin cut of about 30% solids prepared from an exemplary resin was mixed with water, and warmed, if necessary, to clarify the solution. The aqueous resin-containing solution was then cooled to 30° C. and then added to the oil/diethylaminoethanol mixture over 5 minutes while increasing the mixing speed from 200 to 600 rpm. After addition was complete, the emulsion was mixed for 5 minutes at 750 rpm. While mixing was continued, the emulsion was sonicated for 2 minutes using a Vibra-Cell™ sonicator at a power setting of 5. The mixer speed was decreased from 750 to 400 rpm as the emulsions thinned. Generally, the emulsions were found to be viscous and opaque water/oil emulsions if sonication was not performed. These inverted to opaque low-viscosity oil/water emulsions with sonication. The following table provides stability and composition data for Exemplary Oil Emulsions 3–12.

TABLE 92

| | Composition of Oil Emulsions 3–12[a] | | | | Shelf Stability of Oil Emulsions |
|---|---|---|---|---|---|
| | Resin Cut Characteristics | | | | Days |
| Exemplary Oil Emulsion | Exemplary Resin Used to Prepare Resin Cut | Amount of Resin Cut used to Prepare Oil Emulsion (% w/w) | DN[b] (%) | DEAE added (% w/w) | Water Separation at 14 days (%) | to Free Oil Formation |
| 3 | 39 | 32.57 | 83.4 | 0.51 | 51 | >14 |
| 4 | 52 | 32.89 | 86.3 | 0.51 | 56 | >14 |
| 5 | 48 | 34.01 | 93.1 | 0.21 | 53 | >14 |
| 6 | 49 | 32.68 | 86.6 | 0.55 | Broken | 5 |
| 7 | 50 | 32.47 | 86.0 | 0.59 | 58 | >14 |
| 8 | 47 | 33.33 | 87.7 | 0.37 | 53 | >14 |
| 9 | 41 | 32.26 | 89.5 | 0.45 | 54 | >14 |
| 10 | 51 | 32.79 | 87.8 | 0.51 | 56 | >14 |
| 11 | 40 | 33.11 | 82.7 | 0.54 | Broken | 5 |
| 12 | 44 | 33.00 | 83.9 | 0.57 | 57 | >14 |

[a]Each of the oil emulsion formulations phase inverted on sonication to produce oil/water emulsions.
[b]DN (degree of neutralization) is the percent that the exemplary resin is neutralized with ammonia prior to adjustment with DEAE to 100% neutralization.

Exemplary Oil Emulsion 13

A mixture of 20 parts castor and 0.57 parts diethylaminoethanol, an amount sufficient to neutralize all the carboxylic acid groups on the exemplary resin, was prepared by blending the two components together at 40° C. A mixture of 33 parts of an aqueous resin cut with 30.3% solids of Exemplary Resin 44 and 46.43 parts water was also prepared. The aqueous mixture containing the resin cut of Exemplary Resin 44 was then added to the oil/diethylaminoethanol mixture over 5 minutes at 40° C. while the mixture was stirred at 200 to 350 rpm. After addition was complete, the resulting mixture was stirred for 8 minutes at 350 rpm. While mixing at 350 rpm continued, the mixture was sonicated at a power setting of 5 using a Vibra-Cell™ sonicator for 2 minutes. Before sonication, the mixture was a semi-opaque emulsion. After sonication, an opaque, low viscosity oil/water emulsion was obtained. After 14 days, water separation had occurred to an extent of 63%, but no free oil layer was observed.

Exemplary Oil Emulsion 14

A mixture of 20 parts silicone oil and 0.57 parts diethylaminoethanol, an amount sufficient to neutralize all the carboxylic acid groups on the exemplary resin, was prepared by blending the two components together at 25° C. A mixture of 33 parts of an aqueous resin cut with 30.3% solids of Exemplary Resin 44 and 46.43 parts water was also prepared. The aqueous mixture containing the resin cut of Exemplary Resin 44 was then added to the oil/diethylaminoethanol mixture over 6 minutes at 25° C. while the mixture was stirred at 200 to 600 rpm. After addition was complete, the resulting mixture was stirred for 10 minutes at 450 rpm. While mixing at 450 rpm continued, the mixture was sonicated at a power setting of 5 using a Vibra-Cell™ sonicator for 2 minutes. Before sonication, the mixture was a semi-opaque emulsion which had undergone phase inversion. After sonication, an opaque, low viscosity oil/water emulsion was obtained. After 14 days, water separation had occurred to an extent of 58%, but no free oil layer was observed.

Exemplary Oil Emulsions 15–20 and Conventional Oil Emulsions 1–3

Exemplary Oil Emulsions 15–20 and Conventional Oil Emulsions 1–3 were prepared using the following procedure. At 25° C., a specified quantity of Drakeol 7 mineral oil and diethylaminoethanol (DEAE) were blended. The amount of diethylaminoethanol added was sufficient to completely react with any remaining carboxylic acid functionalities remaining on the polymer after the resin cut had been added. Thus, the amount of diethylaminoethanol used varied slightly from one oil emulsion to another. An aqueous resin cut of about prepared from an exemplary or conventional resin was mixed with water, and warmed, if necessary, to clarify the solution. The aqueous resin-containing solution was then cooled to 30° C. and then added to the oil/diethylaminoethanol mixture over 5 minutes while generally increasing the mixing speed from 200 to 600 rpm. After addition was complete, the emulsion was generally mixed for 5 minutes at 750 rpm. While mixing was continued, the emulsion was sonicated for 2 minutes using a Vibra-Cell™ sonicator at a power setting of 5. The mixer speed was generally decreased from 750 to 400 rpm as the emulsions thinned. The following table provides stability and composition data for Exemplary Oil Emulsions 3–12 and Conventional Oil Emulsions 1–3.

TABLE 93

Composition of Oil Emulsions Exemplary Oil Emulsions 5–20 and Conventional Oil Emulsions 1–3[a]

| | Resin | | | Resin Cut | | | | Shelf Stability of Oil Emulsions | |
|---|---|---|---|---|---|---|---|---|---|
| | Resin used in Resin Cut | Resin in Resin Cut (% w/w) | Mineral Oil Amt. (% w/w) | Amount of Resin Cut Used (% w/w) | Nonvol in Resin Cut (% w/w) | DN[b] % | DEAE used (% w/w) | Water Sep. at 14 days (%) | Days to Free Oil Form. |
| Ex. Oil Emuls. | | | | | | | | | |
| 15 | Ex. Res. 44 | 25.00 | 5.00 | 82.51 | 30.3 | 83.9 | 1.43 | Broken | 1 |
| 16 | Ex. Res. 44 | 20.00 | 10.00 | 66.00 | 30.3 | 83.9 | 1.14 | Broken | 0 |
| 17 | Ex. Res. 44 | 2.00 | 28.00 | 6.60 | 30.3 | 83.9 | 0.11 | 51 | >14 |
| 18 | Ex. Res. 44 | 0.50 | 29.50 | 1.65 | 30.3 | 83.9 | 0.03 | 53 | >14 |
| 19 | Ex. Res. 44 | 0.10 | 29.90 | 0.33 | 30.3 | 83.9 | 0.01 | 53 | >14 |
| 20[d] | Ex. Res. 44 | 0.00 | 30.00 | 0.00 | — | — | 0.11 | Broken | 0 |
| Con. Oil Emuls. | | | | | | | | | |
| 1 | Con. Res. 12 | 10.00 | 20.00 | 19.80 | 50.5 | 97.4 | 0.12 | Broken | 0 |
| 2 | Con. Res. 14 | 10.00 | 20.00 | 32.47 | 30.8 | 85.5 | 0.67 | 56 | >14 |
| 3 | Con. Res. 14 | 10.00 | 20.00 | 32.47 | 30.8 | 85.5 | 0.35[e] | 54 | >14 |

[a]Each of the oil emulsion formulations except Exemplary Oil Emulsions 15 and 20 phase-inverted on sonication to produce oil/water emulsions.
[b]DN (degree of neutralization) is the percent that the exemplary resin is neutralized with ammonia prior to adjustment with DEAE to 100% neutralization.
[c]phase-inversion occurred prior to sonication producing a semi-opaque oil/water emulsion. Sonication produced no apparent improvement.
[d]a two-phase mixture remained until sonication was performed. After sonication, a transient opaque emulsion formed that immediately broke and separated after agitation.
[e]28% ammonia was used in place of the diethylaminoethanol.

Exemplary Oil Emulsion 21

Exemplary Oil Emulsion 21 was prepared with mineral oil and a resin cut prepared from Exemplary Resin 46 having 24.7% solids and having enough ammonia added to neutralize 104% of the carboxylic acid groups. Exemplary Oil Emulsion 21 was prepared by mixing 20.27 parts of the resin cut, 15 parts of mineral oil, and 64.73 parts of water at 360 rpm and 55° C. After the mineral oil was mixed in, the stirred mixture was sonicated for 2 minutes at 55–58° C. at a power level of 5 using a Vibra-Cell™ sonicator. The resulting emulsion was stirred at 360 rpm for an additional 10 minutes at 55–58° C. before it was force-cooled to 30° C. by immersion in an ice bath.

The reaction mixture was translucent before sonication, and a very smooth, opaque white oil/water emulsion was observed after sonication.

Exemplary Wax Emulsion 1

Epolene E-15 wax (24 parts) and Exemplary Resin 2 (12 parts) were melted and mixed thoroughly. Diethylaminoethanol (5 parts) was then added to the molten mixture. The resulting mixture was then added to 59 parts of water at 98° C. with good agitation. A fluid emulsion resulted, and the hot emulsion was cooled rapidly to room temperature. The final emulsion was a thick, tan mixture with a viscosity of 15,000 cps at 41.2 percent solids and a pH of 9.4. The emulsion contained no grit or undispersed material. Addition of water to reduce the emulsion solids to about 30 percent resulted in a more workable viscosity.

Exemplary Wax Emulsion 2

A wax emulsion was prepared using the method for Exemplary Wax Emulsion 1. All amounts and conditions were the same except that Exemplary Resin 4 was used in place of Exemplary Resin 2. The final emulsion was tan and contained some grit. The final emulsion had a viscosity of 55 cps at 40 percent solids and a pH of 8.6. Some separation was observed with aging, however, the separated material easily redispersed.

Exemplary Wax Emulsion 3

Exemplary Wax Emulsion 3 was prepared by charging 17.5 parts of AC 629, 8.75 parts Exemplary Resin 2, 3.5 parts of diethylaminoethanol and 14 parts water to a vessel. This mixture was heated and mixed to uniformity at about 150° C. and maintained at that temperature for about 15 minutes. The remaining 56.25 parts of water was added at about 99° C. and 120 psi. This mixture was stirred at 500 rpm under a pressure of 80 psi for 10 minutes. The emulsion was force-cooled. A thin tan emulsion was obtained which had a viscosity of about 15 cps at 25.7 percent solids and a pH of 9.5. The emulsion was stable.

Exemplary Wax Emulsions 4–23

Exemplary Wax Emulsions 4–13 were prepared using Exemplary Resins 40, 41, 51, 44, 39, 47, 48, 49, 50, and 52 respectively. Similarly, Exemplary Wax Emulsions 14–23 were prepared using Exemplary Resins 40, 41, 51, 44, 39, 47, 48, 49, 50, and 52 respectively. Each of Exemplary Wax Emulsions 4–13 was prepared using 24 parts of AC-629 polyethylene wax whereas Exemplary Wax Emulsions 14–23 were prepared using 20 parts of AC-629 polyethylene wax. Exemplary Wax Emulsions 4–13 contained 12 parts of an exemplary resin cut prepared from an exemplary resin and having 33.3% solids and 83–93% of the carboxylic acid groups neutralized with ammonia whereas Exemplary Wax Emulsions 14–23 contained 10 parts of an exemplary resin cut with the same specifications. Water was also included in each of Exemplary Wax Emulsions 4–23. In Exemplary Wax Emulsions 4–13, 59 parts of water was used, whereas in Exemplary Wax Emulsions 14–23, 65–66 parts of water was used. Diethylaminoethanol was also used to prepare Exemplary Wax Emulsions 4–23. While 5 parts of DEAE was used to prepare Exemplary Wax Emulsions 4–13, 4 to 5 parts of DEAE was used to prepare Exemplary Wax Emulsions 14–23.

The exemplary wax emulsions were prepared by first melt-blending the AC-629 polyethylene wax and exemplary resin in a porcelain casserole at 140–155° C. Diethylaminoethanol was then blended into the resulting mixture. Next, the water was separately heated to 98° C. in a reaction vessel. The mixed blend of the AC-629 polyethylene wax, the diethylaminoethanol, and the exemplary resin was then slowly added while mixing the resulting product at 500 rpm. After addition was complete, the resulting mixture was stirred for 15 minutes at 500 rpm and 88–95° C. before it was force-cooled to 30° C. by immersion in an ice bath. While very good oil/water emulsions were formed with each of the exemplary resins, best results were observed for Exemplary Wax Emulsions 14, 17, 19–21, and 23.

Exemplary Wax Emulsions 24–43 and Conventional Wax Emulsions 1–4

Exemplary Wax Emulsions 24–43 and Conventional Wax Emulsions 1–4 were formed with paraffin wax using the same procedure. Exemplary Wax Emulsions 24–33 and Conventional Wax Emulsions 1–2 were formed using resin cuts obtained from Exemplary Resins 39–41, 44, and 47–52 and Conventional Resins 12 and 14 respectively. Similarly, Exemplary Wax Emulsions 34–43 and Conventional Wax Emulsions 3–4 were prepared using resin cuts obtained from Exemplary Resin 39–41, 44, and 47–52 and Conventional Resins 12 and 14 respectively, but with different amounts than used in the other examples. The resin cuts used to prepare the various emulsions contained 30–50% solids. Additionally, 85–90% of the carboxylic acid groups in the resin cuts had been neutralized with ammonia.

The emulsions were prepared by combining water (80 parts for Exemplary Wax Emulsions 24–33 and Conventional Wax Emulsions 1–2; 60 parts for Exemplary Wax Emulsions 34–43 and Conventional Wax Emulsions 3–4) with the resin cut (5 parts for Exemplary Wax Emulsions 24–33 and Conventional Wax Emulsions 1–2; 10 parts for Exemplary Wax Emulsions 34–43 and Conventional Wax Emulsions 3–4) while mixing at 200 rpm and 55° C. The paraffin wax (15 parts for Exemplary Wax Emulsions 24–33 and Conventional Wax Emulsions 1–2; 30 parts for Exemplary Wax Emulsions 34–43 and Conventional Wax Emulsions 3–4) was added to the resulting mixture at 60° C. while mixing was continued at the same speed. After the wax had melted, the resulting mixture was stirred at 400 rpm for an additional 2 to 3 minutes. While stirring continued, the mixture was sonicated for two minutes at a power setting of 5 using a Vibra-Cell™ sonicator equipped with a one-half inch diameter probe. After sonication, the mixture was stirred for an additional minutes at 400 rpm at 65° C. and then force-cooled by immersion in a 30° C. ice bath.

Exemplary Wax Emulsions 24–43 obtained from the exemplary resins were characterized as good to excellent oil/water emulsions. No emulsion was obtained if the resin cut was omitted form the mixture. While excellent emulsions were formed using Conventional Resin 14, only poor emulsions were obtained using Conventional Resin 12.

Exemplary Wax Emulsion 44 and Conventional Wax Emulsions 5–6

Exemplary Wax Emulsion 44 and Conventional Wax Emulsions 5 and 6 were prepared using the same general procedure with carnauba wax. Exemplary Wax Emulsion 44 was prepared using a resin cut prepared from Exemplary Resin 44 the resin cut having 30.3% solids and having 83.8% of the carboxylic acid groups neutralized with ammonia. Conventional Wax Emulsions 5 and 6 were respectively prepared using resin cuts of Conventional Resins 12 and 14. Exemplary Wax Emulsion 44 and Conventional Wax Emulsions 5 and 6 were prepared by mixing 16.5 parts of the resin cut, 15.0 parts of carnauba wax, and 68.50 parts of water at 360 rpm and 87–90° C. After the carnauba wax melted, the stirred mixture was sonicated for 3 minutes at 86–90° C. at a power level of 5 using a Vibra-Cell™ sonicator. Stirring was then continued at 86–90° C. for 10 minutes at 360 rpm before the mixture was force-cooled to 30° C. by immersion in an ice bath.

Prior to sonication, beads of molten wax were observed in the aqueous medium. After sonication, opaque emulsions were obtained. The products were fairly smooth, opaque oil/water emulsions which exhibited a slight graininess. Only 1% of a lower water layer was visible after one day.

Exemplary Wax Emulsion 45

Exemplary Wax Emulsion 45 was prepared using carnauba wax and a resin cut prepared from Exemplary Resin 45 the resin cut having 30.3% solids and having 83.8% of the carboxylic acid groups neutralized with ammonia. Exemplary Wax Emulsion 45 was prepared by mixing 20.83 parts of the resin cut, 15.0 parts of carnauba wax, and 64.17 parts of water at 360 rpm and 87–90° C. After the carnauba wax melted, the stirred mixture was sonicated for 3 minutes at 86–90° C. at a power level of 5 using a Vibra-Cell™ sonicator. Stirring was then continued at 86–90° C. for 10 minutes at 360 rpm before the mixture was force-cooled to 30° C. by immersion in an ice bath.

Prior to sonication, beads of molten wax were observed in the aqueous medium. After sonication, a very smooth opaque oil/water emulsion was obtained.

Exemplary Wax Emulsion 46

Exemplary Wax Emulsion 46 was prepared with carnauba wax and a resin cut prepared from Exemplary Resin 46 having 24.7% solids and having enough ammonia added to neutralize 104% of the carboxylic acid groups. Exemplary Wax Emulsion 46 was prepared by mixing 20.27 parts of the resin cut, 15 parts of carnauba wax, and 64.73 parts of water at 360 rpm and 72° C. After the wax melted, the stirred mixture was sonicated for 2 minutes at 61–65° C. at a power level of 5 using a Vibra-Cell™ sonicator. The resulting emulsion was stirred at 360 rpm for an additional 10 minutes at 65–67° C. before it was force-cooled to 30° C. by immersion in an ice bath.

The reaction mixture was translucent before sonication, and a very smooth, opaque white oil/water emulsion was observed after sonication.

Preparation of Resin Supported Emulsion Polymers

Resin supported emulsion polymers are prepared at a total weight percent solids level of from 35 to 55. In preparing a resin supported emulsion polymer, sufficient resin, as the resin cut, is added to the reaction flask to make the resin constitute about 5 to about 50 percent of the final emulsion polymer solids. One or more conventional surfactants ranging from about 0 to about 5 weight percent of the final emulsion polymer, may be added to the reaction flask at the beginning of the reaction or with the monomer. Typical conventional surfactants used in resin supported emulsions are anionic or nonionic surfactants. Additional water may be added to adjust the desired weight percent solids of the final emulsion polymer. The mixture of resin, conventional surfactant, and water is heated to from about 70° C. to about 90° C. A free radical initiator is added to the hot resin/conventional surfactant mixture. The initiator is typically from about 0.4 to about 1.3 weight percent of the monomer added to form the emulsion polymer. Typically, persulfate salts, such as ammonium persulfate or potassium persulfate, are used as free radical initiators, but other water soluble free radical initiators may also be used. The monomers are then added to the reaction mixture. The monomers comprise about 50 to about 95 percent of the final emulsion polymer solids. A small portion, about 5 to about 15 weight percent, of the monomers may be added before the addition of the initiator as a precharge. A wide variety of ethylenically unsaturated monomers, and various combinations thereof, may be used. Typically, the monomer is added to the resin cut over a period of about 25 minutes to 3 hours at temperatures from 70° C. to 90° C. when a persulfate salt is used as an initiator. Other temperatures and addition times may be useful when other types of initiators are used. After the monomer feed has been completed, additional initiator may be added and the latex should be maintained at the reaction temperature for a time period sufficient to reduce the monomer concentration to a very low level. When the latex has cooled, a preservative is usually added.

TABLE 94

Emulsion Polymers with 25% Styrene/25% Methyl Methacrylate/50% 2-Ethylhexyl Acrylate.

| Resin Used | Alkanol type | pH | Visc. (cps) | % solids | % 2EHA | % 2EHOH | $D_a$ | $D_w$ | $D_w D_n$ | $SD_n$ | $SD_w$ |
|---|---|---|---|---|---|---|---|---|---|---|---|
| Con. Resin 14 | C0 | 8.4 | 520 | 47.7 | 0.27 | 0.03 | 60.4 | 251.8 | 4.17 | 21.5 | 272.8 |
| Con. Resin 15 | C8 | 8.4 | 230 | 47.8 | 0.08 | 0.02 | 54.0 | 70.8 | 1.31 | 14.5 | 26.7 |
| Ex. Resin 27 | C10 | 8.3 | 175 | 47.9 | 0.03 | 0.04 | 58.1 | 77.4 | 1.33 | 16.4 | 28.6 |
| Ex. Resin 28 | C12 | 8.2 | 230 | 48.1 | 0.06 | 0.03 | 57.0 | 76.8 | 1.35 | 15.9 | 30.6 |
| Ex. Resin 29 | C14 | 8.0 | 240 | 48.0 | 0.05 | 0.03 | 53.6 | 65.7 | 1.23 | 13.0 | 19.8 |
| Ex. Resin 30 | C16 | 8.3 | 350 | 48.0 | 0.04 | 0.03 | 53.6 | 63.0 | 1.18 | 11.6 | 16.9 |
| Ex. Resin 31 | 70% C16 30% C18 | 8.4 | 485 | 48.0 | 0.04 | 0.04 | 51.9 | 59.3 | 1.14 | 10.6 | 13.4 |
| Ex. Resin 32 | 30% C16 70% C18 | 8.4 | 555 | 48.0 | 0.04 | 0.02 | 50.4 | 57.7 | 1.14 | 10.1 | 14.0 |
| Ex. Resin 33 | C18 | 8.6 | 735 | 47.9 | 0.03 | 0.04 | 50.0 | 55.8 | 1.12 | 9.1 | 11.6 |
| Ex. Resin 34 | C22 | 8.4 | 920 | 47.9 | 0.11 | 0.03 | 45.9 | 48.2 | 1.05 | 5.8 | 6.4 |
| Ex. Resin 35 | Iso C12 | 8.4 | 215 | 47.9 | 0.04 | 0.04 | 56.1 | 72.4 | 1.29 | 15.2 | 24.8 |
| Ex. Resin 36 | Iso C16 | 8.5 | 275 | 47.8 | 0.08 | 0.04 | 55.4 | 65.2 | 1.18 | 12.7 | 15.6 |
| Ex. Resin 37 | Iso C20 | 8.4 | 480 | 47.8 | 0.04 | 0.03 | 52.7 | 63.1 | 1.20 | 12.1 | 17.7 |

TABLE 95

Emulsion Polymers with 100% Styrene.

| Resin Used | Alkanol type | pH | Visc. (cps) | % solids | % Styrene | $D_a$ | $D_w$ | $D_w D_n$ | $SD_n$ | $SD_w$ |
|---|---|---|---|---|---|---|---|---|---|---|
| Con. Resin 14 | C0 | 8.5 | 225 | 49.1 | 0.06 | 63.3 | 118.1 | 1.87 | 23.2 | 109.7 |

TABLE 95-continued

Emulsion Polymers with 100% Styrene.

| Resin Used | Alkanol type | pH | Visc. (cps) | % solids | % Styrene | $D_a$ | $D_w$ | $D_wD_n$ | $SD_n$ | $SD_w$ |
|---|---|---|---|---|---|---|---|---|---|---|
| Con. Resin 15 | C8 | 8.5 | 200 | 48.5 | 0.05 | 58.3 | 72.0 | 1.23 | 15.4 | 19.5 |
| Ex. Resin 27 | C10 | 8.7 | 140 | 48.8 | 0.07 | 57.0 | 69.7 | 1.22 | 13.8 | 20.9 |
| Ex. Resin 28 | C12 | 8.3 | 250 | 49.2 | 0.06 | 54.6 | 63.6 | 1.16 | 11.6 | 16.3 |
| Ex. Resin 29 | C14 | 8.5 | 305 | 49.5 | 0.07 | 53.7 | 62.8 | 1.17 | 11.4 | 16.7 |
| Ex. Resin 30 | C16 | 8.4 | 290 | 49.1 | 0.07 | 53.0 | 61.1 | 1.15 | 10.7 | 15.3 |
| Ex. Resin 31 | 70% C16 30% C18 | 8.7 | 470 | 48.9 | 0.06 | 50.6 | 57.8 | 1.14 | 10.0 | 14.0 |
| Ex. Resin 32 | 30% C16 70% C18 | 8.6 | 525 | 49.2 | 0.06 | 52.5 | 59.1 | 1.13 | 9.9 | 13.2 |
| Ex. Resin 33 | C18 | 8.7 | 845 | 49.2 | 0.07 | 49.8 | 55.8 | 1.12 | 9.2 | 12.4 |
| Ex. Resin 34 | C22 | 8.7 | 725 | 49.3 | 0.07 | 48.6 | 51.8 | 1.07 | 6.7 | 8.2 |
| Ex. Resin 35 | Iso C12 | 8.3 | 180 | 49.2 | 0.06 | 56.5 | 72.6 | 1.28 | 14.8 | 26.0 |
| Ex. Resin 36 | Iso C16 | 8.4 | 250 | 49.3 | 0.06 | 54.6 | 65.5 | 1.20 | 13.1 | 17.0 |
| Ex. Resin 37 | Iso C20 | 8.4 | 450 | 49.3 | 0.06 | 53.1 | 65.6 | 1.24 | 12.8 | 21.2 |

Particle Size and Surface Tension Measurements

Particle size measurements were carried out on resin solutions diluted to 10–21% (w/w) with pH matched deionized water. Concentration of the solutions was chosen at the lowest level that resulted in scattered light intensity value suitable for making measurements with a Microtrac UPA instrument from Honeywell of Minneapolis, Minn. A Krüss K 12 tensiometer available from Krüss USA (Charlotte, N.C.) was used to measure the surface tension of 2% (w/w) resin solutions made with pH matched deionized water. Surface tension concentration profiles were made in the automatic mode by controlling the Krüss tensiometer and a coupled automatic 665 Dosimat burette obtained from Metrohm (Herisau, Switzerland) using the Krüss 122 software program obtained from Krüss USA (Charlotte, N.C.). The results of these experiments are presented in Table 96.

TABLE 96

Computed parameters from Surface Tensions-Concentration Profiles*

| Sample | Surface Tension at CMC[a] (mN/m) | CMC (% w/w) | CMC (molar) | Surface Area per Molecule (Å$^2$) | pC20[b] |
|---|---|---|---|---|---|
| Exemplary Resin 39 | 30.9 | 0.0309 | $1.38 \times 10^{-4}$ | 14.5 | 4.5 |
| Exemplary Resin 40 | 28.6 | 0.0282 | $1.55 \times 10^{-4}$ | 12.7 | 3.85 |
| Fluorad FC 120[c] | 30.5 | 0.0850 | $1.4 \times 10^{-3}$ | 36.3 | 3.5 |
| Sodium Dodecyl Sulfate[d] | 32 | 0.23 | $8.2 \times 10^{-3}$ | 47.0 | 2.57 |

*All measurements were conducted at 23° C.
[a]CMC is the critical micelle concentration.
[b]pC20 is equal to -log 10 ($C_{20}$), where $C_{20}$ is the molar concentration at which the surface tension is lowered by 20 mN/m from that of water.
[c]Fluorad 120 is a brand of fluorosurfactant available from 3M (Minneapolis, Minnesota).
[d]Sodium dodecyl sulfate is also known as sodium lauryl sulfate and was obtained form the Aldrich Chemical Company of Milwaukee, WI.

The data illustrated in FIGS. 8–11 was obtained by conducting measurements on aqueous solutions of the various materials. The same instrumentation used above was used to obtain the value of surface tension. For FIG. 8, the temperature was maintained at 25° C., and measurements were made after equilibration had been established at each of the concentrations shown. For FIGS. 9–11, aqueous 2 percent solutions were formed by dissolving the materials in deionized water at the labeled amount. The surface tensions of the various surfactant solutions were then measured as a function of temperature as described above.

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A continuous bulk polymerization and esterification process, comprising:
   (a) charging continuously into a reaction zone to form a reaction mixture:
      (i) at least one monomer selected from the group consisting of ethylenically unsaturated acid-functional monomers and maleic anhydride;
      (ii) at least one alkanol having the formula ROH, wherein R is a linear or branched chain alkyl moiety having greater than 11 carbon atoms;
   (b) maintaining a flow rate through the reaction zone sufficient to provide an average residence time of the reaction mixture in the reaction zone of less than 60 minutes; and
   (c) maintaining an effective temperature in the reaction zone sufficient to produce a polymeric product incorporating at least some of the alkanol as an ester of the polymerized ethylenically unsaturated acid-functional monomer.

2. The continuous bulk polymerization and esterification process according to claim 1, wherein the polymeric product of the continuous bulk polymerization and esterification process incorporates at least 80 percent of the alkanol as an ester of the ethylenically unsaturated acid-functional monomer when the alkanol is present in the reaction zone in an average amount of up to 25 mole percent of the total moles of the ethylenically unsaturated monomers.

3. The continuous bulk polymerization and esterification process according to claim 1, wherein (a) further comprises the continuous charging of at least one additional monomer selected from the group consisting of aromatic ethylenically unsaturated monomers, C1 to C8 alkyl acrylate monomers, C1 to C8 alkyl methacrylate monomers and non-aromatic ethylenically unsaturated vinyl monomers.

4. The continuous bulk polymerization and esterification process according to claim 3, wherein at least one of the additional monomers is an aromatic ethylenically unsaturated monomer.

5. The continuous bulk polymerization and esterification process according to claim 4, wherein the aromatic ethylenically unsaturated monomer is selected from the group consisting of styrene, α-methylstyrene, vinyltoluenes, t-butylstyrene, and vinylpyridines.

6. The continuous bulk polymerization and esterification process according to claim 3, wherein the at least one additional monomer is at least two different aromatic ethylenically unsaturated monomers.

7. The continuous bulk polymerization and esterification process according to claim 6, wherein the two aromatic ethylenically unsaturated monomers are styrene and α-methylstyrene.

8. The continuous bulk polymerization and esterification process according to claim 1, wherein the ethylenically unsaturated acid-functional monomer or maleic anhydride is selected from the group consisting of acrylic acid, methacrylic acid, maleic anhydride, itaconic acid and crotonic acid.

9. The continuous bulk polymerization and esterification process according to claim 3, wherein the aromatic ethylenically unsaturated monomer is selected from the group consisting of styrene, α-methylstyrene, vinyltoluenes, t-butylstyrene, and vinylpyridines, and the ethylenically unsaturated acid-functional monomer is selected from the group consisting of acrylic acid, methacrylic acid, and crotonic acid.

10. The continuous bulk polymerization and esterification process according to claim 3, wherein at least one of the additional monomers is an acrylate or methacrylate monomer selected from the group consisting of methyl methacrylate, ethyl methacrylate, propyl methacrylates, butyl methacrylates, methyl acrylate, ethyl acrylate, propyl acrylates, butyl acrylates, 2-ethylhexyl methacrylate and 2-ethylhexyl acrylate.

11. The continuous bulk polymerization and esterification process according to claim 9, wherein at least one of the additional monomers is an acrylate or methacrylate monomer selected from the group consisting of methyl methacrylate, ethyl methacrylate, propyl methacrylates, butyl methacrylates, methyl acrylate, ethyl acrylate, propyl acrylates, butyl acrylates, 2-ethylhexyl methacrylate and 2-ethylhexyl acrylate.

12. The continuous bulk polymerization and esterification process according to claim 1, wherein R is a linear or branched chain alkyl moiety having from 12 to 50 carbon atoms.

13. The continuous bulk polymerization and esterification process according to claim 12, wherein R is a linear or branched chain alkyl moiety having from 12 to 36 carbon atoms.

14. The continuous bulk polymerization and esterification process according to claim 12, wherein R is a linear or branched chain alkyl moiety having from 12 to 22 carbon atoms.

15. The continuous bulk polymerization and esterification process according to claim 12, wherein R is a linear or branched chain alkyl moiety having from 16 to 18 carbon atoms.

16. The continuous bulk polymerization and esterification process according to claim 1, wherein the at least one alkanol comprises at least two different alkanols.

17. The continuous bulk polymerization and esterification process according to claim 16, wherein the R group of at least two of the alkanols has from 16 to 18 carbon atoms.

18. The continuous bulk polymerization and esterification process according to claim 16, wherein each R is a linear or branched chain alkyl moiety having from 12 to 50 carbon atoms.

19. The continuous bulk polymerization and esterification process according to claim 16, wherein each R is a linear or branched chain alkyl moiety having from 12 to 36 carbon atoms.

20. The continuous bulk polymerization and esterification process according to claim 16, wherein each R is a linear or branched chain alkyl moiety having from 12 to 22 carbon atoms.

21. The continuous bulk polymerization and esterification process according to claim 1, wherein an aqueous resin cut at a solids content of 30.5%, a pH of from 7.7 to 8.2, and a temperature of 25° C., of the polymeric product of the continuous bulk polymerization and esterification process has a solution viscosity which is less than about 50 percent of the solution viscosity of an aqueous resin cut at a solids content of 30.5%, a pH of 7.8, and a temperature of 25° C., of a polymeric product produced using the continuous bulk polymerization and esterification process but without the at least one alkanol.

22. The continuous bulk polymerization and esterification process according to claim 20, wherein an aqueous resin cut at a solids content of 30.5%, a pH of from 7.7 to 8.2, and a temperature of 25° C., of the polymeric product of the continuous bulk polymerization and esterification process has a solution viscosity which is less than about 50 percent of the solution viscosity of an aqueous resin cut at a solids content of 30.5%, a pH of 7.8, and a temperature of 25° C., of a polymeric product produced using the continuous bulk polymerization and esterification process but without the at least one alkanol.

23. The continuous bulk polymerization and esterification process according to claim 1, wherein (a) further comprises a polymerization initiator continuously charged into the reaction zone in amount to provide a molar ratio of the initiator to the combined monomers of from about 0.0005:1 to 0.06:1.

24. The continuous bulk polymerization and esterification process according to claim 23, wherein the polymerization initiator is di-t-butyl-peroxide.

25. The continuous bulk polymerization and esterification process according to claim 1, wherein the esterification process incorporates at least 85 percent of the alkanol as an ester of the ethylenically unsaturated acid-functional monomer or maleic anhydride when the alkanol is present in the reaction zone in an average amount of up to 20 mole percent of the total moles of the ethylenically unsaturated monomers.

26. The continuous bulk polymerization and esterification process according to claim 1, wherein the esterification process incorporates at least 90 percent of the alkanol as an ester of the ethylenically unsaturated acid-functional monomer or maleic anhydride when the alkanol is present in the reaction zone in an average amount of up to 15 mole percent of the total moles of the ethylenically unsaturated monomers.

27. The continuous bulk polymerization and esterification process according to claim 1, wherein the flow rate through the reaction zone is sufficient to provide an average residence time of the reaction mixture in the reaction zone of less than 30 minutes.

28. The continuous bulk polymerization and esterification process according to claim 12, wherein the flow rate through the reaction zone is sufficient to provide an average residence time of the reaction mixture in the reaction zone of less than 30 minutes.

29. The continuous bulk polymerization and esterification process according to claim 1, further comprising separating a volatile material from the reaction zone to obtain two streams wherein one of the streams contains higher boiling fractions.

30. The continuous bulk polymerization and esterification process according to claim 29, further comprising adding the stream containing the higher boiling fractions to the reaction zone.

31. The continuous bulk polymerization and esterification process according to claim 1, further comprising condensing vapor from the reaction mixture to produce a condensate containing the monomers.

32. The continuous bulk polymerization and esterification process according to claim 29, further comprising recycling the condensate back into the reaction zone.

33. The continuous bulk polymerization and esterification process according to claim 1, wherein the temperature in the reaction zone is maintained from 180° to 270° C.

34. The continuous bulk polymerization and esterification process according to claim 1, wherein at least two different monomer selected from the group consisting of ethylenically unsaturated acid-functional monomers and maleic anhydride are continuously charged into the reaction zone.

35. The continuous bulk polymerization and esterification process according to claim 1, further comprising heating the at least one alkanol prior to adding it to the reaction zone.

36. The continuous bulk polymerization and esterification process according to claim 1, wherein the polymeric product has an acid number ranging from about 10 to about 740.

37. A continuous bulk polymerization and esterification process, comprising:
(a) continuously charging into a reaction zone to form a reaction mixture at least one ethylenically unsaturated acid-functional monomer and at least one alkanol having the formula ROH, wherein R is a linear or branched chain alkyl moiety having from 12 to 50 carbon atoms;
(b) maintaining a flow rate through the reaction zone sufficient to provide an average residence time of the reaction mixture in the reaction zone of less than 60 minutes; and
(c) maintaining a temperature in the reaction zone sufficient to produce a polymeric product, wherein an aqueous resin cut at a solids content of 30.5%, a pH of from 7.7 to 8.2, and a temperature of 25° C. of the polymeric product of the continuous bulk polymerization and esterification process has a solution viscosity which is less than about 50 percent of the solution viscosity of an aqueous resin cut at a solids content of 30.5%, a pH of 7.8, and a temperature of 25° C., of a polymeric product produced using the continuous bulk polymerization and esterification process but without the at least one alkanol.

38. The continuous bulk polymerization and esterification process according to claim 37, wherein R is a linear or branched chain alkyl moiety having from 12 to 22 carbon atoms.

39. The continuous bulk polymerization and esterification process according to claim 37, wherein the at least one alkanol comprises at least two different alkanols.

* * * * *